US010669989B2

(12) United States Patent
Lee et al.

(10) Patent No.: US 10,669,989 B2
(45) Date of Patent: Jun. 2, 2020

(54) APPARATUS FOR DRIVING AND CONTROLLING CONVERTERS AND SWITCHING ELEMENT MODULES IN A WIND POWER GENERATION SYSTEM

(71) Applicant: DOOSAN HEAVY INDUSTRIES CONSTRUCTION CO., LTD., Gyeongsangnam-do (KR)

(72) Inventors: Sanghoey Lee, Gyeongsangnam-do (KR); Jeonghoon Lee, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 28 days.

(21) Appl. No.: 15/408,159

(22) Filed: Jan. 17, 2017

(65) Prior Publication Data

US 2017/0284367 A1 Oct. 5, 2017

(30) Foreign Application Priority Data

Mar. 30, 2016 (KR) .................. 10-2016-0038567
Mar. 30, 2016 (KR) .................. 10-2016-0038576
(Continued)

(51) Int. Cl.
*H02M 5/458* (2006.01)
*F03D 7/02* (2006.01)
(Continued)

(52) U.S. Cl.
CPC ............. *F03D 7/0284* (2013.01); *F03D 1/00* (2013.01); *F03D 3/002* (2013.01); *F03D 3/005* (2013.01);
(Continued)

(58) Field of Classification Search
CPC ........... H02M 2001/325; H02M 3/157; H02M 5/4585; H02J 3/386; H02J 3/383;
(Continued)

(56) References Cited

U.S. PATENT DOCUMENTS 6,175,512 B1 * 1/2001 Hagihara .............. H02M 7/493
  323/906
7,545,052 B2 * 6/2009 Llorente Gonzalez ......................
  H02J 3/386
  290/44

(Continued)

FOREIGN PATENT DOCUMENTS

EP 0 959 552 A2 11/1999
EP 1768223 A2 3/2007
(Continued)

OTHER PUBLICATIONS

European search report dated Aug. 31, 2017 in corresponding European patent application 17161274.0-1809.
(Continued)

*Primary Examiner* — Kyle J Moody
*Assistant Examiner* — Jye-June Lee
(74) *Attorney, Agent, or Firm* — Invenstone Patent, LLC

(57) ABSTRACT

Disclosed herein are an apparatus for driving converters in a wind power generation system, an apparatus for controlling converters in a wind power generation system, an apparatus for driving switching element modules in a wind power generation system, and an apparatus for controlling switching element modules in a wind power generation system. The apparatus for driving converters in a wind power generation system includes a converter control unit configured to drive a plurality of converters connected in parallel between a generator and a grid, wherein the converter control unit sequentially drives the converters one by one when output power of the grid increases and sequen-
(Continued)

tially stops the operations of the converters one by one when output power of the grid decreases.

6 Claims, 13 Drawing Sheets

(30) Foreign Application Priority Data

Apr. 14, 2016 (KR) .................. 10-2016-0045459
Apr. 14, 2016 (KR) .................. 10-2016-0045461

(51) Int. Cl.

| | |
|---|---|
| *H02J 3/38* | (2006.01) |
| *F03D 9/25* | (2016.01) |
| *F03D 1/00* | (2006.01) |
| *F03D 3/00* | (2006.01) |
| *F03D 7/04* | (2006.01) |
| *H02K 7/18* | (2006.01) |
| *H02M 1/00* | (2006.01) |
| *H02M 7/493* | (2007.01) |

(52) U.S. Cl.
CPC ............ *F03D 7/042* (2013.01); *F03D 9/255* (2017.02); *H02J 3/386* (2013.01); *H02K 7/183* (2013.01); *H02M 5/458* (2013.01); *H02M 5/4585* (2013.01); *F05B 2220/7064* (2013.01); *F05B 2260/40* (2013.01); *H02M 7/493* (2013.01); *H02M 2001/0054* (2013.01); *Y02B 70/1491* (2013.01); *Y02E 10/721* (2013.01); *Y02E 10/725* (2013.01); *Y02E 10/763* (2013.01)

(58) Field of Classification Search
CPC ..... F03D 7/0292; F03D 7/0284; Y02E 10/76; Y02E 10/763; Y02E 10/766; Y02B 70/1491
See application file for complete search history.

(56) References Cited

U.S. PATENT DOCUMENTS

| | | | | |
|---|---|---|---|---|
| 7,939,959 B2* | 5/2011 | Wagoner | ............... | H02M 5/458 290/55 |
| 8,097,970 B2* | 1/2012 | Hyvarinen | ............... | H02J 3/386 290/44 |
| 8,138,620 B2* | 3/2012 | Wagoner | ............. | H02M 5/4585 290/44 |
| 8,988,056 B2 | 3/2015 | Smith, Jr. et al. | | |

| | | | | |
|---|---|---|---|---|
| 2012/0300510 A1 | 11/2012 | Jensen et al. | | |
| 2013/0140999 A1* | 6/2013 | Aboulnaga | ....... | H02M 3/33561 315/200 R |
| 2015/0207400 A1* | 7/2015 | Shenoy | ............... | H02M 3/1584 323/213 |

FOREIGN PATENT DOCUMENTS

| | | | |
|---|---|---|---|
| EP | 2 009 779 A2 | | 12/2008 |
| JP | 2001-268800 A | | 9/2001 |
| JP | 2002-369508 A | | 12/2002 |
| JP | 2003-111384 A | | 4/2003 |
| JP | 2015-220991 A | | 12/2015 |
| KR | 10-0073180 A | | 12/2000 |
| KR | 10-0038910 A | | 4/2005 |
| KR | 10-0039389 A | | 4/2005 |
| KR | 10-0823725 B1 | | 4/2008 |
| KR | 10-0039393 A | | 4/2009 |
| KR | 10-2011-0068180 A | | 6/2011 |
| KR | 10-1097260 B1 | | 12/2011 |
| KR | 10-2013-0072543 A | | 7/2013 |
| KR | 10-0072526 A | | 7/2013 |
| KR | 20130072543 A | * | 7/2013 |
| KR | 10-0109236 A | | 10/2013 |
| KR | 10-1364243 B | | 2/2014 |
| KR | 10-1375256 B | | 3/2014 |
| KR | 10-2014-0076353 A | | 6/2014 |
| KR | 10-2014-0143476 A | | 12/2014 |
| KR | 10-2015-0130865 A | | 11/2015 |

OTHER PUBLICATIONS

Prasad, Joshi V., "Study of Different Converter Topologies for Interconnecting Microgrid with Utility Grid," 2015 International Conference on Control Instrumentation, Communication and Computational Technologies (ICCICCT), Dec. 18, 2015.
Patent Cooperation Treaty International Search Report dated Jul. 3, 2017 in corresponding international application PCT/KR2016/012832.
Korean Office Action dated Jul. 3, 2017 in corresponding Korean patent application 10-2016-0038567.
Korean Office Action dated Jul. 3, 2017 in corresponding Korean patent application 10-2016-0038576.
El Basri, Y., et al., "Rotational Adaptive-multilevel Converter Control Strategy Based on FPGA," IEEE, 2011.
An European Search Report dated Sep. 5, 2019 in connection with European Patent Application No. 17161274.0 which corresponds to the above-referenced U.S. application.
Beechner T et al—Harmonic cancellation under interleaved PWM with harmonic injection, XP031300184.

* cited by examiner

APPARATUS FOR DRIVING AND CONTROLLING CONVERTERS AND SWITCHING ELEMENT MODULES IN A WIND POWER GENERATION SYSTEM

CROSS REFERENCE TO RELATED APPLICATIONS

The present application claims the benefit of Korean Patent Application No. 10-2016-0038567, filed on Mar. 30, 2016, Korean Patent Application No. 10-2016-0038576, filed on Mar. 30, 2016, Korean Patent Application No. 10-2016-0045461, filed on Apr. 14, 2016, and Korean Patent Application No. 10-2016-0045459, filed on Apr. 14, 2016, the entire contents of each of which are incorporated herein by reference.

BACKGROUND

The present disclosure relates to an apparatus for driving converters in a wind power generation system, an apparatus for controlling converters in a wind power generation system, an apparatus for driving switching element modules in a wind power generation system, and an apparatus for controlling switching element modules in a wind power generation system. More particularly, the present disclosure relates to a technology for driving a converter in response to current grid output by sequentially driving the converters as power output to a grid is increased and sequentially stopping the operation of the converters as power output to the grid is reduced, a technology for improving the lifespan of a converter by making identical the operation times of a plurality of the converters that are connected in parallel in a wind power generation system, a technology for driving switching element modules in response to the amount of power currently output by converters by sequentially driving the switching element modules one by one when output power of the converters is increased and sequentially stopping the operation of the switching element modules one by one when output power of the converters is decreased, and a technology for reducing a harmonic component included in an alternating current (AC) generated by a converter by making different points of time at which a plurality of switching element modules included in the converter is driven.

A wind power generator converts kinetic energy of the wind into mechanical energy attributable to the rotation of a blade. The converted mechanical energy is converted into electric energy through a generator.

A converter disposed between the generator of the wind power generator and the grid includes only a single switching element module. When the wind blows, the blade of the wind power generation system rotates. Kinetic energy attributable to the rotation of the blade is converted into electric energy through the generator. The electric energy converted and generated by the generator is AC power. The AC is converted into a direct current (DC) by the switching element module included in the converter. The DC is converted into an AC to be supplied toward the grid.

In a conventional technology, no matter how weakly the wind blows, all of a plurality of converters operates. Accordingly, efficiency of power versus consumption power of the converters, which is output by a grid in accordance with the velocity of the wind, is low.

It is desirable to reduce output power supplied to the grid versus power consumed by the plurality of converters in accordance with the velocity of the wind by driving only some of the converters or all of the converters in response to the high or low of power output to the grid.

Furthermore, a plurality of converters may be disposed between the generator of a wind power generator and the grid. When the wind blows, the blade of the wind power generator rotates. Kinetic energy attributable to the rotation of the blade is converted into electric energy through the generator. The electric energy converted and generated by the generator is AC power. The AC is converted into a DC by the converters. The DC is converted into an AC to be supplied toward the grid.

When the wind blows, any one of the plurality of converters is to be driven according to the aforementioned process. In a conventional technology, a converter that is always first driven has been predetermined. Only one of the plurality of converters is driven unless the generator generates high power as the velocity of the wind increases. Accordingly, there is a problem in that the lifespan of the converter that is frequently driven is reduced.

Furthermore, there is a problem in that the lifespan of a converter that is always driven is reduced because the predetermined converter is always driven even in a situation in which two or more converters have to be driven.

It is also desirable to reduce output power supplied to the grid versus power consumed by a converter in accordance with the velocity of the wind by driving only some of a plurality of switching element modules or all of the switching element modules in response to the high or low of power output by the converter.

Furthermore, when the wind blows, only a single switching element module included in a converter is to be driven according to the aforementioned process.

In this case, if the switching element module driven by a pulse width-controlled method is turned off, an electric current is reduced. The electric current slowly decreases when inductance of the inductor of a filter connected to the output stage of the converter is great. If an inductor having great inductance is used to slowly reduce the electric current, the size of the filter becomes bulky and a cost is also increased.

BRIEF SUMMARY

An object of the disclosure is to reduce output power supplied to a grid versus power consumed by a converter by sequentially further driving the converters one by one when output power supplied to the grid increases in accordance with the velocity of the wind.

An object of the disclosure is to reduce output power supplied to a grid versus power consumed by a converter by sequentially stopping the operation of converters when output power supplied to the grid decreases in accordance with the velocity of the wind.

An object of the disclosure is to reduce output power supplied to a grid versus power consumed by a converter by making different a criterion by which another converter is newly driven in response to the increase of output power supplied to the grid and a criterion by which the operation of a converter that is being driven is stopped in response to the decrease of output power supplied to the grid.

Furthermore, an object of the disclosure is to reduce a reduction in the lifespan of a specific converter by first driving a converter that belongs to a plurality of converters connected in parallel and that has a smaller accumulated operation time so that the plurality of converters has the same operation time.

Another object of the disclosure is to reduce a reduction in the lifespan of a specific converter by first stopping the operation of a converter that belongs to a plurality of converters and that has a greater accumulated operation time so that the plurality of converters has the same operation time.

Yet another object of the disclosure is to reduce a reduction in the lifespan of a specific converter by driving a converter that belongs to a plurality of converters and that has the next sequence of a converter that has been finally driven based on the set operation sequence of the plurality of converters so that the plurality of converters has the same operation time.

Yet another object of the disclosure is to reduce a reduction in the lifespan of a specific converter by stopping the operation of a converter that belongs to a plurality of converters and that has the next sequence of a converter that is finally stopped based on the set operation stop sequence of the plurality of converters so that the plurality of converters has the same operation time.

Yet another object of the disclosure is to reduce a reduction in the lifespan of a specific switching element module by first driving a switching element module that belongs to a plurality of switching element modules included in a converter and that has a smaller accumulated operation time so that the plurality of switching element modules has the same operation time.

Yet another object of the disclosure is to reduce a reduction in the lifespan of a specific switching element module by first stopping the operation of a switching element module that belongs to a plurality of switching element modules included in a converter and that has a greater accumulated operation time so that the plurality of switching element modules has the same operation time.

Yet another object of the disclosure is to reduce a reduction in the lifespan of a specific switching element module by driving a switching element module that belongs to a plurality of switching element modules included in a converter and that has the next sequence of a switching element module that has been finally driven based on the operation sequence of the plurality of switching element modules so that the plurality of switching element modules has the same operation time.

Yet another object of the disclosure is to reduce a reduction in the lifespan of a specific switching element module by stopping the operation of a switching element module that belongs to a plurality of switching element modules included in a converter and that has the next sequence of a switching element module that is finally stopped based on the operation stop sequence of the plurality of switching element modules so that the plurality of switching element modules has the same operation time.

Furthermore, an object of the disclosure is to significantly reduce output power supplied to the grid versus power consumed by a converter by sequentially further driving switching element modules included in the converter when output power output by the converter increases in accordance with the velocity of the wind.

Yet another object of the disclosure is to significantly reduce output power supplied to the grid versus power consumed by a converter by sequentially stopping the operation of switching element modules included in the converter when power output by the converter is reduced in accordance with the velocity of the wind.

Yet another object of the disclosure is to reduce output power supplied to the grid versus power consumed by a converter by making different a criterion by which another switching element module included in the converter is newly driven in response to an increase of power output by the converter and a criterion by which the operation of a switching element module that is being driven is stopped in response to a reduction of power output by the converter.

Furthermore, an object of the disclosure is to reduce a harmonic component included in an AC output by a converter connected between the generator of a wind power generation system and a grid in such a manner that the converter includes a plurality of switching element modules connected in parallel and the plurality of switching element modules is driven so that they have a phase difference.

Yet another object of the disclosure is to reduce a harmonic component included in an AC output by a converter connected between the generator of a wind power generation system and a grid in such a manner that the converter includes a plurality of switching element modules connected in parallel and the plurality of switching element modules is driven so that they have a constant phase difference.

Yet another object of the disclosure is to reduce a harmonic component included in an AC output by a converter connected between the generator of a wind power generation system and a grid in such a manner that the converter includes a plurality of switching element modules connected in parallel and the plurality of switching element modules is driven so that they have a phase difference corresponding to a value calculated by dividing 360 degrees by the number of switching element modules that are included in a single converter and that are connected in parallel.

An apparatus for driving converters in a wind power generation system according to an embodiment of the present disclosure may include a converter control unit configured to drive a plurality of converters connected in parallel between a generator and a grid, wherein the converter control unit sequentially drives the converters one by one when output power of the grid increases and sequentially stops the operations of the converters one by one when output power of the grid decreases.

Furthermore, in the apparatus for driving converters in a wind power generation system according to an embodiment of the present disclosure, the converter control unit may include a converter capacity calculation unit configured to calculate each converter capacity based on the rating capacity of the grid and the number of converters, a converter operation capacity calculation unit configured to calculate each converter operation capacity based on each calculated converter capacity and converter operation capacity ratio, and a converter driving unit configured to drive a converter which belongs to converters being driven and has a next sequence when the current capacity of a converter having the last sequence exceeds a corresponding converter operation capacity.

Furthermore, in the apparatus for driving converters in a wind power generation system according to an embodiment of the present disclosure, the converter control unit may further include a converter operation stop capacity calculation unit configured to calculate each converter operation stop capacity based on each calculated converter capacity and converter operation stop capacity ratio. When a capacity of the converter belonging to the converters being driven and having the last sequence exceeds a corresponding converter operation stop capacity and becomes the converter operation stop capacity or less, the converter driving unit may stop the operation of the converter belonging to the converters being driven and having the last sequence at a point of time at which the capacity of the converter belonging to the converters and having the last sequence exceeds the converter operation stop capacity and becomes the converter operation stop capacity or less.

Furthermore, in the apparatus for driving converters in a wind power generation system according to an embodiment of the present disclosure, the converter operation capacity ratio and the converter operation stop capacity ratio are different.

Furthermore, a wind power generation system including an apparatus for driving converters in a wind power generation system according to an embodiment of the present disclosure may further include an AC/DC converter, a DC/AC inverter connected in parallel to the AC/DC converter, and a DC link connected between the AC/DC converter and the DC/AC inverter.

Furthermore, in the wind power generation system including the apparatus for driving converters in a wind power generation system according to an embodiment of the present disclosure, the DC link includes a capacitor.

An apparatus for controlling converters in a wind power generation system according to an embodiment of the present disclosure may include a converter driving unit configured to drive a converter having the smallest accumulated operation time or to drive a converter having a next sequence of a converter finally driven based on the set operation sequence of a plurality of converters if any one of the plurality of converters connected in parallel between a generator and a grid is to be driven.

Furthermore, the apparatus for controlling converters in a wind power generation system according to an embodiment of the present disclosure further includes an accumulated operation time calculation unit configured to calculate an accumulated operation time of each of the plurality of converters. The converter driving unit drives a converter having the smallest accumulated operation time if any one of the plurality of converters is to be driven.

Furthermore, in the apparatus for controlling converters in a wind power generation system according to an embodiment of the present disclosure, the converter driving unit stops the operation of a converter having the greatest accumulated operation time if the operation of any one of one or more converters being driven is to be stopped.

Furthermore, in the apparatus for controlling converters in a wind power generation system according to an embodiment of the present disclosure, the accumulated operation time calculation unit calculates an accumulated operation time of each of a plurality of switching element modules included in a converter. If any one of a plurality of switching element modules included in the converter having the smallest accumulated operation time and connected in parallel is to be driven, the converter driving unit drives a switching element module having the smallest accumulated operation time.

Furthermore, in the apparatus for controlling converters in a wind power generation system according to an embodiment of the present disclosure, if the operation of any one of one or more switching element modules being driven is to be stopped, the converter driving unit stops the operation of a switching element module having the greatest accumulated operation time.

Furthermore, the apparatus for controlling converters in a wind power generation system according to an embodiment of the present disclosure further includes a sequence setting unit configured to set an operation sequence of the plurality of converters. If any one of the plurality of converters is to be driven, the converter driving unit drives a converter having a next sequence of a converter finally driven based on the set operation sequence of the converters.

Furthermore, in the apparatus for controlling converters in a wind power generation system according to an embodiment of the present disclosure, the sequence setting unit sets an operation stop sequence of one or more converters being driven. If the operation of any one of the one or more converters being driven is to be stopped, the converter driving unit stops the operation of a converter having a next sequence of a converter whose operation has been finally stopped based on the set operation stop sequence of the one or more converters.

Furthermore, in the apparatus for controlling converters in a wind power generation system according to an embodiment of the present disclosure, the sequence setting unit sets the operation sequence of a plurality of switching element modules included in a converter. If any one of a plurality of switching element modules which is included in a converter having a next sequence of a converter finally driven and which is connected in parallel is to be driven based on the set operation sequence of the converters, the converter driving unit drives a switching element module having a next sequence of a switching element module finally driven based on the set operation sequence of the plurality of switching element modules.

Furthermore, in the apparatus for controlling converters in a wind power generation system according to an embodiment of the present disclosure, the sequence setting unit sets an operation stop sequence of one or more switching element modules being driven. If the operation of any one of the one or more switching element modules being driven is to be stopped, the converter driving unit stops the operation of the switching element module having a next sequence of a switching element module whose operation has been finally stopped based on the set operation stop sequence of the one or more switching element modules.

An apparatus for driving switching element modules in a wind power generation system according to an embodiment of the present disclosure may include a switching element module control unit configured to drive a plurality of switching element modules which is included in a converter connected between a generator and a grid and which is connected in parallel, wherein the switching element module control unit sequentially drives the switching element modules one by one when output power of the converter increases and sequentially stops the operations of the switching element modules one by one when output power of the converter decreases.

Furthermore, in the apparatus for driving switching element modules in a wind power generation system according to an embodiment of the present disclosure, the switching element module control unit may includes a switching element module capacity calculation unit configured to calculate each switching element module capacity based on each converter capacity and the number of switching element modules, a switching element module operation capacity calculation unit configured to calculate each switching element module operation capacity based on each calculated switching element module capacity and switching element module operation capacity ratio, and a switching element module driving unit configured to drive a switching element module of a next sequence when the current capacity of a switching element module which belongs to switching element modules being driven and which has the last sequence exceeds a corresponding switching element module operation capacity.

Furthermore, in the apparatus for driving switching element modules in a wind power generation system according to an embodiment of the present disclosure, the switching element module control unit further includes a switching element module operation stop capacity calculation unit configured to calculate each switching element module operation stop capacity based on each calculated switching element module capacity and switching element module operation stop capacity ratio. When the capacity of a switching element module which belongs to switching element modules being driven and which has the last sequence exceeds a corresponding switching element module operation stop capacity and becomes the switching element module operation stop capacity or less, the switching element module driving unit stops the operation of the switching element module belonging to the switching element modules and having the last sequence at a point of time at which the capacity of the switching element module belonging to the switching element modules and having the last sequence exceeds the converter operation stop capacity and becomes the converter operation stop capacity or less.

Furthermore, in the apparatus for driving switching element modules in a wind power generation system according to an embodiment of the present disclosure, the switching element module operation capacity ratio and the switching element module operation stop capacity ratio are different.

Furthermore, in the apparatus for driving switching element modules in a wind power generation system according to an embodiment of the present disclosure, the switching element module capacity calculation unit calculates the converter capacity by dividing the rating capacity of the grid by the number of converters and calculates the switching element module capacity by dividing the calculated converter capacity by the number of switching element modules.

Furthermore, in the apparatus for driving switching element modules in a wind power generation system according to an embodiment of the present disclosure, the switching element module capacity calculation unit drives a converter having a next sequence if the current capacity of a switching element module which belongs to switching element modules included in a converter being driven and which has the last sequence exceeds a corresponding switching element module operation capacity.

An apparatus for controlling switching element modules in a wind power generation system according to an embodiment of the present disclosure may include a switching element module driving unit configured to turn on/off a plurality of switching element modules which is included in a converter connected between a generator and a grid and which is connected in parallel, wherein the switching element module driving unit drives the plurality of switching element modules so that the switching element modules have a phase difference.

Furthermore, in the apparatus for controlling switching element modules in a wind power generation system according to an embodiment of the present disclosure, the phase difference may be a constant phase difference.

Furthermore, the apparatus for controlling switching element modules in a wind power generation system according to an embodiment of the present disclosure further includes a phase difference calculation unit configured to calculate a value calculated by dividing 360 degrees by the number of plurality of switching element modules included in a single converter and connected in parallel as the phase difference. The switching element module driving unit drives the plurality of switching element modules so that the switching element modules have the calculated phase difference.

Furthermore, the apparatus for controlling switching element modules in a wind power generation system according to an embodiment of the present disclosure further includes one or more converters including one or more switching element modules. The one or more switching element modules include an AC/DC converter configured to comprise 6 switching elements, a DC link connected in parallel to the AC/DC converter, and a DC/AC inverter configured to comprise 6 switching elements and connected in parallel to the DC link.

DETAILED DESCRIPTION

Figure 1:
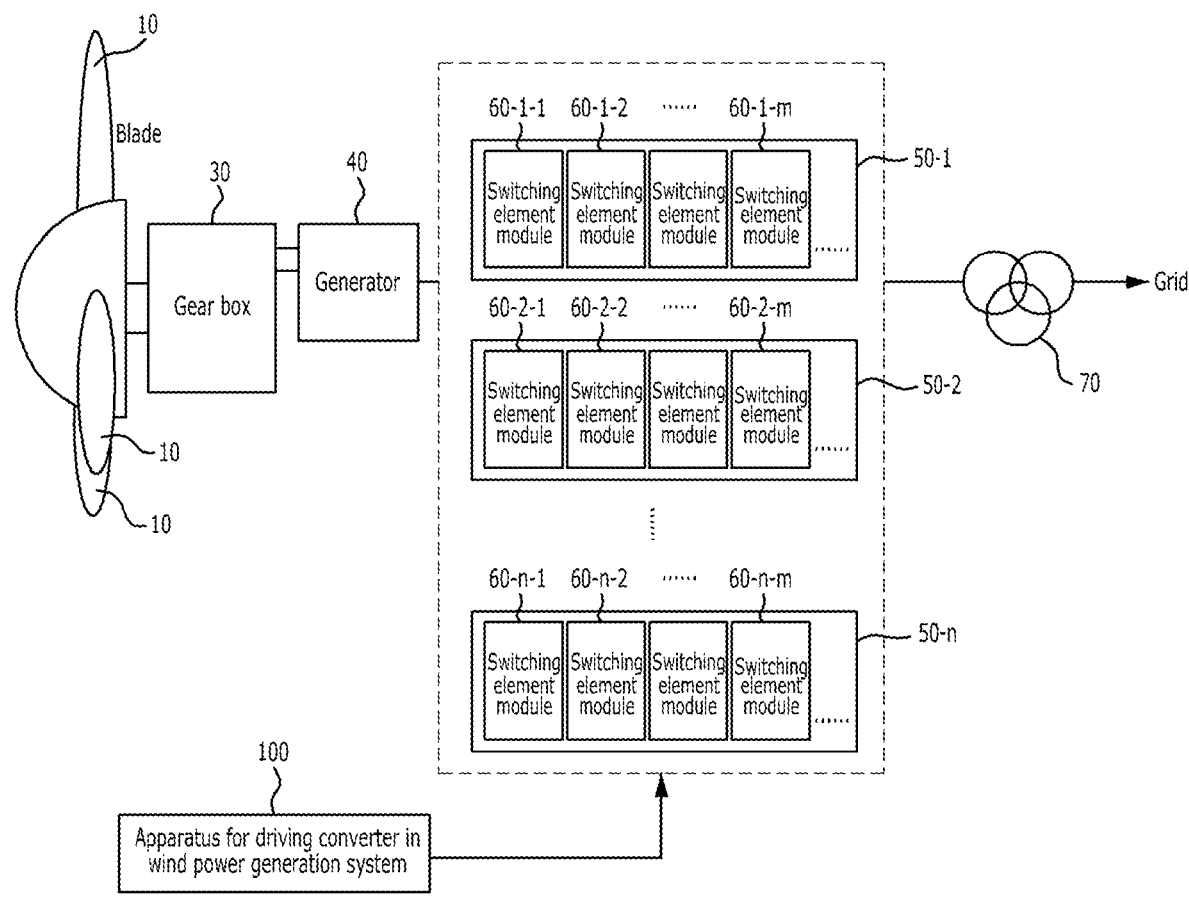
FIG. 1 shows a configuration of a wind power generation system.

The aforementioned aspects and additional aspects may be realized through embodiments to be described with reference to the accompanying drawings. The elements of each of the elements are construed as being capable of being combined in various ways within one embodiment unless they are otherwise described or unless they contradict each other. Furthermore, the proposed method may be implemented in various other forms, but is not limited to the embodiments described herein.

In the drawings, in order to clarify the description, a description of parts not related to the description is omitted, and similar reference numbers are used throughout the specification to refer to similar parts. Furthermore, when it is said that one element "include (or comprise)" the other element, this will be understood to imply the inclusion of a stated element but not the exclusion of any other elements, unless explicitly described to the contrary.

Furthermore, throughout the specification, when it is described that one element is "connected" to the other element, the one element may be "directly connected" to the other element or may be "electrically connected" to the other element through a third element. Furthermore, a signal may refer to the amount of electricity, such as a voltage or current.

The term "unit" described in the specification may refer to a "block configured so that a hardware or software system can be changed or plugged in", and includes a single unit or block performing a specific function in hardware or software.

FIGS. 1 to 4 show an apparatus for driving converters in a wind power generation system according to an embodiment of the present disclosure.

FIG. 1 shows a configuration of the wind power generation system.

The wind power generation system includes a blade 10, a gear box 30, a generator 40, a plurality of converters 50-1, 50-2, . . . , 50-n, a transformer 70 and an apparatus 100 for driving a converter in the wind power generation system.

In one embodiment, the blade 10 generates kinetic energy through rotation attributable to wind energy. That is, the blade 10 is a machine for converting energy of a fluid, such as water, gas or vapor, into a mechanical work. The blade 10 may be implemented in a direction vertical or horizontal to the ground, and includes one or more wings.

In one embodiment, the gear box 30 is disposed between the blade 10 and the rotor of the generator 40 to be described later. The gear box 30 functions to increase the speed of revolution of the rotor of the generator 40 when the velocity of the wind is low and thus the speed of revolution of the blade 10 is low.

In one embodiment, the generator 40 generates electricity using rotatory power after the rotor converts energy of a fluid into the rotatory power. That is, the generator 40 is an apparatus for converting mechanical energy into electric energy. A synchronizer or inductor is chiefly used as the generator 40. The synchronizer may be divided into a winding field type and a permanent magnet type depending on the type of a field. The inductor may be divided into a squirrel type and a winding type depending on the structure of the rotor. More specifically, the winding type inductor, the winding type induction generator 40 or the induction generator 40 may be installed on the place in which the velocity of the wind is variable.

In one embodiment, the converters 50-1, 50-2, . . . , 50-n include an AC/DC converter, a DC/AC inverter, and a DC link connecting the AC/DC converter and the DC/AC inverter. The converters 50-1, 50-2, . . . , 50-n are connected in parallel between the generator 40 and the transformer 70. FIG. 1 illustrates the n converters 50-1, 50-2, . . . , 50-n that are connected in parallel.

The AC/DC converter converts three-phase AC power, output by the generator 40, into a DC form. The DC/AC inverter converts the converted DC power into AC power suitable to be used for the grid side. The DC link is connected in parallel to the AC/DC converter and the DC/AC inverter, and may send energy between the AC/DC converter and the DC/AC inverter. The DC link may be implemented using a capacitor, but any device capable of charging and discharging energy may be used as the DC link. FIG. 1 discloses a plurality of converters connected in parallel, but the present disclosure is not limited thereto. Only a single converter may be used.

In one embodiment, the converters 50-1, 50-2, . . . , 50-n include one or more switching element modules 60-1-1, 60-1-2, 60-1-m, 60-2-1, 60-2-2, 60-2-m and 60-n-1, 60-n-2, 60-n-m. FIG. 1 illustrates m switching element modules 60-1-1, 60-1-2, 60-1-m, 60-2-1, 60-2-2, 60-2-m and 60-n-1, 60-n-2, 60-n-m that are included in the converters 50-1, 50-2, . . . , 50-n, respectively, and that are connected in parallel. The AC/DC converter includes 6 switching elements, and the DC/AC inverter also includes 6 switching elements. The switching element is a transistor, and may include at least one of semiconductor switching elements, such as gate turnoff thyristors (GTO), an insulated gate bipolar transistors (IGBT), integrated gate commutated thyristors (IGCT), bipolar junction transistors (BJT) and metal oxide semiconductor field effect transistors (MOSFET).

AC power output by the generator 40 is three-phase AC power. Each of the three phases is connected to the two switching elements of the AC/DC converter. Each phase in the three-phase AC power supplied to a grid is connected to the two switching elements of the DC/AC inverter. That is, two of the 6 switching elements of the AC/DC converter operate so that an electric current flows into one phase. Two of the 6 switching elements of the DC/AC inverter operate so that an electric current flows into one phase.

In one embodiment, the switching element modules 60-1-1, 60-1-2, 60-1-m, 60-2-1, 60-2-2, 60-2-m and 60-n-1, 60-n-2, 60-n-m include the 6 switching elements of the AC/DC converter, the 6 switching elements of the DC/AC converter, and the DC link. A plurality of switching element modules of the switching element modules 60-1-1, 60-1-2, 60-1-m, 60-2-1, 60-2-2, 60-2-m and 60-n-1, 60-n-2, 60-n-m is connected in parallel to form each of the converters 50-1, 50-2, . . . , 50-n.

In one embodiment, the transformer 70 is a part for changing a voltage or current value of an AC using an electromagnetic induction phenomenon, and is connected to the grid. In this case, the grid may refer to a power grid associated with the wind power generation system.

Figure 2:
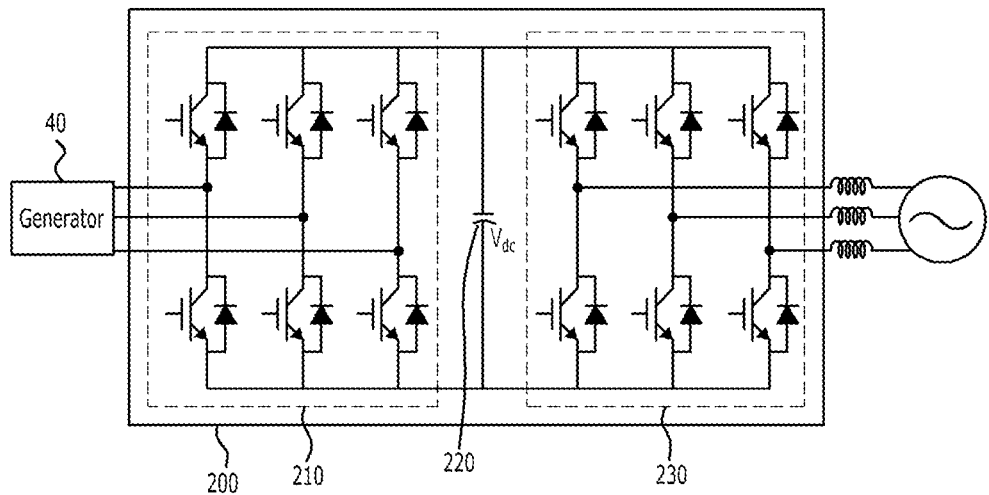
FIG. 2 shows the configuration of a switching element module according to an embodiment.

FIG. 2 shows the configuration of a switching element module 200 according to an embodiment. Each of the switching element modules 60-1-1, 60-1-2, 60-1-m, 60-2-1, 60-2-2, 60-2-m and 60-n-1, 60-n-2, 60-n-m shown in FIG. 1 has the same detailed configuration as the switching element module 200 of FIG. 2. The switching element module 200 includes the 6 switching elements of an AC/DC converter 210, the 6 switching elements of a DC/AC inverter 230, and a DC link 220. The AC/DC converter 210 converts AC power, output by the generator, into DC form. The DC/AC inverter 230 converts the converted DC power into an AC form and transfers it to the grid side. A configuration for converting the AC power into the DC power or a configuration for converting the DC power into the AC power is evident to those skilled in the art.

Power supplied to the grid is three-phase AC power. In order for any one (e.g., AC power) of the three phases to be supplied to the grid, two of the 6 switching elements of the AC/DC converter 210 may be turned on and two of the 6 switching elements of the DC/AC inverter 230 may be turned on. Such a characteristic is evident to a person having ordinary skill in the converter field.

Figure 3:
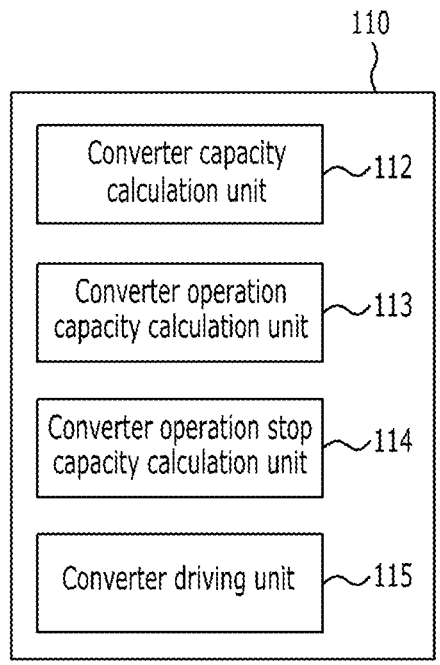
FIG. 3 shows the configuration of an apparatus for driving converters in a wind power generation system according to an embodiment.

FIG. 3 shows the configuration of an apparatus for driving converters in a wind power generation system according to an embodiment.

In one aspect, the apparatus 100 for driving a converter in the wind power generation system includes a converter control unit 110.

In one embodiment, the converter control unit 110 drives the plurality of converters 50-1, 50-2, . . . , 50-n connected in parallel between the generator and the grid. In this case, the converter control unit 110 sequentially drives the converters one by one when output power of the grid increases and sequentially stops the operation of the converters one by one when output power of the grid decreases. As shown in FIG. 1, the plurality of converters 50-1, 50-2, . . . , 50-n is connected in parallel between the generator and the grid.

Power may be supplied to the grid when the wind does not blow and starts to blow and thus the blade is rotated. At this time, when the wind blows gradually strongly, the converter control unit 110 further drives a new converter one by one in response to increased power supplied to the grid. For example, the converter control unit 110 drives the converter 50-1 when the wind first blows and sequentially drives the converter 50-2, . . . , the converter 50-n when the wind becomes stronger.

Accordingly, the apparatus for driving converters in a wind power generation system can reduce output power supplied to a grid versus power consumed by a converter by further sequentially driving the converters one by one when output power supplied to the grid increases in accordance with the velocity of the wind.

The speed of revolution of the blade is decreased when the velocity of the wind is gradually reduced from the state in which the wind blows strongly. Accordingly, the amount of power supplied to the grid is also reduced. When the amount of power supplied to the grid is reduced, the converter control unit 110 stops the operation of any one of the one or more converters. For example, when the wind blows at the highest speed, maximum rating power is supplied to the grid, and thus all of the converters 50-1 to 50-n are driven, if the velocity of the wind is gradually reduced, the converter control unit 110 first stops the operation of the converter 50-n. If power supplied to the grid is subsequently reduced because the velocity of the wind is gradually decreased, the converter control unit 110 sequentially stops the operation of the converters in order of a converter 50-n-1, . . . , a converter 50-1.

The apparatus for driving converters in a wind power generation system can reduce output power supplied to a grid versus power consumed by a converter by sequentially stopping the operation of the converters when output power supplied to the grid decreases in accordance with the velocity of the wind.

Driving a converter refers to a switching element module included in the converter being turned on. This refers to power of three phases transferred from the generator to the grid by turning on/off 12 switches included in the switching element module. In order to transfer the power of the three phases to the grid so that it has a difference of 120 degrees, which one of the 12 switching elements included in the switching element module is required and when the switching elements have to be turned on/off are evident to a person having ordinary skill in the converter field.

In one embodiment, the converter control unit 110 includes a converter capacity calculation unit 112, a converter operation capacity calculation unit 113 and a converter driving unit 115.

In one embodiment, the converter capacity calculation unit 112 calculates a converter capacity based on the rating capacity of the grid and the number of converters. The rating capacity of the grid refers to the greatest power which may be supplied to the grid. When the wind becomes strong, power that may be supplied to the grid is gradually increased. Power exceeding the rating capacity, that is, the greatest power, cannot be supplied to the grid.

The number of converters is the number of converters 50-1, 50-2, . . . , 50-n connected in parallel between the generator and the grid. In the example of FIG. 1, the number of converters 50-1, 50-2, . . . , 50-n connected in parallel has been illustrated as being "n."

The converter capacity calculation unit 112 calculates each converter capacity by dividing the rating capacity of the grid by the number of converters. If the rating capacity of the grid is 3 MW and the number of converters is n, the converter capacity calculation unit 112 calculates 3 MW/n as each converter capacity. If 3 MW, that is, the rating capacity of the grid, is supplied to the grid, power transferred from each of the n converters to the grid is 3 MW/n.

In one embodiment, the converter operation capacity calculation unit 113 calculates each converter operation capacity based on each calculated converter capacity and each converter operation capacity ratio. Each converter capacity is calculated by the converter capacity calculation unit 112, and a detailed process for calculating a converter capacity has been described above. The converter operation capacity calculation unit 113 may calculate each converter operation capacity by multiplying each calculated converter capacity by a converter operation capacity ratio.

The converter operation capacity ratio may be freely set depending on the rating capacity of the grid and/or the rating capacity of each converter, and a detailed numerical value thereof is described later. The converter operation capacity is power, that is, a criterion by which a converter having a next sequence is driven. For example, whether a converter having a next sequence will be newly driven is determined depending on whether the capacity of a converter that belongs to converters being driven and that has the last sequence exceeds a converter operation capacity.

In one embodiment, the converter driving unit 115 drives a converter having a next sequence if the current capacity of a converter that belongs to converters being driven and that has the last sequence exceeds a converter operation capacity. The converter being driven may refer to a converter that belongs to the converters connected between the generator and the grid and that supplies three-phase AC power toward the grid.

The converter that belongs to the converters being driven and that has the last sequence is a converter that belongs to the converters of FIG. 1 and that has the greatest number. In the state in which all of the converters are being driven, for example, the converter 50-n is the converter of the last sequence. The current capacity of the converter refers to the amount of power now transferred from the converter toward the grid. A process for calculating a value, calculated by the converter operation capacity calculation unit, as a converter operation capacity has been described above.

That is, the converter driving unit 115 drives a converter having a next sequence when the amount of power now transferred from a converter having the last sequence toward the grid exceeds a converter operation capacity. For example, if only the converter 50-1 is being driven and the amount of power now transferred from the converter 50-1 toward the grid exceeds a converter operation capacity, the converter driving unit 115 drives the converter 50-2. The aforementioned operating method is applied to all of the converters.

In one embodiment, the converter control unit 110 further includes a converter operation stop capacity calculation unit 114.

In one embodiment, the converter operation stop capacity calculation unit 114 calculates each converter operation stop capacity based on each calculated converter capacity and each converter operation stop capacity ratio. The converter capacity calculation unit 112 calculates each converter capacity by dividing the rating capacity of the grid by the number of converters. The converter operation stop capacity ratio may be freely set depending on the rating capacity of the grid and/or the rating capacity of each converter, but a detailed numerical value thereof is described later.

The converter operation stop capacity is power, that is, a criterion by which the operation of a converter that belongs to converters being driven and that has the last sequence is stopped. For example, whether or not to stop the operation of a converter that is being driven and has the last sequence is determined depending on whether the capacity of the converter that belongs to converters being driven and that has the last sequence is a converter operation capacity or less.

In one embodiment, when the capacity of a converter that belongs to converters being driven and has the last sequence exceeds a converter operation stop capacity and then becomes the converter operation stop capacity or less, the converter driving unit 115 stops the operation of the converter that belongs to the converters being driven and has the last sequence at a point of time at which the capacity of the converter that belongs to the converters being driven and has the last sequence exceeds the converter operation stop capacity and becomes the converter operation stop capacity or less.

The converter driving unit 115 stops the operation of a converter that belongs to converters being driven and has the last sequence if the capacity of the converter that belongs to the converters being driven and has the last sequence exceeds a converter operation stop capacity and then becomes the converter operation stop capacity or less. If a converter operation capacity is less than a converter operation stop capacity, the capacity of a converter that belongs to converters being driven and has the last sequence is greater than the converter operation capacity, but may be smaller than the converter operation stop capacity.

In this case, when the capacity of the converter having the last sequence gradually increases and exceeds the converter operation capacity, the converter driving unit 115 drives a converter having a next sequence.

More specifically, for example, if a converter having the last sequence is the converter 50-2, when the capacity of the converter 50-2, that is, a converter having the last sequence, gradually increases in accordance with an increase of the velocity of the wind and exceeds a converter operation capacity, the converter driving unit 115 drives the converter 50-3, that is, a converter having a next sequence.

In the case where the capacity of a converter that is being driven and has the last sequence gradually increases, exceeds a converter operation stop capacity, and then becomes smaller than the converter operation stop capacity, the capacity of the converter that belongs to converters being driven and has the last sequence is greater than the converter operation capacity, but may be smaller than the converter operation stop capacity. In this case, the operation of the converter that is being driven and has the last sequence is stopped.

If the capacity of the converter that is being driven and has the last sequence gradually increases, exceeds the converter operation stop capacity and then becomes smaller than the converter operation stop capacity, the operation of the converter that is being driven and has the last sequence is stopped. If the capacity of a converter having a sequence anterior to that of the stopped converter increases any further, the converter driving unit 115 drives the stopped converter again.

More specifically, for example, assuming that a converter that is being driven and has the last sequence is the converter 50-2, when the capacity of the converter gradually increases, exceeds a converter operation stop capacity and then becomes smaller than the converter operation stop capacity, the operation of the converter 50-2, that is, the converter that is being driven and has the last sequence, is stopped. If the capacity of the converter 50-1 that is a converter having a sequence anterior to that of the converter 50-2, that is, the stopped converter, increases any further because the wind becomes strong, the converter driving unit 115 drives the converter 50-2, that is, the stopped converter, again.

In one embodiment, the converter operation capacity ratio and the converter operation stop capacity ratio are different. The converter operation capacity ratio and the converter operation stop capacity ratio have been described above.

The apparatus for driving converters in a wind power generation system can reduce output power supplied to a grid versus power consumed by a converter by making different a criterion by which another converter is newly driven in response to the increase of output power supplied to the grid and a criterion by which the operation of a converter that is being driven is stopped in response to the decrease of output power supplied to the grid.

In one embodiment, the converter operation capacity ratio is smaller than the converter operation stop capacity ratio.

If a converter operation capacity is smaller than a converter operation stop capacity, the capacity of a converter that belongs to converters being driven and has the last sequence is greater than the converter operation capacity, but may be smaller than the converter operation stop capacity.

In this case, when the capacity of the converter having the last sequence gradually increases and exceeds the converter operation capacity, the converter driving unit 115 drives a converter having a next sequence.

Even in the case where the capacity of a converter that is being driven and has the last sequence gradually increases, exceeds a converter operation stop capacity and then becomes smaller than the converter operation stop capacity, the capacity of the converter that belongs to converters being driven and has the last sequence is greater than the converter operation capacity, but may be smaller than the converter operation stop capacity. In this case, the operation of the converter that is being driven and has the last sequence is stopped.

When the capacity of a converter that is being driven and has the last sequence gradually increases, exceeds a converter operation stop capacity and then becomes smaller than the converter operation stop capacity, the operation of the converter that is being driven and has the last sequence is stopped. If the capacity of a converter having a sequence anterior to that of the stopped converter increases any further because the wind becomes strong again, the converter driving unit 115 drives the stopped converter again.

More specifically, for example, assuming that a converter that is being driven and has the last sequence is the converter 50-2, when the capacity of the converter gradually increases, exceeds a converter operation stop capacity and then becomes smaller than the converter operation stop capacity, the operation of the converter 50-2, that is, the converter that is being driven and has the last sequence, is stopped. If the capacity of the converter 50-1, that is, a converter having a sequence anterior to that of the converter 50-2 that is the stopped converter, increases any further because the wind becomes strong again, the converter driving unit 115 drives the converter 50-1, that is, the stopped converter, again.

The apparatus for driving converters in a wind power generation system can reduce output power supplied to a grid versus power consumed by a converter by making different a criterion by which another converter is newly driven in response to the increase of output power supplied to the grid and a criterion by which the operation of a converter being driven is stopped in response to the decrease of output power supplied to the grid.

In one embodiment, the converter operation capacity ratio is 90~110%. If the rating capacity of a grid is 3 MW and the number of converters is n, the converter capacity calculation unit 112 calculates 3 MW/n as each converter capacity. The converter operation capacity calculation unit 113 calculates a converter operation capacity as (3 MW*0.9)/n~(3 MW*1.1)/n. In this case, the converter operation capacity may be (3 MW*1.1)/n, that is, a maximum value.

In this case, when the capacity of a converter that is being driven exceeds (3 MW*1.1)/n, a converter that belongs to converters being driven and that has the last sequence is newly driven. The capacity of the converter being driven exceeding (3 MW*1.1)/n refers to the capacity of each of the converters that are being driven exceeds (3 MW*1.1)/n. A value calculated by dividing current power supplied to a grid by the number of converters is power transferred from each of the converters being driven to the grid.

In one embodiment, the converter operation stop capacity ratio is 110~120%. If the rating capacity of a grid is 3 MW and the number of converters is n, the converter capacity calculation unit 112 calculates 3 MW/n as each converter capacity. The converter operation stop capacity calculation unit 114 calculates (3 MW*1.1)/n~(3 MW*1.2)/n as each converter operation stop capacity. In this case, the converter operation stop capacity may be (3 MW*1.2)/n, that is, a maximum value.

In this case, when the capacity of a converter being driven exceeds (3 MW*1.2)/n and then becomes (3 MW*1.2)/n or less, the operation of a converter that belongs to converters being driven and that has the last sequence is stopped. The capacity of the converter being driven becoming smaller than (3 MW*1.2)/n refers to the capacity of each of the converters being driven becomes smaller than (3 MW*1.2)/n. A value calculated by dividing current power supplied to a grid by the number of converters is power transferred from each of converters being driven to a grid.

In one aspect, a wind power generation system including the apparatus for driving converters in a wind power generation system may further include a converter, including an AC/DC converter, a DC/AC inverter connected in parallel to the AC/DC converter, and a DC link connected between the AC/DC converter and the DC/AC inverter. Referring to FIG. 2, the AC/DC converter and the DC/AC inverter are connected in parallel, and the DC link is connected between the AC/DC converter and the DC/AC inverter.

In one aspect, the DC link may be a capacitor. Referring to FIG. 2, the DC link includes a capacitor.

Figure 4:
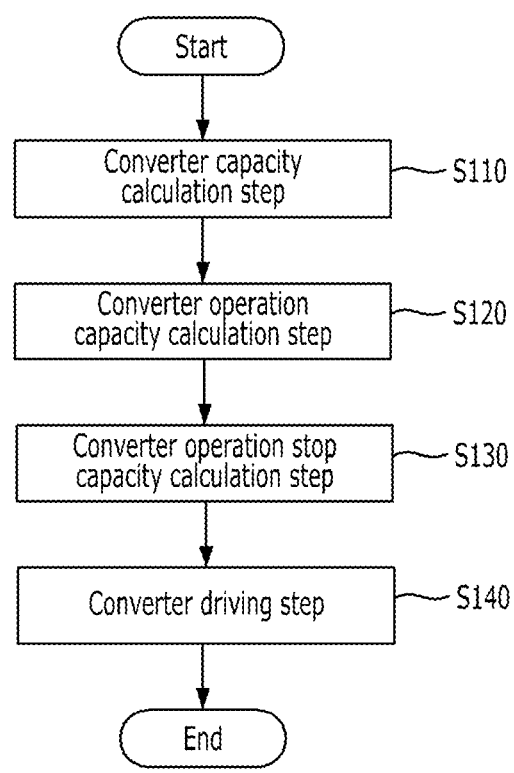
FIG. 4 shows a flow of a method for driving the converters of the wind power generation system according to an embodiment.

FIG. 4 shows a flow of a method for driving the converters of the wind power generation system according to an embodiment.

In one aspect, the method for driving the converters of the wind power generation system includes a converter control step.

In one embodiment, the converter control step includes driving the plurality of converters 50-1, 50-2, . . . , 50-$n$ connected in parallel between the generator and the grid, sequentially driving the converters one by one when output power of a grid increases, and sequentially stops the operation of the converters one by one when output power of the grid decreases. As shown in FIG. 1, the plurality of converters 50-1, 50-2, . . . , 50-$n$ are connected in parallel between the generator and the grid. When the wind does not blow and starts to blow and thus the blade is rotated, power may be supplied to the grid. At this time, in the converter control step, when the wind blows gradually strongly, a new converter is further driven one by one in response to increased power supplied to the grid. For example, the converter control step includes driving the converter 50-1 when the wind first blows and sequentially driving the converter 50-2, . . . , the converter 50-$n$ when the wind becomes stronger.

Accordingly, the converter control step of the wind power generation system can reduce output power supplied to a grid versus power consumed by a converter by sequentially driving the converters one by one when output power supplied to the grid increases in accordance with the velocity of the wind.

When the velocity of the wind is gradually reduced from the state in which the wind blows strongly and the speed of revolution of the blade is decreased. Accordingly, the amount of power supplied to a grid is also reduced. The converter control step includes sequentially stopping the operation of any one of one or more converters being driven when the amount of power supplied to the grid is reduced. For example, if the wind blows at the highest speed, maximum rating power is supplied to the grid and thus all of the converters 50-$n$ are being driven, when the velocity of the wind gradually decreases, the operation of the converter 50-$n$ is first stopped in the converter control step. If power supplied to the grid continues to be reduced because the velocity of the wind gradually decreases, in the converter control step, the operation of the converters is sequentially stopped in order of the converter 50-$n$-1, . . . , the converter 50-1.

The converter control step of the wind power generation system can reduce output power supplied to a grid versus power consumed by a converter by sequentially stopping the operation of converters when output power supplied to the grid decreases in accordance with the velocity of the wind.

Operating (or driving) a converter may refer to a switching element module included in the converter being turned on. This refers to power of three phases is transferred from the generator to the grid by turning on/off 12 switches included in the switching element module. In order to transfer the power of the three phases to the grid so that it has a difference of 120 degrees, which one of the 12 switching elements included in the switching element module is required and when the switching elements have to be turned on/off are evident to a person having ordinary skill in the converter field.

In one embodiment, the converter control step includes a converter capacity calculation step S110, a converter operation capacity calculation step S120 and a converter driving step S140.

In one embodiment, the converter capacity calculation step S110 includes calculating a converter capacity based on the rating capacity of the grid and the number of converters. The rating capacity of the grid refers to the greatest power which may be supplied to the grid. When the wind becomes strong, power that may be supplied to the grid is gradually increased. Power exceeding the rating capacity, that is, the greatest power, cannot be supplied to the grid.

The number of converters is the number of converters 50-1, 50-2, . . . , 50-n connected in parallel between the generator and the grid. In the example of FIG. 1, the number of converters 50-1, 50-2, . . . , 50-n connected in parallel has been illustrated as being "n."

The converter capacity calculation step S110 includes calculating each converter capacity by dividing the rating capacity of the grid by the number of converters. In the converter capacity calculation step S110, if the rating capacity of the grid is 3 MW and the number of converters is n, 3 MW/n is calculated as each converter capacity. If 3 MW, that is, the rating capacity of the grid, is supplied to the grid, power transferred from each of the n converters to the grid is 3 MW/n.

In one embodiment, the converter operation capacity calculation step S120 includes calculating each converter operation capacity based on each calculated converter capacity and a converter operation capacity ratio. Each converter capacity is calculated in the converter capacity calculation step S110, and a detailed process for calculating a converter capacity has been described above. The converter operation capacity calculation step S120 may include calculating each converter operation capacity by multiplying each calculated converter capacity by a converter operation capacity ratio. Each converter operation capacity ratio may be freely set depending on the rating capacity of the grid and/or the rating capacity of each converter, and a detailed numerical value thereof is described later. The converter operation capacity is power, that is, a criterion by which a converter having a next sequence is driven. For example, whether a converter having a next sequence will be newly driven is determined depending on whether the capacity of a converter that belongs to converters being driven and that has the last sequence exceeds a converter operation capacity.

In one embodiment, the converter driving step S140 includes drive a converter having a next sequence if the current capacity of a converter that belongs to converters being driven and that has the last sequence exceeds a converter operation capacity. The converter being driven may refer to a converter that belongs to the converters connected between the generator and the grid and that supplies three-phase AC power toward the grid. The converter that belongs to the converters being driven and that has the last sequence is a converter that belongs to the converters of FIG. 1 and that has the greatest number.

In the state in which all of the converters are being driven, for example, the converter 50-n is the converter of the last sequence. The current capacity of the converter refers to the amount of power now transferred from the converter toward the grid. A process for calculating a value, calculated by the converter operation capacity calculation unit, as a converter operation capacity has been described above.

That is, the converter driving step S140 includes driving a converter having a next sequence when the amount of power now transferred from a converter having the last sequence toward the grid exceeds a converter operation capacity. For example, in the converter driving step S140, if only the converter 50-1 is being driven and the amount of power now transferred from the converter 50-1 toward the grid exceeds a converter operation capacity, the converter 50-2 is driven. The aforementioned operating method is applied to all of the converters.

In one embodiment, the converter control step further includes a converter operation stop capacity calculation step S130.

In one embodiment, the converter operation stop capacity calculation step S130 includes calculating a converter operation stop capacity based on a calculated converter capacity and a operation stop capacity ratio. The converter capacity calculation step S110 includes calculating a converter capacity by dividing the rating capacity of the grid by the number of converters. The converter operation stop capacity ratio may be freely set depending on the rating capacity of the grid and/or the rating capacity of each converter, but a detailed numerical value thereof is described later. The converter operation stop capacity is power, that is, a criterion by which the operation of a converter that belongs to converters being driven and that has the last sequence is stopped.

For example, whether or not to stop the operation of a converter that is being driven and has the last sequence is determined depending on whether the capacity of the converter that belongs to converters being driven and that has the last sequence is a converter operation capacity or less.

In one embodiment, in the converter driving step S140, when the capacity of a converter that belongs to converters being driven and has the last sequence exceeds a converter operation stop capacity and then becomes the converter operation stop capacity or less, the operation of the converter that belongs to the converters being driven and has the last sequence is stopped at a point of time at which the capacity of the converter that belongs to the converters being driven and has the last sequence exceeds the converter operation stop capacity and becomes the converter operation stop capacity or less.

The converter driving step S140 includes stopping the operation of a converter that belongs to converters being driven and has the last sequence if the capacity of the converter that belongs to the converters being driven and has the last sequence exceeds a converter operation stop capacity and then becomes the converter operation stop capacity or less. If each converter operation capacity is less than a corresponding converter operation stop capacity, the capacity of a converter that belongs to converters being driven and has the last sequence is greater than a corresponding converter operation capacity, but may be smaller than a corresponding converter operation stop capacity.

In this case, in the converter driving step S140, when the capacity of the converter having the last sequence gradually increases and exceeds the converter operation capacity, a converter having a next sequence is driven.

More specifically, in the converter driving step S140, for example, if a converter having the last sequence is the converter 50-2, when the capacity of the converter 50-2, that is, a converter having the last sequence, gradually increases in accordance with an increase of the velocity of the wind and exceeds a converter operation capacity, the converter 50-3, that is, a converter having a next sequence, is driven.

If the capacity of a converter being driven and having the last sequence gradually increases, exceeds a corresponding converter operation stop capacity, and then becomes smaller than the converter operation stop capacity, the capacity of a converter that belongs to converters being driven and has the last sequence is greater than a corresponding converter operation capacity, but may be smaller than a corresponding converter operation stop capacity. In this case, the operation of the converter being driven and having the last sequence is stopped.

If the capacity of the converter that is being driven and has the last sequence gradually increases, exceeds the converter operation stop capacity and then becomes smaller than the converter operation stop capacity, the operation of the converter that is being driven and has the last sequence is stopped. In the converter driving step S140, if the capacity of a converter having a sequence anterior to that of the stopped converter increases any further, the stopped converter is driven again.

More specifically, for example, assuming that a converter that is being driven and has the last sequence is the converter 50-2, when the capacity of the converter gradually increases, exceeds a converter operation stop capacity and then becomes smaller than the converter operation stop capacity, the operation of the converter 50-2, that is, the converter that is being driven and has the last sequence, is stopped. In the converter driving step S140, if the capacity of the converter 50-1 that is a converter having a sequence anterior to that of the converter 50-2, that is, the stopped converter, increases any further because the wind becomes strong, the converter 50-2, that is, the stopped converter, is driven again.

In one embodiment, the converter operation capacity ratio and the converter operation stop capacity ratio are different. The converter operation capacity ratio and the converter operation stop capacity ratio have been described above.

The method for driving converters in a wind power generation system can reduce output power supplied to a grid versus power consumed by a converter by making different a criterion by which another converter is newly driven in response to the increase of output power supplied to the grid and a criterion by which the operation of a converter that is being driven is stopped in response to the decrease of output power supplied to the grid.

In one embodiment, the converter operation capacity ratio is smaller than the converter operation stop capacity ratio.

If each converter operation capacity is smaller than each converter operation stop capacity, the capacity of a converter that belongs to converters being driven and that has the last sequence is greater than a corresponding converter operation capacity, but may be smaller than a corresponding converter operation stop capacity.

In this case, in the converter driving step S140, when the capacity of the converter having the last sequence gradually increases and exceeds the converter operation capacity, a converter having a next sequence is driven.

If the capacity of a converter being driven and having the last sequence gradually increases, exceeds a corresponding converter operation stop capacity and then becomes smaller than the converter operation stop capacity, the capacity of a converter that belongs to converters being driven and that has the last sequence is greater than a corresponding converter operation capacity, but may be smaller than a corresponding converter operation stop capacity. In this case, the operation of the converter being driven and having the last sequence is stopped.

When the capacity of a converter that is being driven and has the last sequence gradually increases, exceeds a converter operation stop capacity and then becomes smaller than the converter operation stop capacity, the operation of the converter that is being driven and has the last sequence is stopped. In the converter driving step S140, if the capacity of a converter having a sequence anterior to that of the stopped converter increases any further because the wind becomes strong again, the stopped converter is driven again.

More specifically, for example, assuming that a converter that is being driven and has the last sequence is the converter 50-2, when the capacity of the converter gradually increases, exceeds a converter operation stop capacity and then becomes smaller than the converter operation stop capacity, the operation of the converter 50-2, that is, the converter that is being driven and has the last sequence, is stopped. In the converter driving step S140, if the capacity of the converter 50-1, that is, a converter having a sequence anterior to that of the converter 50-2 that is the stopped converter, increases any further because the wind becomes strong again, the converter 50-1, that is, the stopped converter, is driven again.

The method for driving converters in a wind power generation system can reduce output power supplied to a grid versus power consumed by a converter by making different a criterion by which another converter is newly driven in response to the increase of output power supplied to the grid and a criterion by which the operation of a converter being driven is stopped in response to the decrease of output power supplied to the grid.

In one embodiment, the converter operation capacity ratio is 90~110%. In the converter capacity calculation step S110, if the rating capacity of a grid is 3 MW and the number of converters is n, 3 MW/n is calculated as each converter capacity. In the converter operation capacity calculation step S120, a converter operation capacity is calculated as (3 MW*0.9)/n~(3 MW*1.1)/n. In this case, the converter operation capacity may be (3 MW*1.1)/n, that is, a maximum value. In this case, when the capacity of a converter that is being driven exceeds (3 MW*1.1)/n, a converter that belongs to converters being driven and that has the last sequence is newly driven. The capacity of the converter that is being driven exceeding (3 MW*1.1)/n refers to the capacity of each of the converters that are being driven exceeding (3 MW*1.1)/n. A value calculated by dividing current power supplied to a grid by the number of converters is power transferred from each of the converters being driven to the grid.

In one embodiment, the converter operation stop capacity ratio is 110~120%. In the converter capacity calculation step S110, if the rating capacity of a grid is 3 MW and the number of converters is n, 3 MW/n is calculated as each converter capacity. In the converter operation stop capacity calculation step S130, (3 MW*1.1)/n~(3 MW*1.2)/n is calculated as each converter operation stop capacity. In this case, the converter operation stop capacity may be (3 MW*1.2)/n, that is, a maximum value. In this case, when the capacity of a converter being driven exceeds (3 MW*1.2)/n and then becomes (3 MW*1.2)/n or less, the operation of a converter that belongs to converters being driven and that has the last sequence is stopped. The capacity of the converter being driven becoming smaller than (3 MW*1.2)/n refers to the capacity of each of the converters being driven becoming smaller than (3 MW*1.2)/n. A value calculated by dividing current power supplied to a grid by the number of converters is power transferred from each of converters being driven to a grid.

FIGS. 5 to 8 show an apparatus for controlling converters in a wind power generation system according to an embodiment of the present disclosure.

Figure 5:
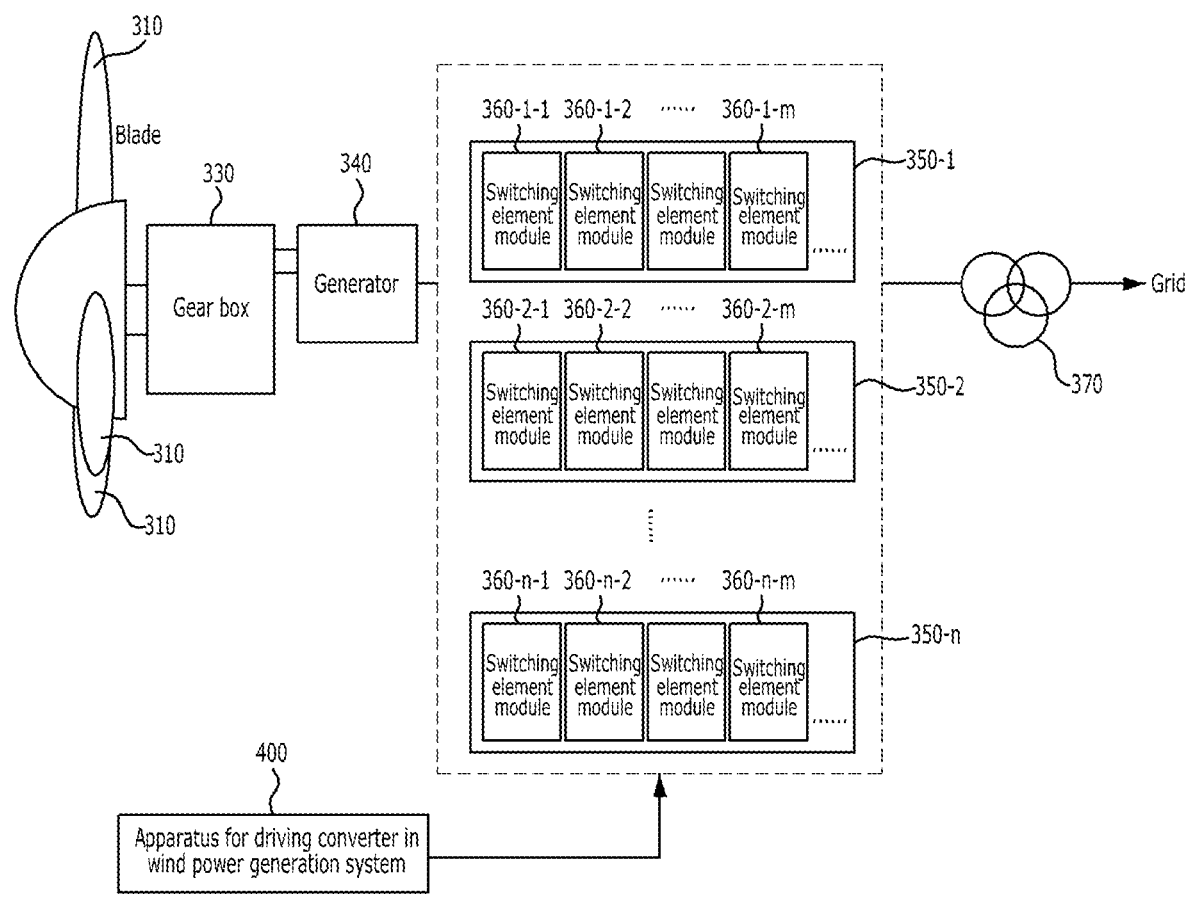
FIG. 5 shows a configuration of a wind power generation system.

FIG. 5 shows a configuration of the wind power generation system.

The wind power generation system includes a blade 310, a gear box 330, a generator 340, a plurality of converters 350-1, 350-2, . . . , 350-n, a transformer 370, and an apparatus 400 for controlling converters in a wind power generation system.

In one embodiment, the blade 310 generates kinetic energy through rotation attributable to wind energy. That is, the blade 310 is a machine for converting energy of a fluid, such as water, gas or vapor, into a mechanical work. The blade 310 may be implemented in a direction vertical or horizontal to the ground, and includes one or more wings.

In one embodiment, the gear box 330 is disposed between the blade 310 and the rotor of the generator 340 to be described later. The gear box 330 functions to increase the speed of revolution of the rotor of the generator 340 when the velocity of the wind is low and thus the speed of revolution of the blade 310 is low.

In one embodiment, the generator 340 generates electricity using rotatory power after the rotor converts energy of a fluid into the rotatory power. That is, the generator 340 is an apparatus for converting mechanical energy into electric energy. A synchronizer or inductor is chiefly used as the generator 340. The synchronizer may be divided into a winding field type and a permanent magnet type depending on the type of a field. The inductor may be divided into a squirrel type and a winding type depending on the structure of the rotor. More specifically, the winding type inductor, the winding type induction generator 340 or the induction generator 340 may be installed on the place in which the velocity of the wind is variable.

In one embodiment, the converters 350-1, 350-2, . . . , 350-n includes an AC/DC converter, a DC/AC inverter, and a DC link connecting the AC/DC converter and the DC/AC inverter. The converters 350-1, 350-2, . . . , 350-n are connected in parallel between the generator 340 and the transformer 370. FIG. 5 illustrates the n converters 350-1, 350-2, . . . , 350-n that are connected in parallel.

The AC/DC converter converts three-phase AC power, output by the generator 340, into a DC form. The DC/AC inverter converts the converted DC power into AC power suitable to be used for the grid side. The DC link is connected in parallel to the AC/DC converter and the DC/AC inverter, and may send energy between the AC/DC converter and the DC/AC inverter. The DC link may be implemented using a capacitor, but any device capable of charging and discharging energy may be used as the DC link.

In one embodiment, the converters 350-1, 350-2, . . . , 350-n include one or more switching element modules 360-1-1, 360-1-2, 360-1-m, 360-2-1, 360-2-2, 360-2-m, . . . , 360-n-1, 360-n-2, 360-n-m. FIG. 5 illustrates m switching element modules 360-1-1, 360-1-2, 360-1-m, 360-2-1, 360-2-2, 360-2-m, . . . , 360-n-1, 360-n-2, 360-n-m that are included in the converters 350-1, 350-2, . . . , 350-n, respectively, and that are connected in parallel. The AC/DC converter includes 6 switching elements, and the DC/AC inverter also includes 6 switching elements. The switching element is a transistor, and may include at least one of semiconductor switching elements, such as gate turnoff thyristors (GTO), an insulated gate bipolar transistors (IGBT), integrated gate commutated thyristors (IGCT), bipolar junction transistors (BJT) and metal oxide semiconductor field effect transistors (MOSFET).

AC power output by the generator 340 is three-phase AC power. Each of the three phases is connected to the two switching elements of the AC/DC converter. Each phase in the three-phase AC power supplied to a grid is connected to the two switching elements of the DC/AC inverter. That is, two of the 6 switching elements of the AC/DC converter operate so that an electric current flows into one phase. Two of the 6 switching elements of the DC/AC inverter operate so that an electric current flows into one phase.

In one embodiment, the switching element modules 360-1-1, 360-1-2, 360-1-m, 360-2-1, 360-2-2, 360-2-m, . . . , 360-n-1, 360-n-2, 360-n-m include the 6 switching elements of the AC/DC converter, the 6 switching elements of the DC/AC converter, and the DC link. A plurality of switching element modules of the switching element modules 360-1-1, 360-1-2, 360-1-m, 360-2-1, 360-2-2, 360-2-m, . . . , 360-n-1, 360-n-2, 360-n-m is connected in parallel to form each of the converters 350-1, 350-2, . . . , 350-n.

In one embodiment, the transformer 370 is a part for changing a voltage or current value of an AC using an electromagnetic induction phenomenon, and is connected to the grid. In this case, the grid may refer to a power grid associated with the wind power generation system.

Figure 6:
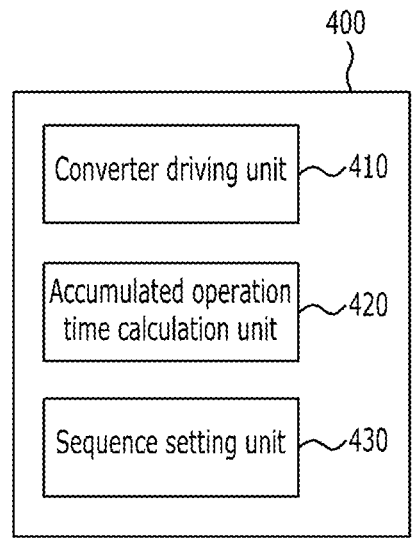
FIG. 6 shows the configuration of an apparatus for controlling converters in a wind power generation system according to an embodiment.

FIG. 6 shows the configuration of the apparatus 400 for controlling converters in a wind power generation system according to an embodiment.

In one aspect, the apparatus 400 for controlling converters in a wind power generation system includes a converter driving unit 410. The converter driving unit 410 drives at least one of the n converters 350-1, 350-2, . . . , 350-n.

In one embodiment, if any one of the plurality of converters 350-1, 350-2, . . . , 350-n connected in parallel between the generator 340 and a grid is to be driven, the converter driving unit 410 drives a converter that belongs to the converters 350-1, 350-2, . . . , 350-n and that has the smallest accumulated operation time or drives a converter that belongs to the converters 350-1, 350-2, . . . , 350-n and that has the next sequence of a converter that has been finally driven based on the set operation sequence of the converters 350-1, 350-2, . . . , 350-n.

Driving (or operating) a converter may refer to a plurality of switching elements of 12 switching elements included in at least one of a plurality of switching element modules included in the converter being turned on. The 12 switching elements included in the switching element module are disclosed in FIG. 8. In order to transfer three-phase signals to the grid so that they have a difference of 120 degrees, which one of the 12 switching elements included in the switching element module is required and when the switching elements have to be turned on/off are evident to a person having ordinary skill in the converter field.

When the wind blows, the blade 310 of the generator 340 is rotated. Kinetic energy attributable to the rotation of the blade 310 is converted into electric energy through the generator 340. The electric energy generated by the generator 340 is AC power. The AC is converted into a DC by the converter 350-1, 350-2, . . . , 350-n and then converted into an AC to be supplied toward the grid. As a result, only when at least one of the converters 350-1, 350-2, . . . , 350-n is driven by the velocity of the wind, AC power can be supplied to the grid. If the wind does not blow and then suddenly blows, at least one of the converters 350-1, 350-2, . . . , 350-n is to be driven. When the wind blows more strongly, another of the converters 350-1, 350-2, . . . , 350-n has to be newly driven because power exceeding the rating capacity of a converter 350-1, 350-2, . . . , 350-n that is being driven is supplied.

In the case where any one of the converters 350-1, 350-2, . . . , 350-n has to be newly driven as described above, if a converter that belongs to the converters 350-1, 350-2, . . . , 350-n and that has the smallest accumulated operation time is driven, the plurality of converters 350-1, 350-2, . . . , 350-n can have the same operation time.

Accordingly, a reduction in the lifespan of a specific converter **350-1, 350-2, . . . , 350-*n* can be reduced. Furthermore, although a converter that belongs to the converters 350-1, 350-2, . . . , 350-*n* and that has the next sequence of a converter 350-1, 350-2, . . . , 350-*n* that has been finally driven is driven based on the set operation sequence of the converters 350-1, 350-2, . . . , 350-*n*, the plurality of converters 350-1, 350-2, . . . , 350-*n* can have the same operation time. Accordingly, a reduction in the lifespan of a specific converter 350-1, 350-2, . . . , 350-*n*** can be reduced.

In one embodiment, the apparatus 400 for controlling converters in a wind power generation system further includes an accumulated operation time calculation unit 420 for calculating the accumulated operation time of each of the plurality of converters **350-1, 350-2, . . . , 350-*n*. The converter driving unit 410 drives a converter that belongs to the plurality of converters 350-1, 350-2, . . . , 350-*n* and has the smallest accumulated operation time if any one of the plurality of converters 350-1, 350-2, . . . , 350-*n*** is to be driven.

In one embodiment, the accumulated operation time calculation unit 420 stores an operation time until the operation of the converter **350-1, 350-2, . . . , 350-*n* is stopped after the converter 350-1, 350-2, . . . , 350-*n* starts to operate, and adds the stored operation time to an operation time, that is, the time when the operation of the converter 350-1, 350-2, . . . , 350-*n* is stopped after the converter 350-1, 350-2, . . . , 350-*n* starts to operate again. That is, the accumulated operation time calculation unit 420 accumulates the operation time of each of the converters 350-1, 350-2, . . . , 350-*n* in real time. For example, in the case of the converter 350-*n* of FIG. 5, the accumulated operation time calculation unit 420 calculates an operation time accumulated up to now with respect to each of the n converters 350-1, 350-2, . . . , 350-*n*, for example, 1 hour and 14 minutes with respect to the converter 350-1, 1 hour and 30 minutes with respect to the converter 350-2**, . . . , 50 minutes, and stores the calculated operation time.

In one embodiment, the converter driving unit 410 drives a converter that belongs to the plurality of converters **350-1, 350-2, . . . , 350-*n* and that has the smallest accumulated operation time if any one of the plurality of converters 350-1, 350-2, . . . , 350-*n* is to be driven. The case where any one of the plurality of converters 350-1, 350-2, . . . , 350-*n* is to be driven includes a case where the wind does not blow and then suddenly blows and a case where the wind blows and becomes stronger. In the former case, the converter driving unit 410 newly drives a converter that belongs to the n converters 350-1, 350-2, . . . , 350-*n* and that has the smallest one of the accumulated operation times of the n converters 350-1, 350-2, . . . , 350-*n* calculated by the accumulated operation time calculation unit 420**.

By driving the plurality of converters **350-1, 350-2, . . . , 350-*n* from a converter that belongs to the converter 350-1, 350-2, . . . , 350-*n* and that has a small accumulated operation time, the plurality of converters 350-1, 350-2, . . . , 350-*n* can have the same operation time, and thus a reduction in the lifespan of a specific converter 350-1, 350-2, . . . , 350-*n*** can be reduced.

In one embodiment, the converter driving unit 410 stops the operation of a converter that belongs to the one or more converters **350-1, 350-2, . . . , 350-*n* and that has the greatest accumulated operation time if the operation of any one of the one or more converters 350-1, 350-2, . . . , 350-*n* that are being driven is to be stopped. The case where the operation of any one of the one or more converters 350-1, 350-2, . . . , 350-*n* that are being driven is to be stopped includes a case where the wind blows never blows and a case where the wind blows weakly. In the former case, the converter driving unit 410 stops the operation of a converter that belongs to the n converters 350-1, 350-2, . . . , 350-*n* and that has the greatest operation time of the accumulated operation times of the n converters 350-1, 350-2, . . . , 350-*n* calculated by the accumulated operation time calculation unit 420. Stopping the operation of the converter 350-1, 350-2, . . . , 350-*n* may refer to the operation of at least one of the one or more switching element modules 360-1-1, 360-1-2, 360-1-*m*, 360-2-1, 360-2-2, 360-2-*m*, . . . , 360-*n*-1, 360-*n*-2, 360-*n*-*m* that are included in the converters 350-1, 350-2, . . . , 350-*n*** and that are being driven being stopped. Stopping the operation of a switching element module may refer to all of the 12 switch elements included in the switching element module continuing to be turned off.

By stopping the operation of the plurality of converters **350-1, 350-2, . . . , 350-*n* from a converter that belongs to the converters 350-1, 350-2, . . . , 350-*n* and that has the greatest accumulated operation time, the plurality of converters 350-1, 350-2, . . . , 350-*n* can have the same operation time, and thus a reduction in the lifespan of a specific converter 350-1, 350-2, . . . , 350-*n*** can be reduced.

In one embodiment, the accumulated operation time calculation unit 420 calculates the accumulated operation time of each of the plurality of switching element modules **360-1-1, 360-1-2, 360-1-*m*, 360-2-1, 360-2-2, 360-2-*m*, . . . , 360-*n*-1, 360-*n*-2, 360-*n*-*m* included in the converters 350-1, 350-2, . . . , 350-*n*. If any one of the plurality of switching element modules 360-1-1, 360-1-2, 360-1-*m*, 360-2-1, 360-2-2, 360-2-*m*, . . . , 360-*n*-1, 360-*n*-2, 360-*n*-*m* that are included in a converter 350-1, 350-2, . . . , 350-*n* having the smallest accumulated operation time and that are connected in parallel is to be driven, the converter driving unit 410 drives the switching element modules 360-1-1, 360-1-2, 360-1-*m*, 360-2-1, 360-2-2, 360-2-*m*, . . . , 360-*n*-1, 360-*n*-2, 360-*n*-*m*** having the smallest accumulated operation time. Driving (or operating) a switching element module may refer to a plurality of switching elements of the 12 switching elements included in the switching element module being turned on.

In order to transfer three-phase AC signals to the grid so that they have a difference of 120 degrees, which one of the 12 switching elements included in the switching element module is required and when the switching elements have to be turned on/off are evident to a person having ordinary skill in the converter field.

In one embodiment, the accumulated operation time calculation unit 420 stores the operation time of each of the switching element modules **360-1-1, 360-1-2, 360-1-*m*, 360-2-1, 360-2-2, 360-2-*m*, . . . , 360-*n*-1, 360-*n*-2, 360-*n*-*m* until the operation of each of the switching element modules is stopped after the switching element module starts to operate, and adds the stored operation time to an operation time, that is, the time when the operation of each of the switching element modules 360-1-1, 360-1-2, 360-1-*m*, 360-2-1, 360-2-2, 360-2-*m*, . . . , 360-*n*-1, 360-*n*-2, 360-*n*-*m* is stopped after the switching element module starts to operate again. For example, in the case of the converter 350-1 of FIG. 5, the accumulated operation time calculation unit 420 calculates an operation time accumulated up to now with respect to each of the m switching element modules 360-1-1, 360-1-2 and 360-1-*m*, for example, 1 hour and 14 minutes with respect to the switching element module 360-1-1**, 1 hour and 30 minutes with respect to the switching element module 360-1-2, . . . , 50 minutes with respect to the switching element module 360-1-*m*, and stores the calculated operation time.

In addition to the calculation of the operation time of each of the switching element modules 360-1-1, 360-1-2 and 360-1-*m* included in the converter 350-1, the accumulated operation time calculation unit 420 also calculates the operation time of the switching element modules 360-1-1, 360-1-2, 360-1-*m*, 360-2-1, 360-2-2, 360-2-*m*, . . . , 360-*n*-1, 360-*n*-2, 360-*n*-*m* included in all of the n converters 350-1, 350-2, . . . , 350-*n*.

In one embodiment, if any one of the plurality of switching element modules 360-1-1, 360-1-2, 360-1-*m*, 360-2-1, 360-2-2, 360-2-*m*, . . . , 360-*n*-1, 360-*n*-2, 360-*n*-*m* that are included in the converter 350-1, 350-2, . . . , 350-*n* having the smallest accumulated operation time and that are connected in parallel is to be driven, the converter driving unit 410 drives a switching element module that belongs to the switching element modules 360-1-1, 360-1-2, 360-1-*m*, 360-2-1, 360-2-2, 360-2-*m*, . . . , 360-*n*-1, 360-*n*-2, 360-*n*-*m* and that has the smallest accumulated operation time. The case where any one of the plurality of switching element modules 360-1-1, 360-1-2, 360-1-*m*, 360-2-1, 360-2-2, 360-2-*m*, . . . , 360-*n*-1, 360-*n*-2, 360-*n*-*m* that are included in the converter 350-1, 350-2, . . . , 350-*n* having the smallest accumulated operation time and that are connected in parallel is to be driven includes a case where the wind does not blow and suddenly blows and a case where the wind blows and becomes stronger. Driving (or operating) the converter 350-1, 350-2, . . . , 350-*n* may refer to one or more of the switching element modules 360-1-1, 360-1-2, 360-1-*m*, 360-2-1, 360-2-2, 360-2-*m*, . . . , 360-*n*-1, 360-*n*-2, 360-*n*-*m* included in the converters 350-1, 350-2, . . . , 350-*n* being driven. If any one of the converters 350-1, 350-2, . . . , 350-*n* is to be driven, the converter driving unit 410 drives the switching element modules 360-1-1, 360-1-2, 360-1-*m*, 360-2-1, 360-2-2, 360-2-*m*, . . . , 360-*n*-1, 360-*n*-2, 360-*n*-*m* that are included in the converter 350-1, 350-2, . . . , 350-*n* having the smallest accumulated operation time and that have the smallest accumulated operation time.

By driving the plurality of switching element modules 360-1-1, 360-1-2, 360-1-*m*, 360-2-1, 360-2-2, 360-2-*m*, . . . , 360-*n*-1, 360-*n*-2, 360-*n*-*m* from a switching element module 360-1-1, 360-1-2, 360-1-*m*, 360-2-1, 360-2-2, 360-2-*m*, . . . , 360-*n*-1, 360-*n*-2, 360-*n*-*m* having the smallest accumulated operation time, the plurality of switching element modules 360-1-1, 360-1-2, 360-1-*m*, 360-2-1, 360-2-2, 360-2-*m*, . . . , 360-*n*-1, 360-*n*-2, 360-*n*-*m* can have the same operation time. Accordingly, a reduction in the lifespan of a specific switching element module 360-1-1, 360-1-2, 360-1-*m*, 360-2-1, 360-2-2, 360-2-*m*, . . . 360-*n*-1, 360-*n*-2, 360-*n*-*m* can be reduced.

In one embodiment, if the operation of any one of the one or more switching element modules 360-1-1, 360-1-2, 360-1-*m*, 360-2-1, 360-2-2, 360-2-*m*, . . . , 360-*n*-1, 360-*n*-2, 360-*n*-*m* that are being driven is to be stopped, the converter driving unit 410 stops the operation of a switching element module that belongs to the switching element modules 360-1-1, 360-1-2, 360-1-*m*, 360-2-1, 360-2-2, 360-2-*m*, . . . , 360-*n*-1, 360-*n*-2, 360-*n*-*m* and that has the greatest accumulated operation time. The case where the operation of any one of the one or more switching element modules 360-1-1, 360-1-2, 360-1-*m*, 360-2-1, 360-2-2, 360-2-*m*, . . . , 360-*n*-1, 360-*n*-2, 360-*n*-*m* that are being driven is to be stopped includes a case where the wind never blows and a case where the wind blows more weakly. In the former case, the converter driving unit 410 stops the operation of a switching element module that belongs to m converters 350-1, for example, the switching element modules 360-1-1, 360-1-2, 360-1-*m*, 360-2-1, 360-2-2, 360-2-*m*, . . . , 360-*n*-1, 360-*n*-2, 360-*n*-*m* and that has the greatest operation time of accumulated operation times calculated by the accumulated operation time calculation unit 420.

In one embodiment, the apparatus 400 for controlling converters in a wind power generation system further includes a sequence setting unit 430 for setting the operation sequence of the plurality of converters 350-1, 350-2, . . . , 350-*n*. If any one of the plurality of converters 350-1, 350-2, . . . , 350-*n* is to be driven, the converter driving unit 410 drives a converter that belongs to the converters 350-1, 350-2, . . . , 350-*n* and that has the next sequence of a converter 350-1, 350-2, . . . , 350-*n* that has been finally driven based on the set operation sequence of the converters 350-1, 350-2, . . . , 350-*n*.

In one embodiment, the sequence setting unit 430 sets the operation sequence of the plurality of converters 350-1, 350-2, . . . , 350-*n*. For example, the sequence setting unit 430 sets the operation sequence in order of the converter 350-1, the converter 350-2, . . . , the converter 350-*n*. In the sequence setting step, a method for setting the operation sequence of the converters 350-1, 350-2, . . . , 350-*n* is not limited to the aforementioned example. For example, the sequence setting unit 430 may set the operation sequence of the plurality of converters 350-1, 350-2, . . . , 350-*n* in such a manner that the odd-numbered converters 350-1, 350-3, . . . , are first sequentially driven in order of increasing number and the even-numbered converters 350-2, 350-4, . . . , are then sequentially driven in order of increasing number.

In one embodiment, if any one of the plurality of converters 350-1, 350-2, . . . , 350-*n* is to be driven, the converter driving unit 410 drives a converter that belongs to the converters 350-1, 350-2, . . . , 350-*n* and that has the next sequence of a converter 350-1, 350-2, . . . , 350-*n* that has been finally driven based on the set operation sequence of the converters 350-1, 350-2, . . . , 350-*n*. The case where any one of the plurality of converters 350-1, 350-2, . . . , 350-*n* is to be driven includes a case where the wind does not blow and suddenly blows and a case where the wind blows and becomes stronger. In the former case, the converter driving unit 410 drives a converter that belongs to the converters 350-1, 350-2, . . . , 350-*n* and that has the next sequence of a converter 350-1, 350-2, . . . , 350-*n* that has been finally driven based on the operation sequence of the converters 350-1, 350-2, . . . , 350-*n* set by the sequence setting unit 430.

In one embodiment, the sequence setting unit 430 sets the operation stop sequence of the one or more converters 350-1, 350-2, . . . , 350-*n* that are being driven. If the operation of any one of the one or more converters 350-1, 350-2, . . . , 350-*n* that are being driven is to be stopped, the converter driving unit 410 stops the operation of a converter that belongs to the converters 350-1, 350-2, . . . , 350-*n* and that has the next sequence of a converter whose operation has been finally stopped based on the set operation stop sequence of the converters 350-1, 350-2, . . . , 350-*n*.

In one embodiment, the sequence setting unit 430 sets the operation stop sequence of the one or more converters 350-1, 350-2, . . . , 350-*n* that are being driven. For example, the sequence setting unit 430 sets the operation stop sequence in order of the converter 350-1, the converter 350-2, . . . , the converter 350-*n*. A method for setting, by the sequence setting unit 430, the operation sequence of the converters 350-1, 350-2, . . . , 350-*n* is not limited to the aforementioned example. For example, the sequence setting unit 430 may set the operation stop sequence of the one or more converters 350-1, 350-2, . . . , 350-*n* in such a manner that the operations of the odd-numbered converters 350-1, 350-3, . . . , are first sequentially stopped in order of increasing number and the operations of the even-numbered converters 350-2, 350-4, . . . , are then sequentially stopped in order of increasing number.

In one embodiment, if the operation of any one of the one or more converters 350-1, 350-2, . . . , 350-*n* that are being driven is to be stopped, the converter driving unit 410 stops the operation of a converter that belongs to the converters 350-1, 350-2, . . . , 350-*n* and that has the next sequence of a converter whose operation has been finally stopped based on the set operation stop sequence of the converters 350-1, 350-2, . . . , 350-*n*. The case where the operation of any one of the one or more converters 350-1, 350-2, . . . , 350-*n* that are being driven is to be stopped includes a case where the wind never blows and a case where the wind blows more weakly. In the former case, the converter driving unit 410 stops the operation of a converter that belongs to the converters 350-1, 350-2, . . . , 350-*n* and that has the next sequence of a converter whose operation has been finally stopped based on the set operation stop sequence of the converters 350-1, 350-2, . . . , 350-*n* set by the sequence setting unit 430.

In one embodiment, the sequence setting unit 430 sets the operation sequence of the plurality of switching element modules 360-1-1, 360-1-2, 360-1-*m*, 360-2-1, 360-2-2, 360-2-*m*, . . . , 360-*n*-1, 360-*n*-2, 360-*n*-*m* included in the converters 350-1, 350-2, . . . , 350-*n*. If any one of the plurality of switching element modules 360-1-1, 360-1-2, 360-1-*m*, 360-2-1, 360-2-2, 360-2-*m*, . . . , 360-*n*-1, 360-*n*-2, 360-*n*-*m* that are included in the converter 350-1, 350-2, . . . , 350-*n* having the next sequence of a converter that has been finally driven and that are connected in parallel is to be driven based on the set operation sequence of the converters 350-1, 350-2, . . . , 350-*n*, the converter driving unit 410 drives a switching element module that belongs to the switching element modules 360-1-1, 360-1-2, 360-1-*m*, 360-2-1, 360-2-2, 360-2-*m*, . . . , 360-*n*-1, 360-*n*-2, 360-*n*-*m* and that has the next sequence of a switching element module that has been finally driven based on the set operation sequence of the switching element modules 360-1-1, 360-1-2, 360-1-*m*, 360-2-1, 360-2-2, 360-2-*m*, . . . , 360-*n*-1, 360-*n*-2, 360-*n*-*m*.

In one embodiment, the sequence setting unit 430 sets the operation sequence of the plurality of switching element modules 360-1-1, 360-1-2, 360-1-*m*, 360-2-1, 360-2-2, 360-2-*m*, . . . , 360-*n*-1, 360-*n*-2, 360-*n*-*m* included in the converters 350-1, 350-2, . . . , 350-*n*. For example, in the case of the converter 350-1, the sequence setting unit 430 sets the operation sequence of the switching element modules 360-1-1, 360-1-2, 360-1-*m* in order of the switching element module 360-1-1, . . . , the switching element module 360-1-*m*. A method for setting, by the sequence setting unit 430, the operation sequence of the switching element modules 360-1-1, 360-1-2, 360-1-*m*, 360-2-1, 360-2-2, 360-2-*m*, . . . , 360-*n*-1, 360-*n*-2, 360-*n*-*m* is not limited to the aforementioned example. For example, the sequence setting unit 430 sets the operation sequence of the switching element modules 360-1-1, 360-1-2, 360-1-*m*, 360-2-1, 360-2-2, 360-2-*m*, . . . , 360-*n*-1, 360-*n*-2, 360-*n*-*m* in such a manner that the odd-numbered switching element modules 360-1-1, 360-1-3, . . . , 360-2-1, 360-2-3, . . . , 360-*n*-1, 360-*n*-3, . . . , are first driven in order of increasing number and the even-numbered switching element modules 360-1-2, 360-1-4, . . . , 360-2-2, 360-2-4, . . . , 360-*n*-2, 360-*n*-4, . . . , are then driven in order of increasing number.

In one embodiment, if any one of the plurality of switching element modules 360-1-1, 360-1-2, 360-1-*m*, 360-2-1, 360-2-2, 360-2-*m*, . . . , 360-*n*-1, 360-*n*-2, 360-*n*-*m* that are included in a converter belonging to the converters 350-1, 350-2, . . . , 350-*n* and having the next sequence of a converter that has been finally driven and that are connected in parallel is to be driven based on the set operation sequence of the converters 350-1, 350-2, . . . , 350-*n*, the converter driving unit 410 drives a switching element module that belongs to the switching element modules 360-1-1, 360-1-2, 360-1-*m*, 360-2-1, 360-2-2, 360-2-*m*, . . . , 360-*n*-1, 360-*n*-2, 360-*n*-*m* and that has the next sequence of a switching element module that has been finally driven based on the set operation sequence of the switching element modules 360-1-1, 360-1-2, 360-1-*m*, 360-2-1, 360-2-2, 360-2-*m*, . . . , 360-*n*-1, 360-*n*-2, 360-*n*-*m*. The case where any one of the plurality of switching element modules 360-1-1, 360-1-2, 360-1-*m*, 360-2-1, 360-2-2, 360-2-*m*, . . . , 360-*n*-1, 360-*n*-2, 360-*n*-*m* is to be driven includes a case where the wind does not blow and suddenly blows and a case where the wind blows and becomes stronger. In the former case, the converter driving unit 410 drives a switching element module that belongs to the switching element modules 360-1-1, 360-1-2, 360-1-*m*, 360-2-1, 360-2-2, 360-2-*m*, . . . , 360-*n*-1, 360-*n*-2, 360-*n*-*m* and that has the next sequence of a switching element module that has been finally driven based on the set operation sequence of the switching element modules 360-1-1, 360-1-2, 360-1-*m*, 360-2-1, 360-2-2, 360-2-*m*, . . . , 360-*n*-1, 360-*n*-2, 360-*n*-*m* set by the sequence setting unit 430.

In one embodiment, the sequence setting unit 430 sets the operation stop sequence of the one or more switching element modules 360-1-1, 360-1-2, 360-1-*m*, 360-2-1, 360-2-2, 360-2-*m*, . . . , 360-*n*-1, 360-*n*-2, 360-*n*-*m* that are being driven. If the operation of any one of the one or more switching element modules 360-1-1, 360-1-2, 360-1-*m*, 360-2-1, 360-2-2, 360-2-*m*, . . . , 360-*n*-1, 360-*n*-2, 360-*n*-*m* that are being driven is to be stopped, the converter driving unit 410 stops the operation of a switching element module that belongs to the one or more switching element modules 360-1-1, 360-1-2, 360-1-*m*, 360-2-1, 360-2-2, 360-2-*m*, . . . , 360-*n*-1, 360-*n*-2, 360-*n*-*m* and that has the next sequence of a switching element module whose operation has been finally stopped based on the set operation stop sequence of the switching element modules 360-1-1, 360-1-2, 360-1-*m*, 360-2-1, 360-2-2, 360-2-*m*, . . . , 360-*n*-1, 360-*n*-2, 360-*n*-*m*.

In one embodiment, the sequence setting unit 430 sets the operation stop sequence of the one or more switching element modules 360-1-1, 360-1-2, 360-1-*m*, 360-2-1, 360-2-2, 360-2-*m*, . . . , 360-*n*-1, 360-*n*-2, 360-*n*-*m* that are being driven. For example, in the case of the converter 350-1, the sequence setting unit 430 sets the operation stop sequence of the one or more switching element modules 360-1-1, 360-1-2, 360-1-*m*, 360-2-1, 360-2-2, 360-2-*m*, . . . , 360-*n*-1, 360-*n*-2, 360-*n*-*m* in order of the switching element module 360-1-1, . . . , the switching element module 360-1-*m*. A method for setting, by the sequence setting unit 430, the operation stop sequence of the switching element modules 360-1-1, 360-1-2, 360-1-*m*, 360-2-1, 360-2-2, 360-2-*m*, . . . , 360-*n*-1, 360-*n*-2, 360-*n*-*m* is not limited to the aforementioned example. For example, the sequence setting unit 430 sets the operation stop sequence of the one or more switching element modules 360-1-1, 360-1-2, 360-1-*m*, 360-2-1, 360-2-2, 360-2-*m*, . . . , 360-*n*-1, 360-*n*-2, 360-*n*-*m* in such a manner that the operations of the odd-numbered switching element modules 360-1-1, 360-1-3, . . . , 360-2-1, 360-2-3, . . . , 360-*n*-1, 360-*n*-3, . . . , are first stopped in order of increasing number and the operations of the even-numbered switching element modules 360-1-2, 360-1-4, . . . , 360-2-2, 360-2-4, . . . , 360-*n*-2, 360-*n*-4, . . . , are then stopped in order of increasing number.

In one embodiment, if the operation of any one of the one or more switching element modules 360-1-1, 360-1-2, 360-1-*m*, 360-2-1, 360-2-2, 360-2-*m*, . . . , 360-*n*-1, 360-*n*-2, 360-*n*-*m* that are being driven is to be stopped, the converter driving unit 410 stops the operation of a switching element module that belongs to the switching element modules 360-1-1, 360-1-2, 360-1-*m*, 360-2-1, 360-2-2, 360-2-*m*, . . . , 360-*n*-1, 360-*n*-2, 360-*n*-*m* and that has the next sequence of a switching element module whose operation has been finally stopped based on the set operation stop sequence of the switching element modules 360-1-1, 360-1-2, 360-1-*m*, 360-2-1, 360-2-2, 360-2-*m*, . . . , 360-*n*-1, 360-*n*-2, 360-*n*-*m*. The case where the operation of any one of the one or more switching element modules 360-1-1, 360-1-2, 360-1-*m*, 360-2-1, 360-2-2, 360-2-*m*, . . . , 360-*n*-1, 360-*n*-2, 360-*n*-*m* that are being driven is to be stopped includes a case where the wind never blows and a case where the wind blows more weakly. In the former case, the converter driving unit 410 stops the operation of a switching element module that belongs to the switching element modules 360-1-1, 360-1-2, 360-1-*m*, 360-2-1, 360-2-2, 360-2-*m*, . . . , 360-*n*-1, 360-*n*-2, 360-*n*-*m* and that has the next sequence of a switching element module whose operation has been finally stopped based on the set operation stop sequence of the switching element modules 360-1-1, 360-1-2, 360-1-*m*, 360-2-1, 360-2-2, 360-2-*m*, . . . , 360-*n*-1, 360-*n*-2, 360-*n*-*m* set by the sequence setting unit 430.

Figure 7:
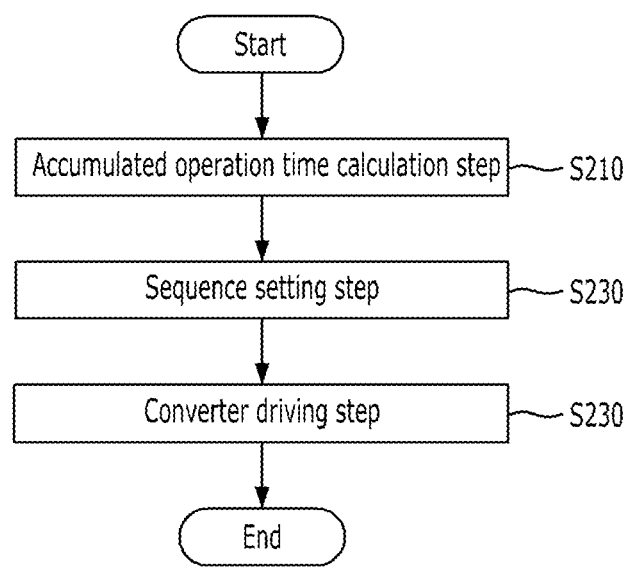
FIG. 7 shows a flow of a method for controlling converters in a wind power generation system according to an embodiment.

FIG. 7 shows a flow of a method for controlling converters in a wind power generation system according to an embodiment.

In one aspect, the method for controlling converters in a wind power generation system includes a converter driving step S230. The converter driving step S230 drives at least one of the n converters 350-1, 350-2, . . . , 350-*n*.

In one embodiment, in the converter driving step S230, if any one of the plurality of converters 350-1, 350-2, . . . , 350-*n* connected in parallel between the generator 340 and a grid is to be driven, a converter that belongs to the converters 350-1, 350-2, . . . , 350-*n* and that has the smallest accumulated operation time is driven or a converter that belongs to the converters 350-1, 350-2, . . . , 350-*n* and that has the next sequence of a converter that has been finally driven is driven based on the set operation sequence of the converters 350-1, 350-2, . . . , 350-*n*.

When the wind blows, the blade 310 of the generator 340 is rotated. Kinetic energy attributable to the rotation of the blade 310 is converted into electric energy through the generator 340. The electric energy generated by the generator 340 is AC power. The AC is converted into a DC by the converter 350-1, 350-2, . . . , 350-*n* and then converted into an AC to be supplied toward the grid. As a result, only when at least one of the converters 350-1, 350-2, . . . , 350-*n* is driven by the velocity of the wind, AC power can be supplied to the grid. If the wind does not blow and then suddenly blows, at least one of the converters 350-1, 350-2, . . . , 350-*n* is to be driven. When the wind blows more strongly, another of the converters 350-1, 350-2, . . . , 350-*n* has to be newly driven because power exceeding the rating capacity of a converter 350-1, 350-2, . . . , 350-*n* that is being driven is supplied.

In the case where any one of the converters 350-1, 350-2, . . . , 350-*n* has to be newly driven as described above, if a converter that belongs to the converters 350-1, 350-2, . . . , 350-*n* and that has the smallest accumulated operation time is driven, the plurality of converters 350-1, 350-2, . . . , 350-*n* can have the same operation time. Accordingly, a reduction in the lifespan of a specific converter 350-1, 350-2, . . . , 350-*n* can be reduced. Furthermore, although a converter that belongs to the converters 350-1, 350-2, . . . , 350-*n* and that has the next sequence of a converter 350-1, 350-2, . . . , 350-*n* that has been finally driven is driven based on the set operation sequence of the converters 350-1, 350-2, . . . , 350-*n*, the plurality of converters 350-1, 350-2, . . . , 350-*n* can have the same operation time. Accordingly, a reduction in the lifespan of a specific converter 350-1, 350-2, . . . , 350-*n* can be reduced.

In one embodiment, the method for controlling converters in a wind power generation system further includes an accumulated operation time calculation step S210 for calculating the accumulated operation time of each of the plurality of converters 350-1, 350-2, . . . , 350-*n*. The converter driving step S230 includes driving a converter that belongs to the plurality of converters 350-1, 350-2, . . . , 350-*n* and has the smallest accumulated operation time if any one of the plurality of converters 350-1, 350-2, . . . , 350-*n* is to be driven.

In one embodiment, the accumulated operation time calculation step S210 includes storing an operation time until the operation of the converter 350-1, 350-2, . . . , 350-*n* is stopped after the converter 350-1, 350-2, . . . , 350-*n* starts to operate, and adding the stored operation time to an operation time, that is, the time when the operation of the converter 350-1, 350-2, . . . , 350-*n* is stopped after the converter 350-1, 350-2, . . . , 350-*n* starts to operate again. That is, the accumulated operation time calculation step S210 includes accumulating the operation time of each of the converters 350-1, 350-2, . . . , 350-*n* in real time. For example, in the accumulated operation time calculation step S210, in the case of the converter 350-*n* of FIG. 5, an operation time accumulated up to now with respect to each of the n converters 350-1, 350-2, . . . , 350-*n*, for example, 1 hour and 14 minutes with respect to the converter 350-1, 1 hour and 30 minutes with respect to the converter 350-2, . . . , 50 minutes, and stores the calculated operation time are calculated and stored.

In one embodiment, the converter driving step S230 includes driving a converter that belongs to the plurality of converters 350-1, 350-2, . . . , 350-*n* and that has the smallest accumulated operation time if any one of the plurality of converters 350-1, 350-2, . . . , 350-*n* is to be driven. The case where any one of the plurality of converters 350-1, 350-2, . . . , 350-*n* is to be driven includes a case where the wind does not blow and then suddenly blows and a case where the wind blows and becomes stronger. In the former case, the converter driving step S230 includes newly driving a converter that belongs to the n converters 350-1, 350-2, . . . , 350-*n* and that has the smallest one of the accumulated operation times of the n converters 350-1, 350-2, . . . , 350-*n* calculated in the accumulated operation time calculation step S210.

By driving the plurality of converters 350-1, 350-2, . . . , 350-*n* from a converter that belongs to the converter 350-1, 350-2, . . . , 350-*n* and that has a small accumulated operation time, the plurality of converters 350-1, 350-2, . . . , 350-*n* can have the same operation time, and thus a reduction in the lifespan of a specific converter 350-1, 350-2, . . . , 350-*n* can be reduced.

In one embodiment, the converter driving step S230 includes stopping the operation of a converter that belongs to the one or more converters 350-1, 350-2, ..., 350-n and that has the greatest accumulated operation time if the operation of any one of the one or more converters 350-1, 350-2, ..., 350-n that are being driven is to be stopped. The case where the operation of any one of the one or more converters 350-1, 350-2, ..., 350-n that are being driven is to be stopped includes a case where the wind blows never blows and a case where the wind blows weakly. In the former case, the converter driving step S230 includes stopping the operation of a converter that belongs to the n converters 350-1, 350-2, ..., 350-n and that has the greatest operation time of the accumulated operation times of the n converters 350-1, 350-2, ..., 350-n calculated in the accumulated operation time calculation step S210. Stopping the operation of the converter 350-1, 350-2, ..., 350-n may refer to the operation of at least one of the one or more switching element modules 360-1-1, 360-1-2, 360-1-$m$, 360-2-1, 360-2-2, 360-2-$m$, ..., 360-$n$-1, 360-$n$-2, 360-$n$-$m$ that are included in the converters 350-1, 350-2, ..., 350-n and that are being driven being stopped. Stopping the operation of a switching element module may refer to all of the 12 switch elements included in the switching element module continue to be turned off.

By stopping the operation of the plurality of converters 350-1, 350-2, ..., 350-n from a converter that belongs to the converters 350-1, 350-2, ..., 350-n and that has the greatest accumulated operation time, the plurality of converters 350-1, 350-2, ..., 350-n can have the same operation time, and thus a reduction in the lifespan of a specific converter 350-1, 350-2, ..., 350-n can be reduced.

In one embodiment, the accumulated operation time calculation step S210 includes calculating the accumulated operation time of each of the plurality of switching element modules 360-1-1, 360-1-2, 360-1-$m$, 360-2-1, 360-2-2, 360-2-$m$, ..., 360-$n$-1, 360-$n$-2, 360-$n$-$m$ included in the converters 350-1, 350-2, ..., 350-n. In the converter driving step S230, if any one of the plurality of switching element modules 360-1-1, 360-1-2, 360-1-$m$, 360-2-1, 360-2-2, 360-2-$m$, ..., 360-$n$-1, 360-$n$-2, 360-$n$-$m$ that are included in a converter 350-1, 350-2, ..., 350-n having the smallest accumulated operation time and that are connected in parallel is to be driven, a switching element module that belongs to the switching element modules 360-1-1, 360-1-2, 360-1-$m$, 360-2-1, 360-2-2, 360-2-$m$, ..., 360-$n$-1, 360-$n$-2, 360-$n$-$m$ and that has the smallest accumulated operation time is driven.

In one embodiment, the accumulated operation time calculation step S210 includes storing the operation time of each of the switching element modules 360-1-1, 360-1-2, 360-1-$m$, 360-2-1, 360-2-2, 360-2-$m$, ..., 360-$n$-1, 360-$n$-2, 360-$n$-$m$ until the operation of each of the switching element modules is stopped after the switching element module starts to operate, and adding the stored operation time to an operation time, that is, the time when the operation of each of the switching element modules 360-1-1, 360-1-2, 360-1-$m$, 360-2-1, 360-2-2, 360-2-$m$, ..., 360-$n$-1, 360-$n$-2, 360-$n$-$m$ is stopped after the switching element module starts to operate again. For example, in the case of the converter 350-1 of FIG. 5, the accumulated operation time calculation step S210 includes calculating an operation time accumulated up to now with respect to each of the m switching element modules 360-1-1, 360-1-2 and 360-1-$m$, for example, 1 hour and 14 minutes with respect to the switching element module 360-1-1, 1 hour and 30 minutes with respect to the switching element module 360-1-2, ..., 50 minutes with respect to the switching element module 360-1-$m$, and storing the calculated operation time.

In addition to the calculation of the operation time of each of the switching element modules 360-1-1, 360-1-2 and 360-1-$m$ included in the converter 350-1, the accumulated operation time calculation step S210 also includes calculating the operation time of the switching element modules 360-1-1, 360-1-2, 360-1-$m$, 360-2-1, 360-2-2, 360-2-$m$, ..., 360-$n$-1, 360-$n$-2, 360-$n$-$m$ included in all of the n converters 350-1, 350-2, ..., 350-n.

In one embodiment, in the converter driving step S230, if any one of the plurality of switching element modules 360-1-1, 360-1-2, 360-1-$m$, 360-2-1, 360-2-2, 360-2-$m$, ..., 360-$n$-1, 360-$n$-2, 360-$n$-$m$ that are included in the converter 350-1, 350-2, ..., 350-n having the smallest accumulated operation time and that are connected in parallel is to be driven, a switching element module that belongs to the switching element modules 360-1-1, 360-1-2, 360-1-$m$, 360-2-1, 360-2-2, 360-2-$m$, ..., 360-$n$-1, 360-$n$-2, 360-$n$-$m$ and that has the smallest accumulated operation time is driven. The case where any one of the plurality of switching element modules 360-1-1, 360-1-2, 360-1-$m$, 360-2-1, 360-2-2, 360-2-$m$, ..., 360-$n$-1, 360-$n$-2, 360-$n$-$m$ that are included in the converter 350-1, 350-2, ..., 350-n having the smallest accumulated operation time and that are connected in parallel is to be driven includes a case where the wind does not blow and suddenly blows and a case where the wind blows and becomes stronger. Driving (or operating) the converter 350-1, 350-2, ..., 350-n may refer to one or more of the switching element modules 360-1-1, 360-1-2, 360-1-$m$, 360-2-1, 360-2-2, 360-2-$m$, ..., 360-$n$-1, 360-$n$-2, 360-$n$-$m$ included in the converters 350-1, 350-2, ..., 350-n being driven. In the converter driving step S230, if any one of the converters 350-1, 350-2, ..., 350-n is to be driven, the switching element modules 360-1-1, 360-1-2, 360-1-$m$, 360-2-1, 360-2-2, 360-2-$m$, ..., 360-$n$-1, 360-$n$-2, 360-$n$-$m$ that are included in the converter 350-1, 350-2, ..., 350-n having the smallest accumulated operation time and that have the smallest accumulated operation time are driven.

By driving the plurality of switching element modules 360-1-1, 360-1-2, 360-1-$m$, 360-2-1, 360-2-2, 360-2-$m$, ..., 360-$n$-1, 360-$n$-2, 360-$n$-$m$ from a switching element module 360-1-1, 360-1-2, 360-1-$m$, 360-2-1, 360-2-2, 360-2-$m$, ..., 360-$n$-1, 360-$n$-2, 360-$n$-$m$ having the smallest accumulated operation time, the plurality of switching element modules 360-1-1, 360-1-2, 360-1-$m$, 360-2-1, 360-2-2, 360-2-$m$, ..., 360-$n$-1, 360-$n$-2, 360-$n$-$m$ can have the same operation time. Accordingly, a reduction in the lifespan of a specific switching element module 360-1-1, 360-1-2, 360-1-$m$, 360-2-1, 360-2-2, 360-2-$m$, ..., 360-$n$-1, 360-$n$-2, 360-$n$-$m$ can be reduced.

In one embodiment, in the converter driving step S230, if the operation of any one of the one or more switching element modules 360-1-1, 360-1-2, 360-1-$m$, 360-2-1, 360-2-2, 360-2-$m$, ..., 360-$n$-1, 360-$n$-2, 360-$n$-$m$ that are being driven is to be stopped, the operation of a switching element module that belongs to the switching element modules 360-1-1, 360-1-2, 360-1-$m$, 360-2-1, 360-2-2, 360-2-$m$, ..., 360-$n$-1, 360-$n$-2, 360-$n$-$m$ and that has the greatest accumulated operation time is stopped. The case where the operation of any one of the one or more switching element modules 360-1-1, 360-1-2, 360-1-$m$, 360-2-1, 360-2-2, 360-2-$m$, ..., 360-$n$-1, 360-$n$-2, 360-$n$-$m$ that are being driven is to be stopped includes a case where the wind never blows and a case where the wind blows more weakly. In the former case, the converter driving step S230 includes stopping the operation of a switching element module that belongs to m converters 350-1, for example, the switching element modules 360-1-1, 360-1-2, 360-1-*m*, 360-2-1, 360-2-2, 360-2-*m*, . . . , 360-*n*-1, 360-*n*-2, 360-*n*-*m* and that has the greatest operation time of accumulated operation times calculated in the accumulated operation time calculation step S210.

In one embodiment, the method for controlling converters in a wind power generation system further includes a sequence setting step S220 for setting the operation sequence of the plurality of converters 350-1, 350-2, . . . , 350-*n*. In the converter driving step S230, if any one of the plurality of converters 350-1, 350-2, . . . , 350-*n* is to be driven, a converter that belongs to the converters 350-1, 350-2, . . . , 350-*n* and that has the next sequence of a converter 350-1, 350-2, . . . , 350-*n* that has been finally driven is driven based on the set operation sequence of the converters 350-1, 350-2, . . . , 350-*n*.

In one embodiment, the sequence setting step S220 includes setting the operation sequence of the plurality of converters 350-1, 350-2, . . . , 350-*n*. For example, the sequence setting step S220 includes setting the operation sequence in order of the converter 350-1, the converter 350-2, . . . , the converter 350-*n*. In the sequence setting step S220, a method for setting the operation sequence of the converters 350-1, 350-2, . . . , 350-*n* is not limited to the aforementioned example. For example, the sequence setting step S220 may include setting the operation sequence of the plurality of converters 350-1, 350-2, . . . , 350-*n* in such a manner that the odd-numbered converters 350-1, 350-3, . . . , are first sequentially driven in order of increasing number and the even-numbered converters 350-2, 350-4, . . . , are then sequentially driven in order of increasing number.

In one embodiment, in the converter driving step S230, if any one of the plurality of converters 350-1, 350-2, . . . , 350-*n* is to be driven, a converter that belongs to the converters 350-1, 350-2, . . . , 350-*n* and that has the next sequence of a converter 350-1, 350-2, . . . , 350-*n* that has been finally driven is driven based on the set operation sequence of the converters 350-1, 350-2, . . . , 350-*n*. The case where any one of the plurality of converters 350-1, 350-2, . . . , 350-*n* is to be driven includes a case where the wind does not blow and suddenly blows and a case where the wind blows and becomes stronger. In the former case, the converter driving step S230, a converter that belongs to the converters 350-1, 350-2, . . . , 350-*n* and that has the next sequence of a converter 350-1, 350-2, . . . , 350-*n* that has been finally driven is driven based on the operation sequence of the converters 350-1, 350-2, . . . , 350-*n* set in the sequence setting step S220.

In one embodiment, the sequence setting step S220 includes setting the operation stop sequence of the one or more converters 350-1, 350-2, . . . , 350-*n* that are being driven. In the converter driving step S230, if the operation of any one of the one or more converters 350-1, 350-2, . . . , 350-*n* that are being driven is to be stopped, the operation of a converter that belongs to the converters 350-1, 350-2, . . . , 350-*n* and that has the next sequence of a converter whose operation has been finally stopped is stopped based on the set operation stop sequence of the converters 350-1, 350-2, . . . , 350-*n*.

In one embodiment, the sequence setting step S220 includes setting the operation stop sequence of the one or more converters 350-1, 350-2, . . . , 350-*n* that are being driven. For example, the sequence setting step S220 includes setting the operation stop sequence in order of the converter 350-1, the converter 350-2, . . . , the converter 350-*n*. In the sequence setting step S220, a method for setting the operation sequence of the converters 350-1, 350-2, . . . , 350-*n* is not limited to the aforementioned example. For example, the sequence setting step S220 may include setting the operation stop sequence of the one or more converters 350-1, 350-2, . . . , 350-*n* in such a manner that the operations of the odd-numbered converters 350-1, 350-3, . . . , are first sequentially stopped in order of increasing number and the operations of the even-numbered converters 350-2, 350-4, . . . , are then sequentially stopped in order of increasing number.

In one embodiment, in the converter driving step S230, if the operation of any one of the one or more converters 350-1, 350-2, . . . , 350-*n* that are being driven is to be stopped, the operation of a converter that belongs to the converters 350-1, 350-2, . . . , 350-*n* and that has the next sequence of a converter whose operation has been finally stopped is stopped based on the set operation stop sequence of the converters 350-1, 350-2, . . . , 350-*n*. The case where the operation of any one of the one or more converters 350-1, 350-2, . . . , 350-*n* that are being driven is to be stopped includes a case where the wind never blows and a case where the wind blows more weakly. In the former case, the converter driving step S230 includes stopping the operation of a converter that belongs to the converters 350-1, 350-2, . . . , 350-*n* and that has the next sequence of a converter whose operation has been finally stopped based on the set operation stop sequence of the converters 350-1, 350-2, . . . , 350-*n* set in the sequence setting step S220.

In one embodiment, the sequence setting step S220 includes setting the operation sequence of the plurality of switching element modules 360-1-1, 360-1-2, 360-1-*m*, 360-2-1, 360-2-2, 360-2-*m*, . . . , 360-*n*-1, 360-*n*-2, 360-*n*-*m* included in the converters 350-1, 350-2, . . . , 350-*n*. In the converter driving step S230, if any one of the plurality of switching element modules 360-1-1, 360-1-2, 360-1-*m*, 360-2-1, 360-2-2, 360-2-*m*, . . . , 360-*n*-1, 360-*n*-2, 360-*n*-*m* that are included in the converter 350-1, 350-2, . . . , 350-*n* having the next sequence of a converter that has been finally driven and that are connected in parallel is to be driven based on the set operation sequence of the converters 350-1, 350-2, . . . , 350-*n*, a switching element module that belongs to the switching element modules 360-1-1, 360-1-2, 360-1-*m*, 360-2-1, 360-2-2, 360-2-*m*, . . . , 360-*n*-1, 360-*n*-2, 360-*n*-*m* and that has the next sequence of a switching element module that has been finally driven is driven based on the set operation sequence of the switching element modules 360-1-1, 360-1-2, 360-1-*m*, 360-2-1, 360-2-2, 360-2-*m*, . . . , 360-*n*-1, 360-*n*-2, 360-*n*-*m*.

In one embodiment, the sequence setting step S220 includes setting the operation sequence of the plurality of switching element modules 360-1-1, 360-1-2, 360-1-*m*, 360-2-1, 360-2-2, 360-2-*m*, . . . , 360-*n*-1, 360-*n*-2, 360-*n*-*m* included in the converters 350-1, 350-2, . . . , 350-*n*. For example, in the sequence setting step S220, in the case of the converter 350-1, the operation sequence of the switching element modules 360-1-1, 360-1-2, 360-1-*m* is set in order of the switching element module 360-1-1, . . . , the switching element module 360-1-*m*. In the sequence setting step S220, a method for setting the operation sequence of the switching element modules 360-1-1, 360-1-2, 360-1-*m*, 360-2-1, 360-2-2, 360-2-*m*, . . . , 360-*n*-1, 360-*n*-2, 360-*n*-*m* is not limited to the aforementioned example. For example, the sequence setting step S220 includes setting the operation sequence of the switching element modules 360-1-1, 360-1-2, 360-1-*m*, 360-2-1, 360-2-2, 360-2-*m*, . . . , 360-*n*-1, 360-*n*-2, 360-*n*-*m* in such a manner that the odd-numbered switching element modules 360-1-1, 360-1-3, . . . , 360-2-1, 360-2-3, . . . , 360-n-1, 360-n-3, . . . , are first driven in order of increasing number and the even-numbered switching element modules 360-1-2, 360-1-4, . . . , 360-2-2, 360-2-4, . . . , 360-n-2, 360-n-4, . . . , are then driven in order of increasing number.

In one embodiment, in the converter driving step S230, if any one of the plurality of switching element modules 360-1-1, 360-1-2, 360-1-m, 360-2-1, 360-2-2, 360-2-m, . . . , 360-n-1, 360-n-2, 360-n-m that are included in a converter belonging to the converters 350-1, 350-2, . . . , 350-n and having the next sequence of a converter that has been finally driven and that are connected in parallel is to be driven based on the set operation sequence of the converters 350-1, 350-2, . . . , 350-n, a switching element module that belongs to the switching element modules 360-1-1, 360-1-2, 360-1-m, 360-2-1, 360-2-2, 360-2-m, . . . , 360-n-1, 360-n-2, 360-n-m and that has the next sequence of a switching element module that has been finally driven is driven based on the set operation sequence of the switching element modules 360-1-1, 360-1-2, 360-1-m, 360-2-1, 360-2-2, 360-2-m, . . . , 360-n-1, 360-n-2, 360-n-m. The case where any one of the plurality of switching element modules 360-1-1, 360-1-2, 360-1-m, 360-2-1, 360-2-2, 360-2-m, . . . , 360-n-1, 360-n-2, 360-n-m is to be driven includes a case where the wind does not blow and suddenly blows and a case where the wind blows and becomes stronger. In the former case, the converter driving step S230 includes driving a switching element module that belongs to the switching element modules 360-1-1, 360-1-2, 360-1-m, 360-2-1, 360-2-2, 360-2-m, . . . , 360-n-1, 360-n-2, 360-n-m and that has the next sequence of a switching element module that has been finally driven based on the set operation sequence of the switching element modules 360-1-1, 360-1-2, 360-1-m, 360-2-1, 360-2-2, 360-2-m, . . . , 360-n-1, 360-n-2, 360-n-m set in the sequence setting step S220. A switching element module that belongs to the switching element modules 360-1-1, 360-1-2, 360-1-m, 360-2-1, 360-2-2, 360-2-m, . . . , 360-n-1, 360-n-2, 360-n-m and that has been finally driven is a switching element module that belongs to the switching element modules 360-1-1, 360-1-2, 360-1-m, 360-2-1, 360-2-2, 360-2-m, . . . , 360-n-1, 360-n-2, 360-n-m and that has the latest operation start time or a switching element module that belongs to the switching element modules 360-1-1, 360-1-2, 360-1-m, 360-2-1, 360-2-2, 360-2-m, . . . , 360-n-1, 360-n-2, 360-n-m and that has the latest operation stop time.

In one embodiment, the sequence setting step S220 includes setting the operation stop sequence of the one or more switching element modules 360-1-1, 360-1-2, 360-1-m, 360-2-1, 360-2-2, 360-2-m, . . . , 360-n-1, 360-n-2, 360-n-m that are being driven. In the converter driving step S230, if the operation of any one of the one or more switching element modules 360-1-1, 360-1-2, 360-1-m, 360-2-1, 360-2-2, 360-2-m, . . . , 360-n-1, 360-n-2, 360-n-m that are being driven is to be stopped, the operation of a switching element module that belongs to the switching element modules 360-1-1, 360-1-2, 360-1-m, 360-2-1, 360-2-2, 360-2-m, . . . , 360-n-1, 360-n-2, 360-n-m and that has the next sequence of a switching element module whose operation has been finally stopped is stopped based on the set operation stop sequence of the switching element modules 360-1-1, 360-1-2, 360-1-m, 360-2-1, 360-2-2, 360-2-m, . . . , 360-n-1, 360-n-2, 360-n-m.

In one embodiment, the sequence setting step S220 includes setting the operation stop sequence of the one or more switching element modules 360-1-1, 360-1-2, 360-1-m, 360-2-1, 360-2-2, 360-2-m, . . . , 360-n-1, 360-n-2, 360-n-m that are being driven. For example, in the case of the converter 350-1, in the sequence setting step S220, the operation stop sequence of the one or more switching element modules 360-1-1, 360-1-2, 360-1-m, 360-2-1, 360-2-2, 360-2-m, . . . , 360-n-1, 360-n-2, 360-n-m is set in order of the switching element module 360-1-1, . . . , the switching element module 360-1-m. In the sequence setting step S220, a method for setting the operation stop sequence of switching element modules is not limited to the aforementioned example. For example, the operation stop sequence of the one or more switching element modules 360-1-1, 360-1-2, 360-1-m, 360-2-1, 360-2-2, 360-2-m, . . . , 360-n-1, 360-n-2, 360-n-m may be set in such a manner that the operations of the odd-numbered switching element modules 360-1-1, 360-1-3, . . . , 360-2-1, 360-2-3, . . . , 360-n-1, 360-n-3, . . . , are first stopped in order of increasing number and the operations of the even-numbered switching element modules 360-1-2, 360-1-4, . . . , 360-2-2, 360-2-4, . . . , 360-n-2, 360-n-4, . . . , are then stopped in order of increasing number.

In one embodiment, in the converter driving step S230, if the operation of any one of the one or more switching element modules 360-1-1, 360-1-2, 360-1-m, 360-2-1, 360-2-2, 360-2-m, . . . , 360-n-1, 360-n-2, 360-n-m that are being driven is to be stopped, the operation of a switching element module that belongs to the switching element modules 360-1-1, 360-1-2, 360-1-m, 360-2-1, 360-2-2, 360-2-m, . . . , 360-n-1, 360-n-2, 360-n-m and that has the next sequence of a switching element module whose operation has been finally stopped is stopped based on the set operation stop sequence of the switching element modules 360-1-1, 360-1-2, 360-1-m, 360-2-1, 360-2-2, 360-2-m, . . . , 360-n-1, 360-n-2, 360-n-m. The case where the operation of any one of the one or more switching element modules 360-1-1, 360-1-2, 360-1-m, 360-2-1, 360-2-2, 360-2-m, . . . , 360-n-1, 360-n-2, 360-n-m is to be stopped includes a case where the wind never blows and a case where the wind blows more weakly. In the former case, in the converter driving step S230, the operation of a switching element module that belongs to the switching element modules 360-1-1, 360-1-2, 360-1-m, 360-2-1, 360-2-2, 360-2-m, . . . , 360-n-1, 360-n-2, 360-n-m and that has the next sequence of a switching element module whose operation has been finally stopped is stopped based on the operation stop sequence of the switching element modules 360-1-1, 360-1-2, 360-1-m, 360-2-1, 360-2-2, 360-2-m, . . . , 360-n-1, 360-n-2, 360-n-m set in the sequence setting step S220.

Figure 8:
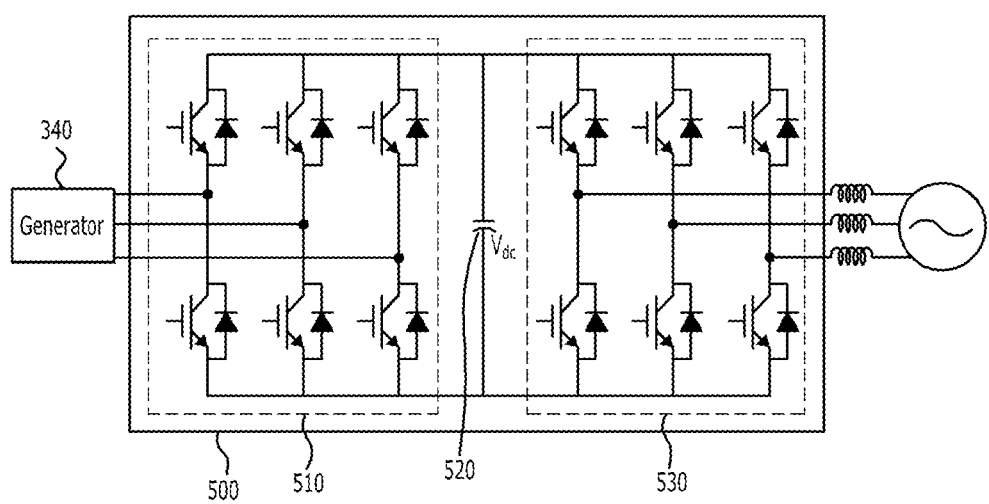
FIG. 8 shows the configuration of a switching element module according to an embodiment.

FIG. 8 shows the configuration of a switching element module 500 according to an embodiment. A detailed configuration of each of the switching element modules 360-1-1, 360-1-2, 360-1-m, 360-2-1, 360-2-2, 360-2-m, . . . , 360-n-1, 360-n-2, 360-n-m shown in FIG. 5 is the same as that of the switching element module 500 shown in FIG. 8. The switching element module 500 includes the 6 switching elements of an AC/DC converter 510, the 6 switching elements of a DC/AC converter 530, and a DC link 520. The AC/DC converter 510 converts AC power, output by the generator, into a DC form. The DC/AC converter 530 converts the converted DC power into an AC form and sends it to the grid side. A configuration for converting AC power into DC power or a configuration for converting DC power into AC power is evident to a person having ordinary skill in the converter field.

Power supplied to the grid three-phase AC power. In order to transfer the phase of any one of the three phases, for example, AC power to the grid, two of the 6 switching elements of the AC/DC converter 510 needs to be turned on, and two of the 6 switching elements of the DC/AC inverter 530 needs to be turned on. Such a characteristic is evident to a person having ordinary skill in the converter field.

FIGS. 9 to 12 show an apparatus for driving switching element modules in a wind power generation system according to an embodiment of the present disclosure.

Figure 9:
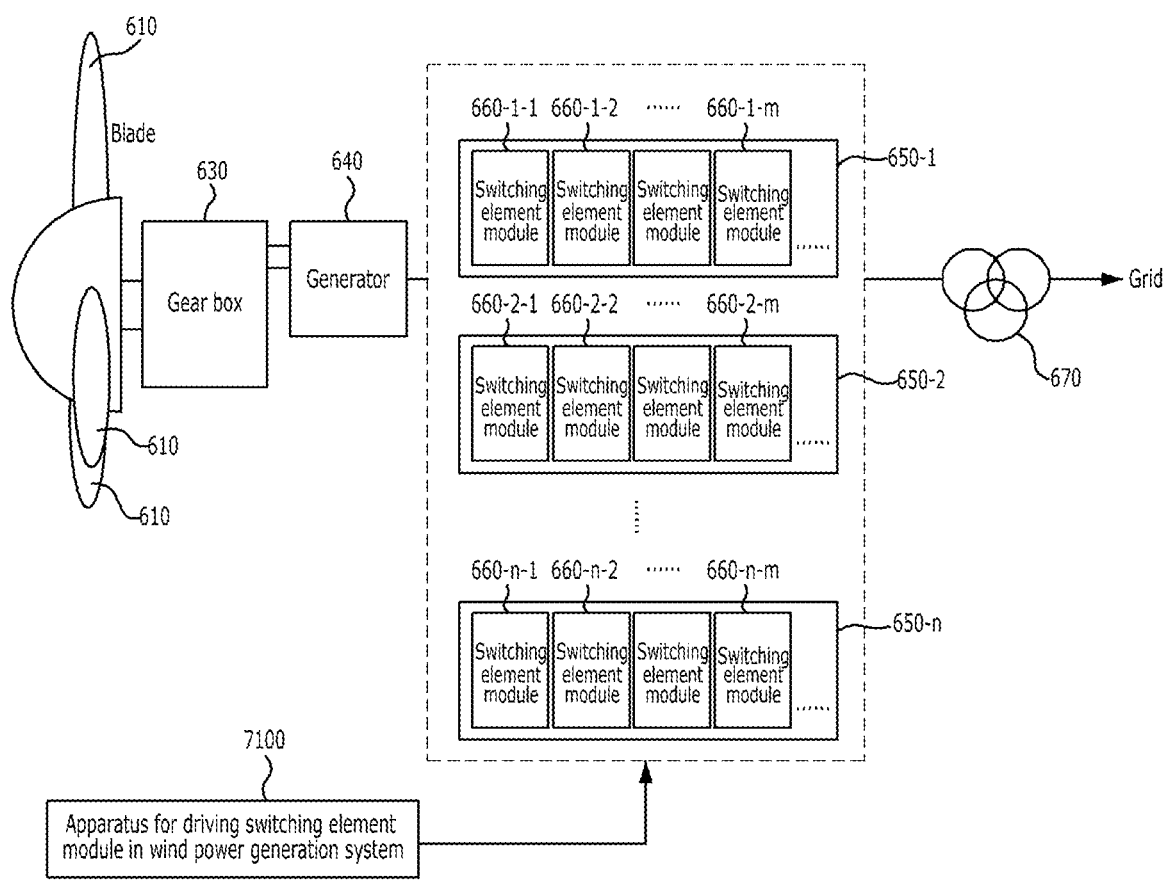
FIG. 9 shows a configuration of a wind power generation system.

FIG. 9 shows a configuration of the wind power generation system.

The wind power generation system includes a blade 610, a gear box 630, a generator 640, a plurality of converters 650-1, 650-2, . . . , 650-*n*, a transformer 670, and an apparatus 700 for driving converters in a wind power generation system in a wind power generation system.

In one embodiment, the blade 610 generates kinetic energy through rotation attributable to wind energy. That is, the blade 610 is a machine for converting energy of a fluid, such as water, gas or vapor, into a mechanical work. The blade 610 may be implemented in a direction vertical or horizontal to the ground, and includes one or more wings.

In one embodiment, the gear box 630 is disposed between the blade 610 and the rotor of the generator 640 to be described later. The gear box 630 functions to increase the speed of revolution of the rotor of the generator 640 when the velocity of the wind is low and thus the speed of revolution of the blade 610 is low.

In one embodiment, the generator 640 generates electricity using rotatory power after the rotor converts energy of a fluid into the rotatory power. That is, the generator 640 is an apparatus for converting mechanical energy into electric energy. A synchronizer or inductor is chiefly used as the generator 640. The synchronizer may be divided into a winding field type and a permanent magnet type depending on the type of a field. The inductor may be divided into a squirrel type and a winding type depending on the structure of the rotor. More specifically, the winding type inductor, the winding type induction generator 640 or the induction generator 640 may be installed on the place in which the velocity of the wind is variable.

In one embodiment, the converters 650-1, 650-2, . . . , 650-*n* includes an AC/DC converter, a DC/AC inverter, and a DC link connecting the AC/DC converter and the DC/AC inverter. The converters 650-1, 650-2, . . . , 650-*n* are connected in parallel between the generator 640 and the transformer 670. FIG. 9 illustrates the n converters 650-1, 650-2, . . . , 650-*n* that are connected in parallel.

The AC/DC converter converts three-phase AC power, output by the generator 640, into a DC form. The DC/AC inverter converts the converted DC power into AC power suitable to be used for the grid side. The DC link is connected in parallel to the AC/DC converter and the DC/AC inverter, and may send energy between the AC/DC converter and the DC/AC inverter. The DC link may be implemented using a capacitor, but any device capable of charging and discharging energy may be used as the DC link. FIG. 9 discloses the plurality of converters connected in parallel, but the present disclosure is not limited thereto. For example, only a single converter may be used.

In one embodiment, the converters 650-1, 650-2, . . . , 650-*n* include one or more switching element modules 660-1-1, 660-1-2, 660-1-*m*, 660-2-1, 660-2-2, 660-2-*m*, . . . , 660-*n*-1, 660-*n*-2, 660-*n*-*m*. FIG. 9 illustrates m switching element modules 660-1-1, 660-1-2, 660-1-*m*, 660-2-1, 660-2-2, 660-2-*m*, . . . , 660-*n*-1, 660-*n*-2, 660-*n*-*m* that are included in the converters 650-1, 650-2, . . . , 650-*n*, respectively, and that are connected in parallel. The AC/DC converter includes 6 switching elements, and the DC/AC inverter also includes 6 switching elements. The switching element is a transistor, and may include at least one of semiconductor switching elements, such as gate turnoff thyristors (GTO), an insulated gate bipolar transistors (IGBT), integrated gate commutated thyristors (IGCT), bipolar junction transistors (BJT) and metal oxide semiconductor field effect transistors (MOSFET).

AC power output by the generator 640 is three-phase AC power. Each of the three phases is connected to the two switching elements of the AC/DC converter. Each phase in the three-phase AC power supplied to a grid is connected to the two switching elements of the DC/AC inverter. That is, two of the 6 switching elements of the AC/DC converter operate so that an electric current flows into one phase. Two of the 6 switching elements of the DC/AC inverter operate so that an electric current flows into one phase.

In one embodiment, the switching element modules 660-1-1, 660-1-2, 660-1-*m*, 660-2-1, 660-2-2, 660-2-*m*, . . . , 660-*n*-1, 660-*n*-2, 660-*n*-*m* include the 6 switching elements of the AC/DC converter, the 6 switching elements of the DC/AC converter, and the DC link. A plurality of switching element modules of the switching element modules 660-1-1, 660-1-2, 660-1-*m*, 660-2-1, 660-2-2, 660-2-*m*, . . . , 660-*n*-1, 660-*n*-2, 660-*n*-*m* is connected in parallel to form each of the converters 650-1, 650-2, . . . , 650-*n*.

In one embodiment, the transformer 670 is a part for changing a voltage or current value of an AC using an electromagnetic induction phenomenon, and is connected to the grid. In this case, the grid may refer to a power grid associated with the wind power generation system.

Figure 10:
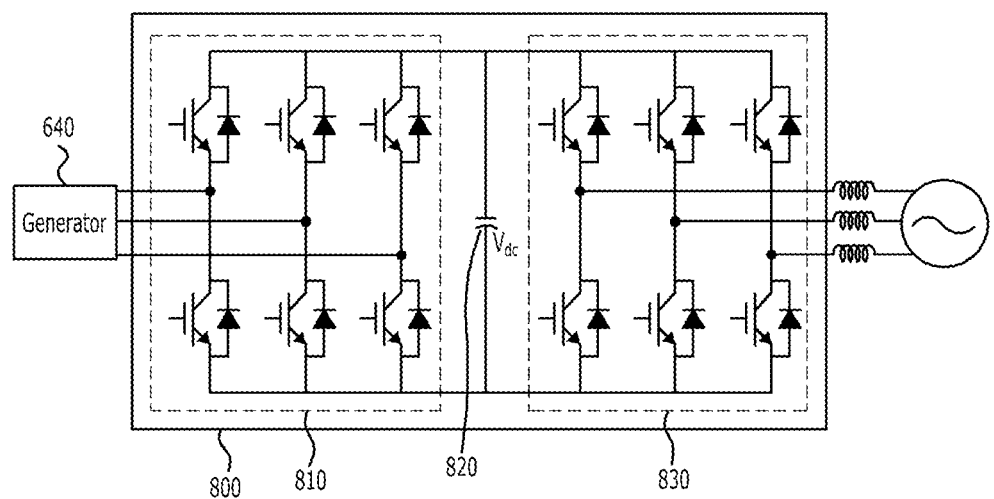
FIG. 10 shows the configuration of a switching element module according to an embodiment.

FIG. 10 shows the configuration of a switching element module 800 according to an embodiment. A detailed configuration of each of the switching element modules 660-1-1, 660-1-2, 660-1-*m*, 660-2-1, 660-2-2, 660-2-*m*, . . . , 660-*n*-1, 660-*n*-2, 660-*n*-*m* shown in FIG. 9 is the same as that of the switching element module 800 shown in FIG. 10. The switching element module 800 includes the 6 switching elements of an AC/DC converter 810, the 6 switching elements of a DC/AC converter 830, and a DC link 820. The AC/DC converter 810 converts AC power, output by the generator, into a DC form. The DC/AC converter 830 converts the converted DC power into an AC form and sends it to the grid side. A configuration for converting AC power into DC power or a configuration for converting DC power into AC power is evident to a person having ordinary skill in the converter field.

Power supplied to the grid three-phase AC power. In order to transfer the phase of any one of the three phases, for example, AC power to the grid, two of the 6 switching elements of the AC/DC converter 810 needs to be turned on, and two of the 6 switching elements of the DC/AC inverter 830 needs to be turned on. Such a characteristic is evident to a person having ordinary skill in the converter field.

Figure 11:
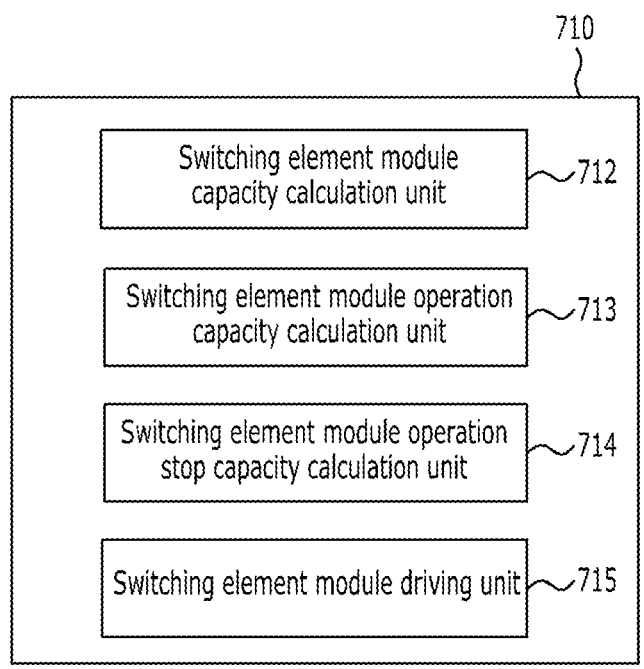
FIG. 11 shows the configuration of an apparatus for driving switching element modules in a wind power generation system according to an embodiment.

FIG. 11 shows the configuration of the apparatus 700 for driving switching element modules in a wind power generation system according to an embodiment.

In one aspect, the apparatus 700 for driving switching element modules in a wind power generation system includes a switching element module control unit 710.

In one embodiment, the switching element module control unit 710 drives a plurality of switching element modules that are included in a converter connected between the generator and the grid and that are connected in parallel. In this case, the switching element module control unit 710 sequentially drives the switching element modules one by one when output power of the converter increases, and sequentially stops the operations of the switching element modules one by one when output power of the converter decreases.

The number of converters connected between the generator and the grid may be one or more. If the number of converters connected between the generator and the grid is one, the switching element module control unit 710 sequentially drives a plurality of switching element modules included in the converter one by one or sequentially the operations of the switching element modules one by one.

If a plurality of converters connected in parallel is present between the generator and the grid, the apparatus 700 for driving switching element modules in a wind power generation system drives the plurality of converters 650-1, 650-2, . . . , 650-*n* connected in parallel between the generator and the grid. In this case, the apparatus 700 sequentially drives the converters one by one when output power of the grid increases and sequentially stops the operations of the converters one by one when output power of the grid decreases. As shown in FIG. 9, the plurality of converters 650-1, 650-2, . . . , 650-*n* connected in parallel is present between the generator and the grid.

When the wind does not blow and starts to blow and thus the blade is rotated, power may be supplied to the grid. At this time, when the wind blows gradually strongly, the apparatus 700 for driving switching element modules in a wind power generation system further drives a new converter one by one in response to increased power supplied to the grid. For example, the apparatus 700 for driving switching element modules in a wind power generation system drives the converter 650-1 when the wind first blows and sequentially drives the converter 650-2, . . . , the converter 650-*n* when the wind becomes stronger.

Accordingly, the apparatus 700 for driving switching element modules in a wind power generation system can reduce output power supplied to a grid versus power consumed by a converter by sequentially further driving a converter when output power supplied to the grid increase in accordance with the velocity of the wind.

When the velocity of the wind is gradually reduced from the state in which the wind blows strongly, the speed of revolution of the blade is reduced, and thus the amount of power supplied to the grid is also reduced. When the amount of power supplied to the grid is reduced, the apparatus 700 for driving switching element modules in a wind power generation system sequentially stops the operations of one or more converters one by one. For example, if the wind blows at the highest speed, maximum rating power is supplied to the grid, and thus all of the converters 650-*n* are driven, when the velocity of the wind is gradually reduced, the apparatus 700 for driving switching element modules in a wind power generation system first stops the operation of the converter 650-*n*. When power supplied to the grid is subsequently reduced because the velocity of the wind is gradually reduced, the switching element module control unit 710 sequentially stops the operations of the plurality of converters 650-1, 650-2, . . . , 650-*n* in order of the converter 650-*n*-1, . . . , the converter 650-1.

The apparatus 700 for driving switching element modules in a wind power generation system can reduce output power supplied to a grid versus power consumed by a converter by sequentially stopping the operations of converters when output power supplied to the grid is reduced in accordance with the velocity of the wind.

Driving (or operating) a converter refers to switching element modules included in the converter being turned on, and that the 12 switching elements of the switching element module are turned on/off so that three-phase power is transferred from the generator to the grid. In order to transfer three-phase AC power to the grid so that it has a difference of 120 degrees, which one of the 12 switching elements included in the switching element module is required and when the switching elements have to be turned on/off are evident to a person having ordinary skill in the converter field.

As described above, the number of converters that operate is increased as power supplied to the grid is increased. When driving a converter, the switching element module control unit 710 sequentially drives a plurality of switching element modules included in the converter one by one or sequentially stops the operations of the plurality of switching element modules in response to power transferred by the converter. For example, in the state in which the converter 650-2 has to be driven as power supplied to the grid is increased in addition to the converter 650-1 being driven, the switching element module control unit 710 determines that which one of the switching element modules of the converter 650-2 is to be driven.

In one embodiment, the switching element module control unit 710 includes a switching element module capacity calculation unit 712, a switching element module operation capacity calculation unit 713 and a switching element module driving unit 715.

In one embodiment, the switching element module capacity calculation unit 712 calculates each switching element module capacity based on each converter capacity and the number of switching element modules. The switching element module capacity calculation unit 712 first calculates each converter capacity. The converter capacity is calculated based on the rating capacity of the grid and the number of converters. The rating capacity of the grid refers to the greatest power which may be supplied to the grid. When the wind becomes strong, power which may be supplied to the grid is gradually increased. Power exceeding the rating capacity, that is, the greatest power, cannot be supplied to the grid.

The number of converters is the number of converters 650-1, 650-2, . . . , 650-*n* connected in parallel between the generator and the grid. In the example of FIG. 9, the number of converters 650-1, 650-2, . . . , 650-*n* connected in parallel is n.

The switching element module capacity calculation unit 712 calculates each converter capacity by dividing the rating capacity of the grid by the number of converters. If the rating capacity of the grid is 3 MW and the number of converters is n, the switching element module capacity calculation unit 712 calculates 3 MW/n as each converter capacity. If 3 MW, that is, the rating capacity of the grid, is supplied to the grid, power transferred from each of the n converters to the grid is 3 MW/n.

The switching element module capacity calculation unit 712 calculates each switching element module capacity by dividing each calculated converter capacity by the number of switching element modules. The converters 650-1, 650-2, . . . , 650-*n* of FIG. 9 include m switching element modules 660-1-1, 660-1-2, 660-1-*m*, 660-2-1, 660-2-2, 660-2-*m*, . . . , 660-*n*-1, 660-*n*-2, 660-*n*-*m*, respectively. Each of the converters according to an embodiment of the present disclosure includes the same number of switching element modules, that is, m switching element modules.

For example, if a converter capacity is 3 MW/n and the number of switching element modules is m, the switching element module capacity calculation unit 712 calculates 3 MW/(n*m) as each switching element module capacity.

In one embodiment, the switching element module operation capacity calculation unit 713 calculates each switching element module operation capacity based on each calculated switching element module capacity and a switching element module operation capacity ratio. Each switching element module capacity is calculated by the switching element module capacity calculation unit 712, and a detailed process for calculating each switching element module capacity has been described above. Each switching element module operation capacity may be calculated by multiplying each calculated switching element module capacity by a switching element module operation capacity ratio.

The switching element module operation capacity ratio may be freely set depending on the rating capacity of the grid and/or the rating capacity of each converter, but a detailed numerical value thereof is described later. Each switching element module operation capacity is power, that is, a criterion by which a switching element module having a next sequence is driven. For example, whether or not to newly drive a switching element module of a next sequence is determined depending on whether the capacity of a the switching element module that belongs to switching element modules being driven and that has the last sequence exceeds each converter operation capacity or not.

In one embodiment, the switching element module driving unit 715 drives a switching element module of a next sequence when the current capacity of a switching element module that belongs to switching element modules being driven and that has the last sequence exceeds each converter operation capacity. The switching element modules being driven may refer to a switching element module included in a converter that belongs to converters transferring three-phase AC power toward the grid and that has the last sequence.

A switching element module that belongs to switching element modules being driven and that has the last sequence is a switching element module that belongs to the switching element modules of FIG. 9 and has the greatest number.

A switching element module that belongs to switching element modules being driven and that has the last sequence refers to a switching element module that belongs to switching element modules included in a converter belonging to converters being driven and having the last sequence and that has the last sequence. For example, when all of the converters are driven and the converter 650-$n$ is a converter having the last sequence, the switching element module is a switching element module that belongs to the switching element modules of the converter 650-$n$ and that has the last sequence.

The current capacity of a switching element module refers to the amount of power now transferred from the switching element module toward the grid. Each switching element module operation capacity is a value calculated by the switching element module operation capacity calculation unit 713, and a process for calculating the switching element module operation capacity has been described above.

That is, the switching element module driving unit 715 drives a switching element module of a next sequence when the amount of power now transferred from a switching element module having the last sequence toward the grid exceeds each switching element module operation capacity. For example, if only the converter 650-1 is being driven and only the switching element module 660-1-1 of the switching element modules 660-1-1, 660-1-2, . . . , 660-1-$m$ included in the converter 650-1 is being driven, the switching element module 660-1-1 is a switching element module having the last sequence. In the aforementioned example, when the amount of power now transferred from the switching element module 660-1-1 belonging to the switching element modules and having the last sequence toward the grid exceeds each switching element module operation capacity, the switching element module driving unit 715 drives the switching element module 660-1-2, that is, a switching element module of a next sequence. The aforementioned operating method is applied to all of the converters.

In one embodiment, the switching element module control unit 710 further includes a switching element module operation stop capacity calculation unit 714.

In one embodiment, the switching element module operation stop capacity calculation unit 714 calculates each switching element module operation stop capacity based on each calculated switching element module capacity and a switching element module operation stop capacity ratio. The switching element module capacity calculation unit 712 calculates each switching element module capacity by dividing each converter capacity by the number of switching element modules. The switching element module operation stop capacity ratio may be freely set depending on the rating capacity of the grid and/or the rating capacity of each converter, but a detailed numerical value thereof is described later.

Each switching element module operation stop capacity is power, that is, a criterion by which the operation of a switching element module that belongs to switching element modules being driven and that has the last sequence is stopped. For example, whether or not to stop the operation of a switching element module being driven and having the last sequence is determined depending on whether the capacity of the switching element module that belongs to switching element modules being driven in the converter of the last sequence and that has the last sequence exceeds each switching element module operation capacity and then becomes the switching element module operation capacity or less.

In one embodiment, when the capacity of a switching element module that belongs to switching element modules being driven and that has the last sequence exceeds each switching element module operation stop capacity and then becomes the switching element module operation stop capacity or less, the switching element module driving unit 715 stops the operation of the switching element module that belongs to the switching element modules being driven and that has the last sequence at a point of time at which the capacity of the switching element module that belongs to the switching element modules being driven and that has the last sequence exceeds each converter operation stop capacity and then becomes the converter operation stop capacity or less. The switching element module that belongs to the switching element modules being driven and that has the last sequence is a switching element module that belongs to switching element modules being driven in a converter belonging to converters being driven and having the last sequence and that has the last sequence.

When the capacity of a switching element module that belongs to switching element modules being driven and that has the last sequence exceeds each switching element module operation stop capacity and then becomes the switching element module operation stop capacity or less, the switching element module driving unit 715 stops the operation of the switching element module that belongs to the switching element modules being driven and that has the last sequence. If each switching element module operation capacity is smaller than each switching element module operation stop capacity, the capacity of a switching element module that belongs to switching element modules being driven and that has the last sequence is greater than a corresponding switching element module operation capacity, but may be smaller than a corresponding switching element module operation stop capacity.

In this case, when the capacity of the switching element module having the last sequence gradually increases and exceeds the converter operation capacity, the switching element module driving unit 715 drives a converter of a next sequence.

More specifically, for example, if a switching element module having the last sequence is the switching element module 660-1-2, when the capacity of the switching element module 660-1-2, that is, the switching element module of the last sequence, gradually increases as the velocity of the wind increases and then exceeds its switching element module operation capacity, the switching element module driving unit 715 drives the converter 660-1-3, that is, a switching element module of a next sequence.

If the capacity of a switching element module that is being driven and has the last sequence gradually increases, exceeds a corresponding switching element module operation stop capacity and then becomes smaller than the switching element module operation stop capacity, the capacity of a switching element module that belongs to switching element modules being driven and that has the last sequence is greater than a corresponding switching element module operation capacity, but may be smaller than a corresponding switching element module operation stop capacity. In this case, the operation of the switching element module being driven and having the last sequence is stopped.

When the capacity of a switching element module being driven and having the last sequence gradually increases, exceeds a corresponding switching element module operation stop capacity and then becomes smaller than the switching element module operation stop capacity, the operation of the switching element module being driven and having the last sequence is stopped. When the capacity of a switching element module having a sequence anterior to that of the stopped switching element module increases any further, the switching element module driving unit 715 drives the stopped switching element module again.

More specifically, for example, assuming that a switching element module being driven and having the last sequence is the switching element module 660-1-2, when the capacity of the switching element module 660-1-2 gradually increases, exceeds a corresponding converter operation stop capacity and then becomes smaller than the converter operation stop capacity, the operation of the switching element module 660-1-2, that is, the switching element module being driven and having the last sequence, is stopped. If the capacity of the switching element module 660-1-1, that is, a switching element module having a sequence anterior to that of the switching element module 660-1-2 that is the stopped switching element module, increases any further because the wind becomes strong again, the switching element module driving unit 715 drives the switching element module 660-1-2, that is, the stopped switching element module, again.

In one embodiment, the switching element module operation capacity ratio and the switching element module operation stop capacity ratio may be different. The switching element module operation capacity ratio and the switching element module operation stop capacity ratio have been described above.

The apparatus 700 for driving switching element modules in a wind power generation system can reduce output power supplied to a grid versus power consumed by a converter by making different a criterion by which another switching element module is newly driven in response to the increase of output power supplied to the grid and a criterion by which the operation of a switching element module being driven is stopped in response to the decrease of output power supplied to the grid.

In one embodiment, the switching element module operation capacity ratio is smaller than the switching element module operation stop capacity ratio.

If each switching element module operation capacity is smaller than each switching element module operation stop capacity, the capacity of a switching element module that belongs to switching element modules being driven and that has the last sequence is greater than a corresponding switching element module operation capacity, but may be smaller than a corresponding switching element module operation stop capacity.

In this case, when the capacity of the switching element module having the last sequence gradually increases and exceeds the converter operation capacity, the switching element module driving unit 715 drives a converter of a next sequence.

More specifically, for example, if a switching element module having the last sequence is the switching element module 660-1-2, when the capacity of the switching element module 660-1-2, that is, the switching element module having the last sequence, gradually increases in accordance with the increase of the velocity of the wind and exceeds a corresponding switching element module operation capacity, the switching element module driving unit 715 drives the converter 660-1-3, that is, a switching element module of a next sequence.

If the capacity of a switching element module being driven and having the last sequence gradually increases, exceeds a corresponding switching element module operation stop capacity and then becomes smaller than the switching element module operation stop capacity, the capacity of a switching element module that belongs to switching element modules being driven and that has the last sequence is greater than a corresponding switching element module operation capacity, but may be smaller than a corresponding switching element module operation stop capacity. In this case, the operation of the switching element module being driven and having the last sequence is stopped.

When the capacity of a switching element module being driven and having the last sequence gradually increases, exceeds a corresponding switching element module operation stop capacity and then becomes smaller than the switching element module operation stop capacity, the operation of the switching element module being driven and having the last sequence is stopped. If the capacity of a switching element module having a sequence anterior to that of the stopped switching element module increases any further, the switching element module driving unit 715 drives the stopped switching element module again.

More specifically, for example, assuming that a switching element module being driven and having the last sequence is the switching element module 660-1-2, when the capacity of the switching element module 660-1-2 gradually increases, exceeds a corresponding converter operation stop capacity and then becomes smaller than the converter operation stop capacity, the operation of the switching element module 660-1-2, that is, the switching element module now being drive and having the last sequence, is stopped. If the capacity of the switching element module 660-1-1, that is, a switching element module having a sequence anterior to that of the switching element module 660-1-2 that is the stopped switching element module, increases any further because the wind becomes strong again, the switching element module driving unit 715 drives the switching element module 660-1-2, that is, the stopped switching element module.

The apparatus 700 for driving switching element modules in a wind power generation system can reduce output power supplied to a grid versus power consumed by a converter by making different a criterion by which another switching element module is newly driven in response to the increase of output power supplied to the grid and a criterion by which the operation of a switching element module being driven is stopped in response to the decrease of output power supplied to the grid.

In one embodiment, the switching element module operation capacity ratio is 90~710%. If the rating capacity of the grid is 3 MW, the number of switching element modules is n, and the number of switching element modules is m, the switching element module capacity calculation unit 712 calculates 3 MW/(n*m) as each switching element module capacity. The switching element module operation capacity calculation unit 713 calculates (3 MW*0.9)/(n*m)~(3 MW*1.1)/(n*m) as each switching element module operation capacity. In this case, the switching element module operation capacity may be (3 MW*1.1)/(n*m), that is, a maximum value.

In this case, if the capacity of a switching element module being driven exceeds (3 MW*1.1)/(n*m), a switching element module that belongs to switching element modules being driven and that has the last sequence is newly driven. If the capacity of a switching element module being driven exceeds (3 MW*1.1)/(n*m), this refers to the capacity of each of switching element modules being driven exceeding (3 MW*1.1)/(n*m). A value calculated by dividing a value, calculated by dividing current power supplied to the grid by the number of converters, by the number of switching element modules is power transferred from each of switching element modules being driven to the grid.

In one embodiment, the switching element module operation stop capacity ratio is 710~720%. If the rating capacity of the grid is 3 MW, the number of switching element modules is n, and the number of switching element modules is m, the switching element module capacity calculation unit 712 calculates 3 MW/(n*m) as each switching element module capacity. The switching element module operation stop capacity calculation unit 714 calculates (3 MW*1.1)/(n*m)~(3 MW*1.2)/(n*m) as a switching element module operation stop capacity. In this case, the switching element module operation stop capacity may be (3 MW*1.2)/(n*m), that is, a maximum value.

In this case, when the capacity of a switching element module being driven exceeds (3 MW*1.2)/(n*m) and becomes smaller than (3 MW*1.2)/(n*m), the operation of a switching element module that belongs to switching element modules being driven and that has the last sequence. If the capacity of a switching element module being driven becomes smaller than (3 MW*1.2)/(n*m), this refers to the capacity of each of switching element modules being driven being smaller than (3 MW*1.2)/(n*m). A value calculated by dividing a value, calculated by dividing current power supplied to the grid by the number of converters, by the number of switching element modules is power transferred from each of switching element modules being driven to the grid.

Figure 12:
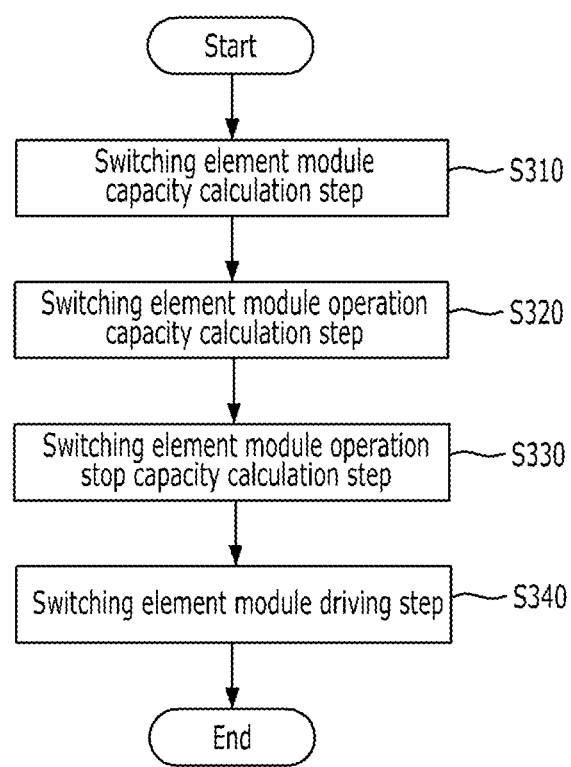
FIG. 12 shows a flow of a method for driving switching element modules in a wind power generation system according to an embodiment.

FIG. 12 shows a flow of a method for driving switching element modules in a wind power generation system according to an embodiment.

FIG. 12 shows the configuration of a method for driving switching element modules in a wind power generation system according to an embodiment.

In one aspect, the method for driving switching element modules in a wind power generation system includes a switching element module control step.

In one embodiment, the switching element module control step includes driving a plurality of switching element modules that are included in a converter connected between the generator and the grid and that are connected in parallel. In this case, the switching element module control step includes sequentially driving the switching element modules one by one when output power of the converter increases, and sequentially stops the operations of the switching element modules one by one when output power of the converter decreases.

The number of converters connected between the generator and the grid may be one or more. If the number of converters connected between the generator and the grid is one, the switching element module control step sequentially drives a plurality of switching element modules included in the converter one by one or sequentially the operations of the switching element modules one by one.

If a plurality of converters connected in parallel is present between the generator and the grid, the method for driving switching element modules in a wind power generation system includes driving the plurality of converters 650-1, 650-2, . . . , 650-n connected in parallel between the generator and the grid. In this case, the method includes sequentially driving the converters one by one when output power of the grid increases and sequentially stopping the operations of the converters one by one when output power of the grid decreases. As shown in FIG. 9, the plurality of converters 650-1, 650-2, . . . , 650-n connected in parallel is present between the generator and the grid.

When the wind does not blow and starts to blow and thus the blade is rotated, power may be supplied to the grid. At this time, when the wind blows gradually strongly, the method for driving switching element modules in a wind power generation system further includes driving a new converter one by one in response to increased power supplied to the grid. For example, the method for driving switching element modules in a wind power generation system includes driving the converter 650-1 when the wind first blows and sequentially drives the converter 650-2, . . . , the converter 650-n when the wind becomes stronger.

Accordingly, the method for driving switching element modules in a wind power generation system can reduce output power supplied to a grid versus power consumed by a converter by sequentially further driving a converter when output power supplied to the grid increase in accordance with the velocity of the wind.

When the velocity of the wind is gradually reduced from the state in which the wind blows strongly, the speed of revolution of the blade is reduced, and thus the amount of power supplied to the grid is also reduced. The method for driving switching element modules in a wind power generation system includes sequentially stopping the operations of one or more converters one by one when the amount of power supplied to the grid is reduced. For example, the method for driving switching element modules in a wind power generation system includes first stopping the operation of the converter 650-n if the wind blows at the highest speed, maximum rating power is supplied to the grid, and thus all of the converters 650-n are driven, when the velocity of the wind is gradually reduced. The switching module control step includes sequentially stopping the operations of the plurality of converters 650-1, 650-2, . . . , 650-n in order of the converter 650-n-1, . . . , the converter 650-1 when power supplied to the grid is subsequently reduced because the velocity of the wind is gradually reduced.

The method for driving switching element modules in a wind power generation system can reduce output power supplied to a grid versus power consumed by a converter by sequentially stopping the operations of converters when output power supplied to the grid is reduced in accordance with the velocity of the wind.

Driving (or operating) a converter may refer to switching element modules included in the converter being turned on, and refers to the 12 switching elements of the switching element module being turned on/off so that three-phase power is transferred from the generator to the grid. In order to transfer three-phase AC power to the grid so that it has a difference of 120 degrees, which one of the 12 switching elements included in the switching element module is required and when the switching elements have to be turned on/off are evident to a person having ordinary skill in the converter field.

As described above, the number of converters that operate is increased as power supplied to the grid is increased. In the switching element module control step, when a converter is driven, a plurality of switching element modules included in the converter is sequentially driven one by one or the operations of the plurality of switching element modules are sequentially stopped in response to power transferred by the converter. For example, in the switching element module control step, in the state in which the converter 650-2 has to be driven as power supplied to the grid is increased in addition to the converter 650-1 being driven, which one of the switching element modules of the converter 650-2 is to be driven is determined.

In one embodiment, the switching element module control step includes a switching element module capacity calculation step S310, a switching element module operation capacity calculation step S320 and a switching element module driving step S340.

In one embodiment, the switching element module capacity calculation step S310 includes calculating each switching element module capacity based on each converter capacity and the number of switching element modules. The switching element module capacity calculation step S310 includes first calculating each converter capacity. The converter capacity is calculated based on the rating capacity of the grid and the number of converters. The rating capacity of the grid refers to the greatest power which may be supplied to the grid. When the wind becomes strong, power which may be supplied to the grid is gradually increased. Power exceeding the rating capacity, that is, the greatest power, cannot be supplied to the grid.

The number of converters is the number of converters 650-1, 650-2, . . . , 650-$n$ connected in parallel between the generator and the grid. In the example of FIG. 9, the number of converters 650-1, 650-2, . . . , 650-$n$ connected in parallel is n.

The switching element module capacity calculation step S310 includes calculating each converter capacity by dividing the rating capacity of the grid by the number of converters. In the switching element module capacity calculation step S310, if the rating capacity of the grid is 3 MW and the number of converters is n, 3 MW/n is calculated as each converter capacity. If 3 MW, that is, the rating capacity of the grid, is supplied to the grid, power transferred from each of the n converters to the grid is 3 MW/n.

The switching element module capacity calculation step S310 includes calculating each switching element module capacity by dividing each calculated converter capacity by the number of switching element modules. The converters 650-1, 650-2, . . . , 650-$n$ of FIG. 9 include m switching element modules 660-1-1, 660-1-2, 660-1-$m$, 660-2-1, 660-2-2, 660-2-$m$, . . . , 660-$n$-1, 660-$n$-2, 660-$n$-$m$, respectively. Each of the converters according to an embodiment of the present disclosure includes the same number of switching element modules, that is, m switching element modules.

For example, in the switching element module capacity calculation step S310, if a converter capacity is 3 MW/n and the number of switching element modules is m, 3 MW/(n*m) is calculated as each switching element module capacity.

That is, in the switching element module capacity calculation step, each converter capacity is calculated by dividing the rating capacity of the grid by the number of converters, and each switching element module capacity is calculated by dividing each calculated converter capacity by the number of switching element modules.

In one embodiment, the switching element module operation capacity calculation step S320 includes calculating each switching element module operation capacity based on each calculated switching element module capacity and a switching element module operation capacity ratio. Each switching element module capacity is calculated in the switching element module capacity calculation step S310, and a detailed process for calculating each switching element module capacity has been described above. Each switching element module operation capacity may be calculated by multiplying each calculated switching element module capacity by a switching element module operation capacity ratio.

The switching element module operation capacity ratio may be freely set depending on the rating capacity of the grid and/or the rating capacity of each converter, but a detailed numerical value thereof is described later. Each switching element module operation capacity is power, that is, a criterion by which a switching element module having a next sequence is driven. For example, whether or not to newly drive a switching element module of a next sequence is determined depending on whether the capacity of a the switching element module that belongs to switching element modules being driven and that has the last sequence exceeds each converter operation capacity or not.

In one embodiment, the switching element module driving step S340 includes driving a switching element module of a next sequence when the current capacity of a switching element module that belongs to switching element modules being driven and that has the last sequence exceeds each converter operation capacity. The switching element modules being driven may refer to a switching element module included in a converter that belongs to converters transferring three-phase AC power toward the grid and that has the last sequence.

A switching element module that belongs to switching element modules being driven and that has the last sequence is a switching element module that belongs to the switching element modules of FIG. 9 and has the greatest number.

A switching element module that belongs to switching element modules being driven and that has the last sequence refers to a switching element module that belongs to switching element modules included in a converter belonging to converters being driven and having the last sequence and that has the last sequence. For example, when all of the converters are driven and the converter 650-$n$ is a converter having the last sequence, the switching element module is a switching element module that belongs to the switching element modules of the converter 650-*n* and that has the last sequence.

The current capacity of a switching element module refers to the amount of power now transferred from the switching element module toward the grid. Each switching element module operation capacity is a value calculated in the switching element module operation capacity calculation step S320, and a process for calculating the switching element module operation capacity has been described above.

That is, the switching element module driving step S340 includes driving a switching element module of a next sequence when the amount of power now transferred from a switching element module having the last sequence toward the grid exceeds each switching element module operation capacity. For example, if only the converter 650-1 is being driven and only the switching element module 660-1-1 of the switching element modules 660-1-1, 660-1-2, . . . , 660-1-*m* included in the converter 650-1 is being driven, the switching element module 660-1-1 is a switching element module having the last sequence. In the aforementioned example, when the amount of power now transferred from the switching element module 660-1-1 belonging to the switching element modules and having the last sequence toward the grid exceeds each switching element module operation capacity, the switching element module driving step S340 includes driving the switching element module 660-1-2, that is, a switching element module of a next sequence. The aforementioned operating method is applied to all of the converters.

In one embodiment, the switching element module control step further includes a switching element module operation stop capacity calculation step S330.

In one embodiment, the switching element module operation stop capacity calculation step S330 includes calculating each switching element module operation stop capacity based on each calculated switching element module capacity and a switching element module operation stop capacity ratio. The switching element module capacity calculation step S310 includes calculating each switching element module capacity by dividing each converter capacity by the number of switching element modules. The switching element module operation stop capacity ratio may be freely set depending on the rating capacity of the grid and/or the rating capacity of each converter, but a detailed numerical value thereof is described later.

Each switching element module operation stop capacity is power, that is, a criterion by which the operation of a switching element module that belongs to switching element modules being driven and that has the last sequence is stopped. For example, whether or not to stop the operation of a switching element module being driven and having the last sequence is determined depending on whether the capacity of the switching element module that belongs to switching element modules being driven in the converter of the last sequence and that has the last sequence exceeds each switching element module operation capacity and then becomes the switching element module operation capacity or less.

In one embodiment, in the switching element module driving step S340, when the capacity of a switching element module that belongs to switching element modules being driven and that has the last sequence exceeds each switching element module operation stop capacity and then becomes the switching element module operation stop capacity or less, the operation of the switching element module that belongs to the switching element modules being driven and that has the last sequence is stopped at a point of time at which the capacity of the switching element module that belongs to the switching element modules being driven and that has the last sequence exceeds each converter operation stop capacity and then becomes the converter operation stop capacity or less. The switching element module that belongs to the switching element modules being driven and that has the last sequence is a switching element module that belongs to switching element modules being driven in a converter belonging to converters being driven and having the last sequence and that has the last sequence.

In the switching element module driving step S340, when the capacity of a switching element module that belongs to switching element modules being driven and that has the last sequence exceeds each switching element module operation stop capacity and then becomes the switching element module operation stop capacity or less, the operation of the switching element module that belongs to the switching element modules being driven and that has the last sequence is stopped. If each switching element module operation capacity is smaller than each switching element module operation stop capacity, the capacity of a switching element module that belongs to switching element modules being driven and that has the last sequence is greater than a corresponding switching element module operation capacity, but may be smaller than a corresponding switching element module operation stop capacity.

In this case, when the capacity of the switching element module having the last sequence gradually increases and exceeds the converter operation capacity, a converter of a next sequence is driven in the switching element module driving step S340.

The switching element module driving step S340 includes driving a converter of a next sequence when the current capacity of a switching element module that belongs to switching element modules included in a converter being driven and that has the last sequence exceeds a corresponding switching element module operation capacity.

More specifically, for example, if a switching element module having the last sequence is the switching element module 660-1-2, when the capacity of the switching element module 660-1-2, that is, the switching element module of the last sequence, gradually increases as the velocity of the wind increases and then exceeds its switching element module operation capacity, the converter 660-1-3, that is, a switching element module of a next sequence, is driven in the switching element module driving step S340.

If the capacity of a switching element module that is being driven and has the last sequence gradually increases, exceeds a corresponding switching element module operation stop capacity and then becomes smaller than the switching element module operation stop capacity, the capacity of a switching element module that belongs to switching element modules being driven and that has the last sequence is greater than a corresponding switching element module operation capacity, but may be smaller than a corresponding switching element module operation stop capacity. In this case, the operation of the switching element module being driven and having the last sequence is stopped.

When the capacity of a switching element module being driven and having the last sequence gradually increases, exceeds a corresponding switching element module operation stop capacity and then becomes smaller than the switching element module operation stop capacity, the operation of the switching element module being driven and having the last sequence is stopped. In the switching element module driving step S340, when the capacity of a switching element module having a sequence anterior to that of the stopped switching element module increases any further, the stopped switching element module is driven again.

More specifically, for example, assuming that a switching element module being driven and having the last sequence is the switching element module 660-1-2, when the capacity of the switching element module 660-1-2 gradually increases, exceeds a corresponding converter operation stop capacity and then becomes smaller than the converter operation stop capacity, the operation of the switching element module 660-1-2, that is, the switching element module being driven and having the last sequence, is stopped. If the capacity of the switching element module 660-1-1, that is, a switching element module having a sequence anterior to that of the switching element module 660-1-2 that is the stopped switching element module, increases any further because the wind becomes strong again, the switching element module 660-1-2, that is, the stopped switching element module, is driven again in the switching element module driving step S340.

In one embodiment, the switching element module operation capacity ratio and the switching element module operation stop capacity ratio may be different. The switching element module operation capacity ratio and the switching element module operation stop capacity ratio have been described above.

The method for driving switching element modules in a wind power generation system can reduce output power supplied to a grid versus power consumed by a converter by making different a criterion by which another switching element module is newly driven in response to the increase of output power supplied to the grid and a criterion by which the operation of a switching element module being driven is stopped in response to the decrease of output power supplied to the grid.

In one embodiment, the switching element module operation capacity ratio is smaller than the switching element module operation stop capacity ratio.

If each switching element module operation capacity is smaller than each switching element module operation stop capacity, the capacity of a switching element module that belongs to switching element modules being driven and that has the last sequence is greater than a corresponding switching element module operation capacity, but may be smaller than a corresponding switching element module operation stop capacity.

In this case, in the switching element module driving step S340, when the capacity of the switching element module having the last sequence gradually increases and exceeds the converter operation capacity, a converter of a next sequence is driven.

More specifically, for example, if a switching element module having the last sequence is the switching element module 660-1-2, when the capacity of the switching element module 660-1-2, that is, the switching element module having the last sequence, gradually increases in accordance with the increase of the velocity of the wind and exceeds a corresponding switching element module operation capacity, the converter 660-1-3, that is, a switching element module of a next sequence, is driven in the switching element module driving step S340.

If the capacity of a switching element module being driven and having the last sequence gradually increases, exceeds a corresponding switching element module operation stop capacity and then becomes smaller than the switching element module operation stop capacity, the capacity of a switching element module that belongs to switching element modules being driven and that has the last sequence is greater than a corresponding switching element module operation capacity, but may be smaller than a corresponding switching element module operation stop capacity. In this case, the operation of the switching element module being driven and having the last sequence is stopped.

When the capacity of a switching element module being driven and having the last sequence gradually increases, exceeds a corresponding switching element module operation stop capacity and then becomes smaller than the switching element module operation stop capacity, the operation of the switching element module being driven and having the last sequence is stopped. If the capacity of a switching element module having a sequence anterior to that of the stopped switching element module increases any further, the switching element module driving step S340 includes driving the stopped switching element module again.

More specifically, for example, assuming that a switching element module being driven and having the last sequence is the switching element module 660-1-2, when the capacity of the switching element module 660-1-2 gradually increases, exceeds a corresponding converter operation stop capacity and then becomes smaller than the converter operation stop capacity, the operation of the switching element module 660-1-2, that is, the switching element module now being drive and having the last sequence, is stopped. If the capacity of the switching element module 660-1-1, that is, a switching element module having a sequence anterior to that of the switching element module 660-1-2 that is the stopped switching element module, increases any further because the wind becomes strong again, the switching element module 660-1-2, that is, the stopped switching element module, is driven in the switching element module driving step S340.

The method for driving switching element modules in a wind power generation system can reduce output power supplied to a grid versus power consumed by a converter by making different a criterion by which another switching element module is newly driven in response to the increase of output power supplied to the grid and a criterion by which the operation of a switching element module being driven is stopped in response to the decrease of output power supplied to the grid.

In one embodiment, the switching element module operation capacity ratio is 90~710%. If the rating capacity of the grid is 3 MW, the number of switching element modules is n, and the number of switching element modules is m, the switching element module capacity calculation step S310 calculates 3 MW/(n*m) as each switching element module capacity. The switching element module operation capacity calculation step S320 includes calculating (3 MW*0.9)/(n*m)~(3 MW*1.1)/(n*m) as each switching element module operation capacity. In this case, the switching element module operation capacity may be (3 MW*1.1)/(n*m), that is, a maximum value.

In this case, if the capacity of a switching element module being driven exceeds (3 MW*1.1)/(n*m), a switching element module that belongs to switching element modules being driven and that has the last sequence is newly driven. If the capacity of a switching element module being driven exceeds (3 MW*1.1)/(n*m), this may refer to the capacity of each of switching element modules being driven exceeding (3 MW*1.1)/(n*m). A value calculated by dividing a value, calculated by dividing current power supplied to the grid by the number of converters, by the number of switching element modules is power transferred from each of switching element modules being driven to the grid.

In one embodiment, the switching element module operation stop capacity ratio is 710~720%. If the rating capacity of the grid is 3 MW, the number of switching element modules is n, and the number of switching element modules is m, the switching element module capacity calculation step S310 calculates 3 MW/(n*m) as each switching element module capacity. The switching element module operation stop capacity calculation step S330 includes calculating (3 MW*1.1)/(n*m)~(3 MW*1.2)/(n*m) as a switching element module operation stop capacity. In this case, the switching element module operation stop capacity may be (3 MW*1.2)/(n*m), that is, a maximum value.

In this case, when the capacity of a switching element module being driven exceeds (3 MW*1.2)/(n*m) and becomes smaller than (3 MW*1.2)/(n*m), the operation of a switching element module that belongs to switching element modules being driven and that has the last sequence. If the capacity of a switching element module being driven becomes smaller than (3 MW*1.2)/(n*m), this refers to the capacity of each of switching element modules being driven being smaller than (3 MW*1.2)/(n*m). A value calculated by dividing a value, calculated by dividing current power supplied to the grid by the number of converters, by the number of switching element modules is power transferred from each of switching element modules being driven to the grid.

FIGS. 13 to 18 show an apparatus for controlling switching element modules in a wind power generation system according to an embodiment of the present disclosure.

Figure 13:
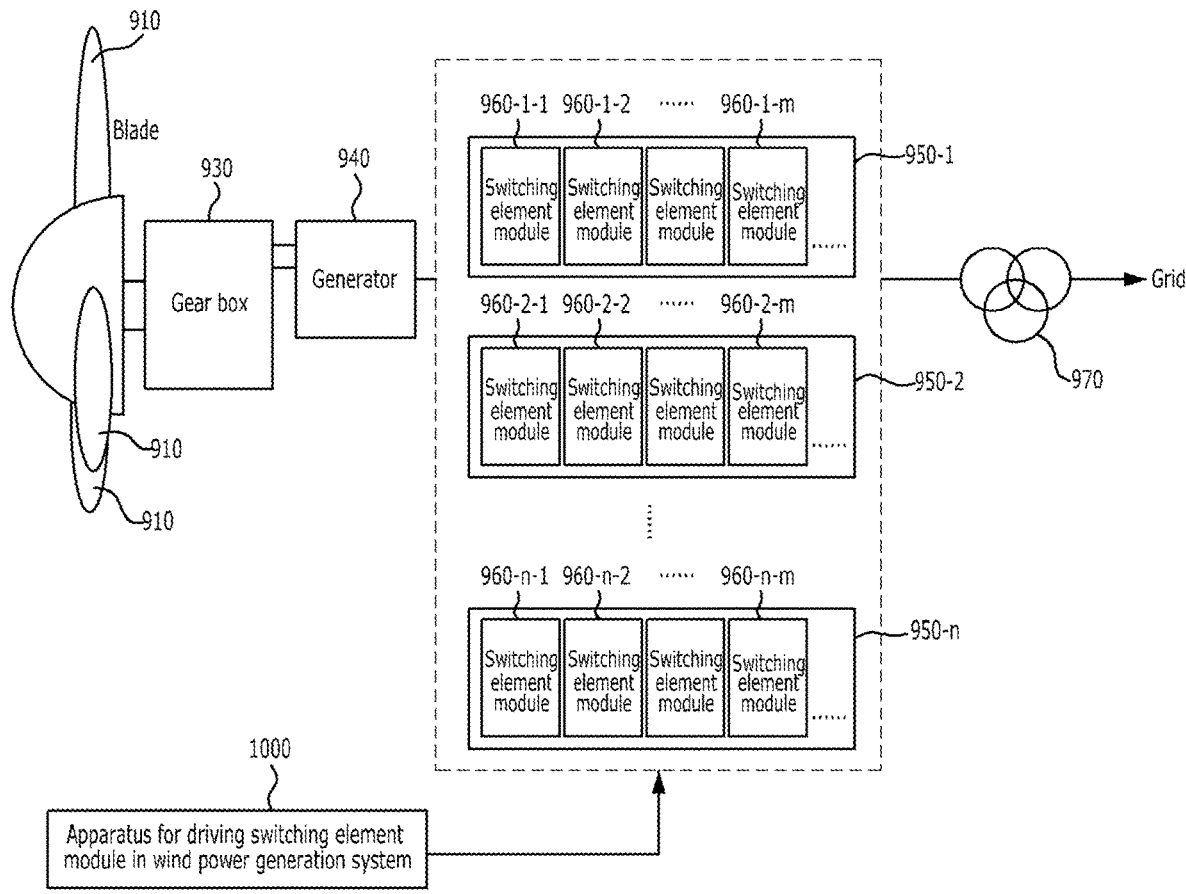
FIG. 13 shows a configuration of a wind power generation system.

FIG. 13 shows a configuration of the wind power generation system.

The wind power generation system includes a blade 910, a gear box 930, a generator 940, a plurality of converters 950-1, 950-2 and 950-n, a transformer 970 and an apparatus 1000 for controlling converters in a wind power generation system.

In one embodiment, the blade 910 는 바람 에너지에 의해 회전하여 In one embodiment, the blade 910 generates kinetic energy through rotation attributable to wind energy. That is, the blade 910 is a machine for converting energy of a fluid, such as water, gas or vapor, into a mechanical work. The blade 910 may be implemented in a direction vertical or horizontal to the ground, and includes one or more wings.

In one embodiment, the gear box 930 is disposed between the blade 910 and the rotor of the generator 940 to be described later. The gear box 930 functions to increase the speed of revolution of the rotor of the generator 940 when the velocity of the wind is low and thus the speed of revolution of the blade 910 is low.

In one embodiment, the generator 940 generates electricity using rotatory power after the rotor converts energy of a fluid into the rotatory power. That is, the generator 940 is an apparatus for converting mechanical energy into electric energy. A synchronizer or inductor is chiefly used as the generator 940. The synchronizer may be divided into a winding field type and a permanent magnet type depending on the type of a field. The inductor may be divided into a squirrel type and a winding type depending on the structure of the rotor. More specifically, the winding type inductor, the winding type induction generator 940 or the induction generator 940 may be installed on the place in which the velocity of the wind is variable.

In one embodiment, the converters 950-1, 950-2, . . . , 950-n includes an AC/DC converter, a DC/AC inverter, and a DC link connecting the AC/DC converter and the DC/AC inverter. The converters 950-1, 950-2, . . . , 950-n are connected in parallel between the generator 940 and the transformer 970. FIG. 13 illustrates the n converters 950-1, 950-2, . . . , 950-n that are connected in parallel.

The AC/DC converter converts three-phase AC power, output by the generator 940, into a DC form. The DC/AC inverter converts the converted DC power into AC power suitable to be used for the grid side. The DC link is connected in parallel to the AC/DC converter and the DC/AC inverter, and may send energy between the AC/DC converter and the DC/AC inverter. The DC link may be implemented using a capacitor, but any device capable of charging and discharging energy may be used as the DC link. FIG. 13 discloses the plurality of converters connected in parallel, but the present disclosure is not limited thereto. For example, only a single converter may be used.

In one embodiment, the converters 950-1, 950-2, . . . , 950-n include one or more switching element modules 960-1-1, 960-1-2, 960-1-m, 960-2-1, 960-2-2, 960-2-m, . . . , 960-n-1, 960-n-2, 960-n-m. FIG. 13 illustrates m switching element modules 960-1-1, 960-1-2, 960-1-m, 960-2-1, 960-2-2, 960-2-m, . . . , 960-n-1, 960-n-2, 960-n-m that are included in the converters 950-1, 950-2, . . . , 950-n, respectively, and that are connected in parallel. The AC/DC converter includes 6 switching elements, and the DC/AC inverter also includes 6 switching elements. The switching element is a transistor, and may include at least one of semiconductor switching elements, such as gate turnoff thyristors (GTO), an insulated gate bipolar transistors (IGBT), integrated gate commutated thyristors (IGCT), bipolar junction transistors (BJT) and metal oxide semiconductor field effect transistors (MOSFET).

AC power output by the generator 940 is three-phase AC power. Each of the three phases is connected to the two switching elements of the AC/DC converter. Each phase in the three-phase AC power supplied to a grid is connected to the two switching elements of the DC/AC inverter. That is, two of the 6 switching elements of the AC/DC converter operate so that an electric current flows into one phase. Two of the 6 switching elements of the DC/AC inverter operate so that an electric current flows into one phase.

In one embodiment, the switching element modules 960-1-1, 960-1-2, 960-1-m, 960-2-1, 960-2-2, 960-2-m, . . . , 960-n-1, 960-n-2, 960-n-m include the 6 switching elements of the AC/DC converter, the 6 switching elements of the DC/AC converter, and the DC link. A plurality of switching element modules of the switching element modules 960-1-1, 960-1-2, 960-1-m, 960-2-1, 960-2-2, 960-2-m, . . . , 960-n-1, 960-n-2, 960-n-m is connected in parallel to form each of the converters 950-1, 950-2, . . . , 950-n.

In one embodiment, the transformer 970 is a part for changing a voltage or current value of an AC using an electromagnetic induction phenomenon, and is connected to the grid. In this case, the grid may refer to a power grid associated with the wind power generation system.

Figure 14:
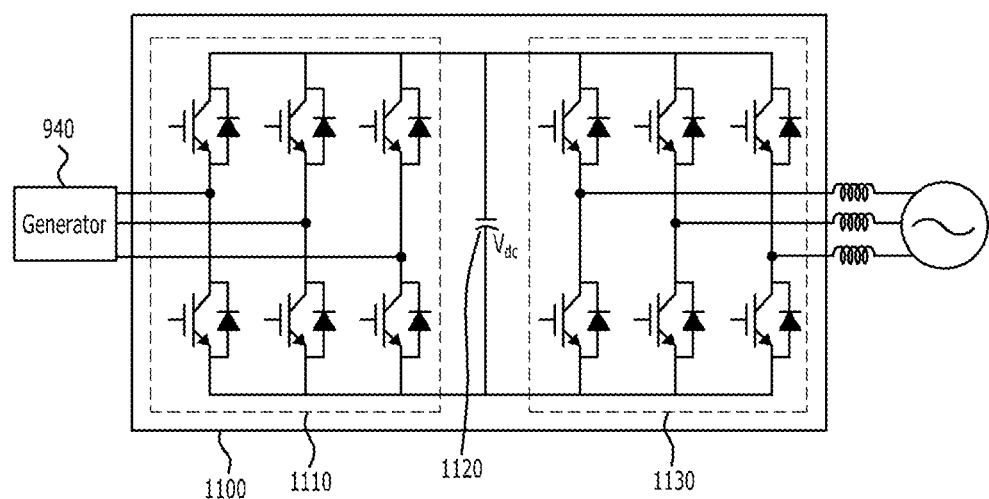
FIG. 14 shows the configuration of a switching element module according to an embodiment.

FIG. 14 shows the configuration of a switching element module 1100 according to an embodiment. A detailed configuration of each of the switching element modules 960-1-1, 960-1-2, 960-1-m, 960-2-1, 960-2-2, 960-2-m, . . . , 960-n-1, 960-n-2, 960-n-m shown in FIG. 13 is the same as that of the switching element module 1100 shown in FIG. 14. The switching element module 1100 includes the 6 switching elements of an AC/DC converter 1110, the 6 switching elements of a DC/AC converter 1130, and a DC link 1120. The AC/DC converter 1110 converts AC power, output by the generator, into a DC form. The DC/AC converter 1130 converts the converted DC power into an AC form and sends it to the grid side. A configuration for converting AC power into DC power or a configuration for converting DC power into AC power is evident to a person having ordinary skill in the converter field.

Power supplied to the grid three-phase AC power. In order to transfer the phase of any one of the three phases, for example, AC power to the grid, two of the 6 switching elements of the AC/DC converter 1110 needs to be turned on, and two of the 6 switching elements of the DC/AC inverter 1130 needs to be turned on. Such a characteristic is evident to a person having ordinary skill in the converter field.

Figure 15:
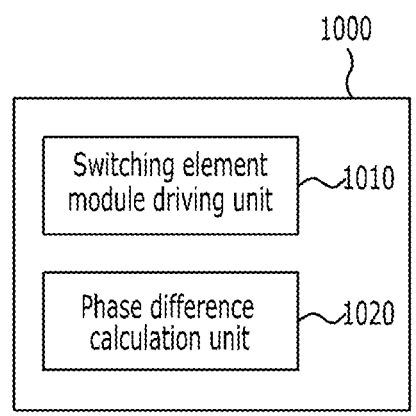
FIG. 15 shows the configuration of an apparatus for controlling switching element modules in a wind power generation system according to an embodiment.

FIG. 15 shows the configuration of an apparatus for controlling switching element modules in a wind power generation system according to an embodiment.

In one aspect, the apparatus 1000 for controlling switching element modules in a wind power generation system includes a switching element module driving unit 1010.

In one embodiment, the switching element module driving unit 1010 turns on/off a plurality of switching element modules that are included in a converter connected between the generator and the grid and that are connected in parallel, and drives the plurality of switching element modules so that they have a phase difference. For example, in the case of the converter 950-1 of FIG. 13, the switching element module driving unit 1010 drives m switching element modules 960-1-1, 960-1-2, . . . , 960-1-m included in the converter 950-1 so that they have a phase difference. As described above, in order to supply AC power to the grid based on any one phase, the four switching elements need to be turned on. As a result, for example, in the case of any one phase, the four switching elements of each of the switching element modules 960-1-1, 960-1-2, . . . , 960-1-m are turned on/off at the same time with a phase difference for each switching element module. In the m switching element modules, a series of processes for turning on the four switching elements of any one switching element module and for turning on the four switching elements of a next switching element module are processed with a specific phase difference.

Turning on/off, by the switching element module driving unit 1010, the plurality of switching element modules included in the converter and connected in parallel may refer to some of the 12 switching elements of the switching element module being turned on/off in order to transfer three-phase AC signals with differences of 120 degrees to the grid. In order to transfer the three-phase AC signals to the grid so that they have a difference of 120 degrees, which one of the 12 switching elements included in the switching element module is required and when the switching elements have to be turned on/off are evident to a person having ordinary skill in the converter field.

For example, in the case of any one of the three phases, turning on/off, by the switching element module driving unit 1010, the plurality of switching element modules included in the converter and connected in parallel may refer to the four switching elements of the switching element module being turned on/off.

For example, in the case of three phases, the switching element module driving unit 1010 turns on/off necessary some of the plurality of switching elements included in the switching element module so that three-phase AC power is supplied to the grid. As a result, the necessary switching elements are turned on/off with a phase difference for each switching element module.

In one embodiment, the phase difference is a constant phase difference. The switching element module driving unit 1010 turns on/off the plurality of switching element modules that are included in the converter connected between the generator and the grid and that are connected in parallel, and drives the plurality of switching element modules so that they have a phase difference.

For example, in the case of any one of the three phases, the switching element module driving unit 1010 turns on/off the four switching elements of each of the plurality of switching element modules that are included in the converter and that are connected in parallel. At this time, the plurality of switching element modules is turned on/off with a constant phase difference. The definition of the turn on/off of the plurality of switching element modules has been described above. Turning on/off the plurality of switching element modules with the constant phase difference may refer to the plurality of switching element modules being turned on/off at the same time so that they have the constant phase difference, but does not mean that switching elements included in each switching element module are controlled so that they have a constant phase difference.

In one embodiment, the apparatus 1000 for controlling switching element modules in a wind power generation system further includes a phase difference calculation unit 1020.

In one embodiment, the phase difference calculation unit 1020 calculates a value, calculated by dividing 360 degrees by the number of switching element modules that are included in a single converter and that are connected in parallel, as a phase difference. The switching element module driving unit 1010 drives the plurality of switching element modules so that they have the calculated phase difference.

For example, in the case of the converter 950-1 of FIG. 13, it is assumed that the converter 950-1 includes m switching element modules and "m" is 4. The phase difference calculation unit 1020 calculates a phase difference as 90 degrees by dividing 360 degrees by 4, that is, the number of switching element modules. The switching element module driving unit 1010 drives the four switching elements modules of the converter 950-1 so that they have the calculated phase difference of 90 degrees. The remaining converters 950-2, . . . , 950-n operate like the converter 950-1. In a conventional technology, a plurality of switching element modules included in the converter 950-1 is driven so that they are turned on/off at the same time. Accordingly, an AC output by the converter includes a large amount of harmonic components. In contrast, the switching element module driving unit 1010 of the apparatus 1000 for controlling switching element modules in a wind power generation system turns on/off switching element modules so that they have a phase difference corresponding to a value calculated by dividing 360 degrees by the number of switching element modules. Accordingly, AC power output by the converter includes a small amount of harmonic components.

In one embodiment, the apparatus 1000 for controlling switching element modules in a wind power generation system further includes one or more converters including one or more switching element modules. The one or more switching element modules may include an AC/DC converter configured to include 6 switching elements, a DC link connected in parallel to the AC/DC converter, and a DC/AC inverter configured to include 6 switching elements and connected in parallel to the DC link. Referring to FIG. 13, the apparatus 1000 for controlling switching element modules in a wind power generation system includes one or more converters 950-1, 950-2, . . . , 950-n. The one or more converters include one or more switching element modules 960-1-1, 960-1-2, 960-1-m, 960-2-1, 960-2-2, 960-2-m, . . . , 960-n-1, 960-n-2, 960-n-m, respectively.

Referring to FIG. 14, each switching element module 1100 includes the AC/DC converter 1110 including the 6 switching elements, the DC/AC inverter 1130 including the 6 switching elements, and the DC link. The AC/DC converter 1110, the DC/AC inverter 1130 and the DC link are connected in parallel.

Figure 16:
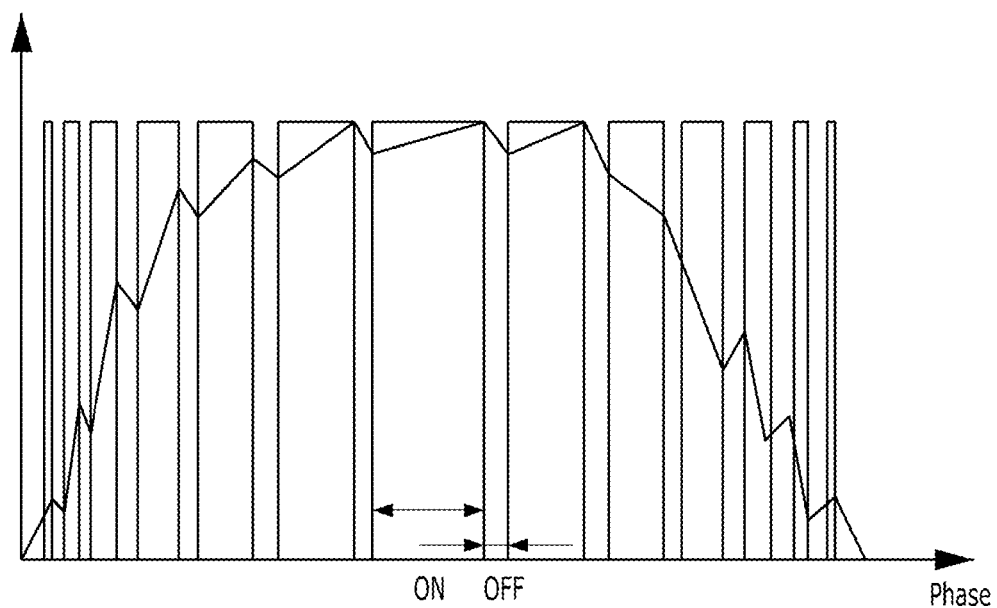
FIG. 16 shows a current waveform of any one of three phases output by a converter according to switching element modules.

FIG. 16 shows a current waveform of any one of three phases output by a converter according to switching element modules which are driven according to a conventional method. In FIG. 16, a square wave is the voltage waveform of the grid. When the switching element modules are turned on, the voltage waveform becomes a maximum, which is the same as the voltage of the DC link. Waveforms that are connected by solid lines and increased or decreased depending on whether a voltage waveform is present or not form a current waveform. When a plurality of switching element modules included in any one converter is turned on and off at the same time, an output current of the converter suddenly decreases. When the switching element modules are turned on at the same time, an output current suddenly increases. Accordingly, an electric current including a large amount of harmonic components is supplied to the grid.

Figure 17:
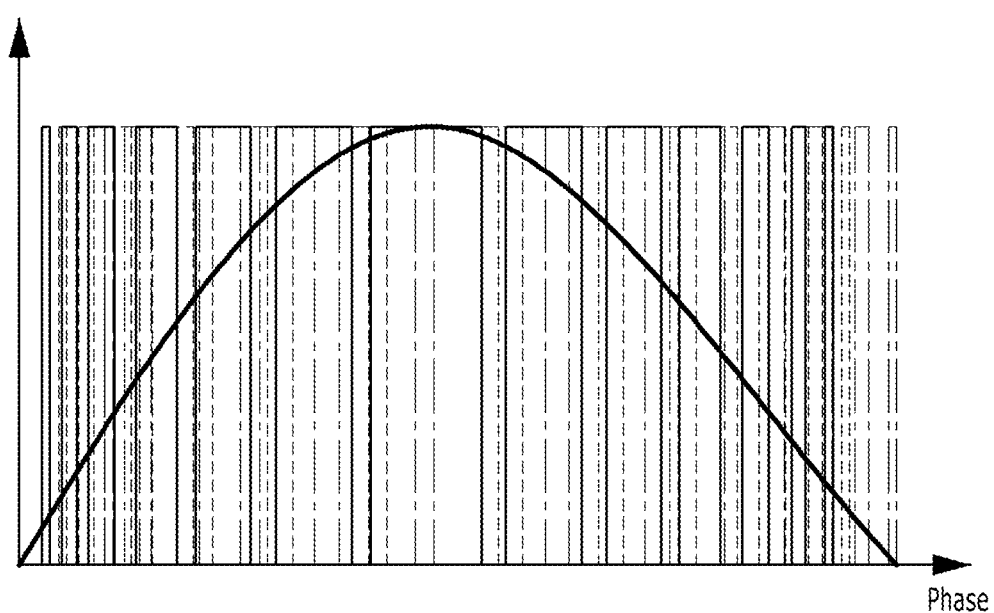
FIG. 17 shows a current waveform of any one of three phases output by a converter according to switching element modules driven by the apparatus for controlling switching element modules in a wind power generation system.

FIG. 17 shows a current waveform of any one of three phases output by a converter according to switching element modules driven by the apparatus for controlling switching element modules in a wind power generation system. A case where all of switching element modules are turned on and off at the same time is reduced because a plurality of switching element modules included in any one converter operates with a constant phase difference. In FIG. 17, a section in which the size of current itself suddenly drops is not present because all of switching element modules are rarely turned off during a phase section of 180 degrees.

FIG. 17 shows a current waveform output by a converter for one phase, assuming that the converter includes three switching element modules. First, a solid line is a switching element module that is first turned on, a dotted line is a switching element module that is second turned on, and a dashed dotted line is a switching element module that is third turned on. The three switching element modules are driven with a constant phase difference.

Figure 18:
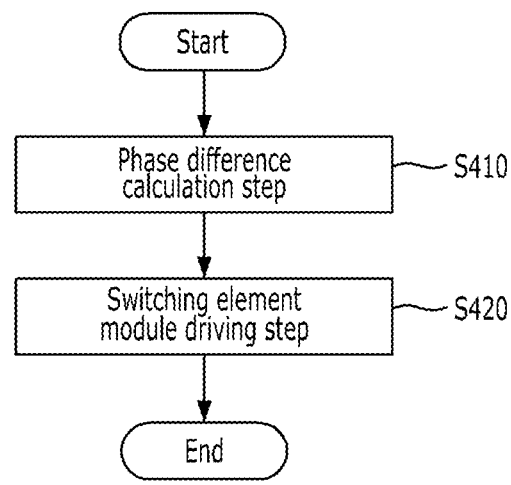
FIG. 18 shows method for controlling switching element modules in a wind power generation system according to an embodiment.

FIG. 18 shows a flow of a method for controlling switching element modules in a wind power generation system according to an embodiment.

In one aspect, the method for controlling switching element modules in a wind power generation system includes a switching element module driving step S420.

In one embodiment, the switching element module driving step S420 includes turning on/off a plurality of switching element modules that are included in a converter connected between the generator and the grid and that are connected in parallel, and driving the plurality of switching element modules so that they have a phase difference. For example, in the case of the converter 950-1 of FIG. 13, the switching element module driving step S420 drives m switching element modules 960-1-1, 960-1-2, . . . , 960-1-m included in the converter 950-1 so that they have a phase difference. As described above, in order to supply AC power to the grid based on any one phase, the four switching elements need to be turned on. As a result, for example, in the case of any one phase, the four switching elements of each of the switching element modules 960-1-1, 960-1-2, . . . , 960-1-m are turned on/off at the same time with a phase difference for each switching element module. In the m switching element modules, a series of processes for turning on the four switching elements of any one switching element module and for turning on the four switching elements of a next switching element module are processed with a specific phase difference.

In the switching element module driving step S420, turning on/off the plurality of switching element modules included in the converter and connected in parallel may refer to some of the 12 switching elements of the switching element module being turned on/off in order to transfer three-phase AC signals with differences of 120 degrees to the grid. In order to transfer the three-phase AC signals to the grid so that they have a difference of 120 degrees, which one of the 12 switching elements included in the switching element module is required and when the switching elements have to be turned on/off are evident to a person having ordinary skill in the converter field. For example, in the case of any one of the three phases, in the switching element module driving step S420, turning on/off the plurality of switching element modules included in the converter and connected in parallel may refer to the four switching elements of the switching element module being turned on/off.

For example, in the switching element module driving step S420, in the case of three phases, necessary some of the plurality of switching elements included in the switching element module are turned on/off so that three-phase AC power is supplied to the grid. As a result, the necessary switching elements are turned on/off with a phase difference for each switching element module.

In one embodiment, the phase difference is a constant phase difference. The switching element module driving step S420 includes turning on/off the plurality of switching element modules that are included in the converter connected between the generator and the grid and that are connected in parallel, and driving the plurality of switching element modules so that they have a phase difference.

For example, in the case of any one of the three phases, the switching element module driving step S420 turns on/off the four switching elements of each of the plurality of switching element modules that are included in the converter and that are connected in parallel. At this time, the plurality of switching element modules is turned on/off with a constant phase difference. The definition of the turn on/off of the plurality of switching element modules has been described above. Turning on/off the plurality of switching element modules with the constant phase difference may refer to the plurality of switching element modules being turned on/off at the same time so that they have the constant phase difference, but does not necessarily mean that switching elements included in each switching element module are controlled so that they have a constant phase difference.

In one embodiment, the method for controlling switching element modules in a wind power generation system further includes a phase difference calculation step S410.

In one embodiment, the phase difference calculation step S410 includes calculating a value, calculated by dividing 360 degrees by the number of switching element modules that are included in a single converter and that are connected in parallel, as a phase difference. The switching element module driving step S420 includes driving the plurality of switching element modules so that they have the calculated phase difference.

For example, in the case of the converter 950-1 of FIG. 13, it is assumed that the converter 950-1 includes m switching element modules and "m" is 4. The phase difference calculation step S410 includes calculating a phase difference as 90 degrees by dividing 360 degrees by 4, that is, the number of switching element modules. The switching element module driving step S420 drives the four switching elements modules of the converter 950-1 so that they have the calculated phase difference of 90 degrees. The remaining converters 950-2, ..., 950-$n$ operate like the converter 950-1. In a conventional technology, a plurality of switching element modules included in the converter 950-1 is driven so that they are turned on/off at the same time. Accordingly, an AC output by the converter includes a large amount of harmonic components. In contrast, the switching element module driving step S420 of the method for controlling switching element modules in a wind power generation system turns on/off switching element modules so that they have a phase difference corresponding to a value calculated by dividing 360 degrees by the number of switching element modules. Accordingly, AC power output by the converter includes a small amount of harmonic components.

The disclosure can reduce output power supplied to a grid versus power consumed by a converter by sequentially further driving the converters one by one when output power supplied to the grid increases in accordance with the velocity of the wind.

The disclosure can reduce output power supplied to a grid versus power consumed by a converter by sequentially stopping the operation of converters when output power supplied to the grid decreases in accordance with the velocity of the wind.

The disclosure can reduce output power supplied to a grid versus power consumed by a converter by making different a criterion by which another converter is newly driven in response to the increase of output power supplied to the grid and a criterion by which the operation of a converter that is being driven is stopped in response to the decrease of output power supplied to the grid.

Furthermore, the disclosure can reduce a reduction in the lifespan of a specific converter by first driving a converter that belongs to a plurality of converters connected in parallel and that has a smaller accumulated operation time so that the plurality of converters has the same operation time.

The disclosure can reduce a reduction in the lifespan of a specific converter by first stopping the operation of a converter that belongs to a plurality of converters and that has a greater accumulated operation time so that the plurality of converters has the same operation time.

The disclosure can reduce a reduction in the lifespan of a specific converter by driving a converter that belongs to a plurality of converters and that has the next sequence of a converter that has been finally driven based on the set operation sequence of the plurality of converters so that the plurality of converters has the same operation time.

The disclosure can reduce a reduction in the lifespan of a specific converter by stopping the operation of a converter that belongs to a plurality of converters and that has the next sequence of a converter that is finally stopped based on the set operation stop sequence of the plurality of converters so that the plurality of converters has the same operation time.

The disclosure can reduce a reduction in the lifespan of a specific switching element module by first driving a switching element module that belongs to a plurality of switching element modules included in a converter and that has a smaller accumulated operation time so that the plurality of switching element modules has the same operation time.

The disclosure can reduce a reduction in the lifespan of a specific switching element module by first stopping the operation of a switching element module that belongs to a plurality of switching element modules included in a converter and that has a greater accumulated operation time so that the plurality of switching element modules has the same operation time.

The disclosure can reduce a reduction in the lifespan of a specific switching element module by driving a switching element module that belongs to a plurality of switching element modules included in a converter and that has the next sequence of a switching element module that has been finally driven based on the operation sequence of the plurality of switching element modules so that the plurality of switching element modules has the same operation time.

The disclosure can reduce a reduction in the lifespan of a specific switching element module by stopping the operation of a switching element module that belongs to a plurality of switching element modules included in a converter and that has the next sequence of a switching element module that is finally stopped based on the operation stop sequence of the plurality of switching element modules so that the plurality of switching element modules has the same operation time.

Furthermore, the disclosure can significantly reduce output power supplied to the grid versus power consumed by a converter by sequentially further driving switching element modules included in the converter when output power output by the converter increases in accordance with the velocity of the wind.

The disclosure can significantly reduce output power supplied to the grid versus power consumed by a converter by sequentially stopping the operation of switching element modules included in the converter when power output by the converter is reduced in accordance with the velocity of the wind.

The disclosure can reduce output power supplied to the grid versus power consumed by a converter by making different a criterion by which another switching element module included in the converter is newly driven in response to an increase of power output by the converter and a criterion by which the operation of a switching element module that is being driven is stopped in response to a reduction of power output by the converter.

Furthermore, the disclosure can reduce a harmonic component included in an AC output by a converter connected between the generator of a wind power generation system and a grid in such a manner that the converter includes a plurality of switching element modules connected in parallel and the plurality of switching element modules is driven so that they have a phase difference.

The disclosure can reduce a harmonic component included in an AC output by a converter connected between the generator of a wind power generation system and a grid in such a manner that the converter includes a plurality of switching element modules connected in parallel and the plurality of switching element modules is driven so that they have a constant phase difference.

The disclosure can reduce a harmonic component included in an AC output by a converter connected between the generator of a wind power generation system and a grid in such a manner that the converter includes a plurality of switching element modules connected in parallel and the plurality of switching element modules is driven so that they have a phase difference corresponding to a value calculated by dividing 360 degrees by the number of switching element modules that are included in a single converter and that are connected in parallel.

Although the embodiments of the present disclosure have been described with reference to the accompanying drawings, they are only illustrative. Moreover, the above exemplary benefits are illustrative in nature and should not be construed to be limiting of the invention(s). A person having ordinary skill in the art will understand that the present disclosure may be modified in various ways and that other equivalent embodiments of are possible. Accordingly, the range of protection of the present disclosure should be determined by the following claims.

What is claimed is:

1. An apparatus for driving switching element modules in a wind power generation system, the apparatus comprising:
   at least one converter coupled between a generator and a grid, the at least one converter including a plurality of switching element modules connected in parallel; and
   a switching element module controller configured to
      drive the plurality of switching element modules by sequentially driving the plurality of switching element modules one by one when an output power of a corresponding converter increases and sequentially stopping operations of the plurality of switching element modules one by one when the output power of the corresponding converter decreases,
      calculate a switching element module capacity for each switching element module based on a converter capacity of each of the at least one converter and a number of switching element modules in the corresponding converter, and
      calculate a switching element module operation capacity for each switching element module based on each calculated switching element module capacity and a switching element module operation capacity ratio.

2. The apparatus of claim 1, wherein the switching element module controller is further configured to
   drive a next switching element module when a current capacity of a last switching element module exceeds a corresponding switching element module operation capacity.

3. The apparatus of claim 2, wherein the switching element module controller is further configured to
   calculate a switching element module operation stop capacity for each switching element module based on each calculated switching element module capacity and a switching element module operation stop capacity ratio, and
   when a capacity of the last switching element becomes the switching element module operation stop capacity or less, stop an operation of the last switching element module.

4. The apparatus of claim 3, wherein the switching element module operation capacity ratio and the switching element module operation stop capacity ratio are different.

5. The apparatus of claim 2, wherein the switching element module controller is further configured to
   calculate the converter capacity of the corresponding converter by dividing a rating capacity of the grid by a number of converters and to
   calculate the switching element module capacity by dividing the calculated converter capacity by the number of switching element modules.

6. The apparatus of claim 2, wherein the switching element module controller is further configured to drive a next converter if a current capacity of a switching element module included in a last converter being driven exceeds a corresponding switching element module operation capacity.

* * * * *